United States Patent
Nagamura et al.

(10) Patent No.: US 8,596,160 B2
(45) Date of Patent: Dec. 3, 2013

(54) STEERING APPARATUS

(75) Inventors: Tomonao Nagamura, Ishikawa (JP); Naoki Sawada, Gunma (JP); Wataru Hagiwara, Gunma (JP); Masaki Tomaru, Gunma (JP); Seiichi Moriyama, Gunma (JP)

(73) Assignee: NSK Ltd., Tokyo (JP)

( * ) Notice: Subject to any disclaimer, the term of this patent is extended or adjusted under 35 U.S.C. 154(b) by 461 days.

(21) Appl. No.: 12/742,609

(22) PCT Filed: Nov. 12, 2008

(86) PCT No.: PCT/JP2008/070595
§ 371 (c)(1),
(2), (4) Date: May 12, 2010

(87) PCT Pub. No.: WO2009/063908
PCT Pub. Date: May 22, 2009

(65) Prior Publication Data
US 2010/0242665 A1 Sep. 30, 2010

(30) Foreign Application Priority Data

| Nov. 13, 2007 | (JP) | 2007-293891 |
| Nov. 29, 2007 | (JP) | 2007-308807 |
| Dec. 7, 2007 | (JP) | 2007-316568 |
| Dec. 21, 2007 | (JP) | 2007-329979 |

(51) Int. Cl.
*B62D 1/16* (2006.01)
(52) U.S. Cl.
USPC .............. 74/492; 280/775; 280/777
(58) Field of Classification Search
USPC ............ 74/492, 493; 280/775, 777, 779; 192/220.2–220.7
See application file for complete search history.

(56) References Cited

U.S. PATENT DOCUMENTS 5,647,818 A * 7/1997 Moody ............... 477/99
7,278,526 B2 * 10/2007 Vermeersch et al. ...... 192/220.2

FOREIGN PATENT DOCUMENTS

| JP | 46-27304 Y | 9/1971 |
| JP | 62-167761 U | 10/1987 |
| JP | 3276869 A | 12/1991 |
| JP | 4-112155 U | 9/1992 |
| JP | 7257322 A | 10/1995 |
| JP | 08-225079 A | 9/1996 |
| JP | 2000168501 A | 6/2000 |
| JP | 2001-347953 A | 12/2001 |
| JP | 2002-308122 A | 10/2002 |
| JP | 2003-205824 A | 7/2003 |

(Continued)

OTHER PUBLICATIONS

Office Action dated Jan. 8, 2013, issued by the Japanese Patent Office in counterpart Japanese Application No. 2007-308807.

*Primary Examiner* — David M Fenstermacher
(74) *Attorney, Agent, or Firm* — Sughrue Mion, PLLC

(57) ABSTRACT

The invention provides a steering apparatus which includes: an inner column 3; an outer column 4 fitted with the inner column 3 in such a manner that it is movable in a telescopic manner; a steering shaft 102 which is rotatably supported on the inner column 3 and outer column 4, and on the vehicle body rearward side of which a steering wheel 103 can be mounted; a lock apparatus 7 including a lock pin 73A which can be operated by an actuator to thereby prevent the rotation of the steering shaft 102; and, a lock housing 71 which is formed integrally with the outer column 4 and stores the lock apparatus 7 therein.

12 Claims, 40 Drawing Sheets

(56) References Cited

FOREIGN PATENT DOCUMENTS

| JP | 2004098788 A | 4/2004 |
| JP | 2004237973 A | 8/2004 |
| JP | 2005-199863 A | 7/2005 |
| JP | 2005-255040 A | 9/2005 |
| JP | 2006-036109 A | 2/2006 |
| JP | 2006036106 A | 2/2006 |
| JP | 2006036107 A | 2/2006 |
| JP | 2007-153088 A | 6/2007 |
| JP | 2007-168640 A | 7/2007 |
| JP | 2007-223383 A | 9/2007 |
| WO | 2006/011378 A1 | 2/2006 |

* cited by examiner

STEERING APPARATUS

TECHNICAL FIELD

The present invention relates to a steering apparatus which includes an antitheft lock apparatus. Specifically, the invention relates to an improvement in a lock housing for mounting the lock apparatus.

BACKGROUND ART

In recent years, there have been increasing vehicle thefts and thus various antitheft apparatus have been used in vehicles. As one of such antitheft apparatus, there is known a lock apparatus which disables the operation of a steering wheel unless a regular key is used. The lock apparatus, as shown in, for example, the patent reference 1 to 4, includes a lock unit provided on a steering column and a key lock groove formed in a steering shaft. And, in operation (in key locked operation), a lock pin provided on the lock unit is inserted into the key lock groove to thereby prevent the rotation of the steering shaft.

In order to secure a sufficient antitheft effect which is provided by such lock apparatus, in a state where the function of the steering apparatus remains secured, it is necessary that the lock unit cannot be removed. In the patent reference 1, there is disclosed a lock apparatus which is structured to be able to meet such need.

In the steering apparatus including the lock apparatus disclosed in the patent reference 1, a lock housing for storing the lock apparatus therein is constituted of a part formed separately from an outer column, and the lock housing is mounted on the outer column for rotatably supporting a steering shaft using a bolt. When such separate lock housing is mounted onto the outer column using a bolt in this manner, it is difficult to enhance the rigidity of the lock housing which receives a reaction force given when the steering shaft is locked. Thus, there is raised a problem that the number of parts and the weight of the lock housing must be increased in order to compensate the shortage of the rigidity of the lock housing.

Also, as disclosed in the patent reference 5, there is proposed a steering apparatus including a clamp device for adjusting the telescopic position of a steering shaft and a lock apparatus for locking the steering shaft. However, in this steering apparatus, there is also raised the following problem.

That is, in the clamp device, the telescopic position of the steering shaft can be adjusted using a slit which is formed in an outer column. In other words, the clamp device applies a fastening force to the outer column to reduce the width of the slit to thereby prevent the steering shaft and outer column from moving relative to each other, while, when the fastening force of the clamp device is relieved, the width of the slit is increased to thereby allow the telescopic movement of the steering shaft relative to the outer column, whereby the clamp device is allowed to adjust the telescopic position of the steering shaft.

On the other hand, the lock apparatus includes a key lock groove formed in the steering shaft, a through hole formed in the outer periphery of the outer column, and a lock unit having a lock pin and disposed on the outer periphery of the outer column. When locking the steering shaft, the lock pin is inserted through the through hole of the outer column into the key lock groove of the steering shaft to thereby prevent the rotation of the steering shaft.

In the steering apparatus including the clamp device and lock apparatus structured in this manner, the slit of the clamp device and the through hole of the lock apparatus are formed in the same outer column. This reduces the strength of the portion of the outer column that exists near the slit and through hole. Thus, when the clamp device applies the fastening force to the outer column, there is a fear that there can be produced a crack between the slit and through hole.

This makes it impossible to dispose the slit and through hole adjacently to each other and, therefore, the mounting position of the lock apparatus is limited and the fastening force of the clamp device cannot be increased.

Patent Reference 1: Japanese Patent Publication 2006-36106
Patent Reference 2: Japanese Patent Publication 2004-237973
Patent Reference 3: Japanese Patent Publication 2004-98788
Patent Reference 4: Japanese Patent Publication 2006-36107
Patent Reference 5: Japanese Patent Publication 2000-168501

DISCLOSURE OF THE INVENTION

Problems that the Invention is to Solve

In view of the above-mentioned conventional circumstances, it is an object of the invention to provide a steering apparatus including a lock apparatus which can enhance the rigidity of a lock housing and a column, which receive a reaction force given when locking a steering shaft, and also can reduce the weights of the lock housing and column, thereby being able to increase a telescopic clamp force.

According to the invention, there is provided following steering apparatuses.

(1) A steering apparatus including:
an inner column;
an outer column fitted with the inner column in such a manner that it can be moved in a telescopic manner;
a steering shaft rotatably supported by the inner and outer columns, with a steering wheel mountable on the vehicle body rearward side thereof;
a lock apparatus including a lock pin actuatable by an actuator for preventing the rotation of the steering shaft; and
a lock housing formed integrally with the outer column for storing the lock apparatus therein.

(2) The steering apparatus disclosed in (1), wherein
the lock housing projects from the outer column in the direction of the width of a vehicle or toward the lower side of a vehicle body.

(3) The steering apparatus disclosed in (2), wherein
the outside diameter of a connecting portion between the outer column and lock housing is set larger than the outside diameter of the outer column.

(4) The steering apparatus disclosed in (1), wherein:
a rib extending parallel to the axis of the outer column is formed between the lock housing and the outer periphery of the outer column; and
the rib is formed integrally with the lock housing and outer column.

(5) The steering apparatus disclosed in (1), wherein:
the lock housing is opened in the diameter direction of the outer column;
a first through hole is formed at a position of the outer column as corresponds to the lock housing;
a key lock recessed portion is formed at a position of the steering shaft as corresponds to the first through hole;
the lock apparatus includes a lock unit having a lock pin;
the lock apparatus is fixed to the inside of the lock housing using a fixing screw;

the lock pin can penetrate through the first through hole of the outer column, move in the diameter direction of the outer column and project into the key lock recessed portion of the steering shaft; and in a state where the steering shaft is arranged on the inside diameter side of the outer column, the head portion of the fixing screw is disposed at a position where it cannot be operated by a tool.

(6) The steering apparatus disclosed in (5), wherein:

a second through hole, having a diameter larger than the diameter of the shaft portion of the fixing screw and smaller than the diameter of the head portion of the fixing screw, is formed in a portion of the outer column surrounded by the lock housing as exists out of the first through hole;

a third through hole, having a diameter larger than the diameter of the head portion of the fixing screw, is formed in a portion of the outer column as exists on the opposite side to the second through hole in the peripheral direction thereof;

the shaft portion of the fixing screw is inserted into the second through hole and the fixing screw is threadedly engaged with a screw hole formed in the lock unit to thereby fix the lock unit to the inside of the lock housing; and the steering shaft is situated between the second and third through holes.

(7) The steering apparatus disclosed in (5), wherein:

a recessed portion, which is recessed downwardly of the upper surface of the lock housing, is formed in a portion of the upper surface of the lock housing;

a second through hole, having a diameter larger than the diameter of the shaft portion of the fixing screw and smaller than the diameter of the head portion of the fixing screw, is formed in the recessed portion; and the shaft portion of the fixing screw is inserted through the second through hole and the fixing screw fixes the lock unit to the inside of the lock housing.

(8) The steering apparatus disclosed in (5), wherein:

a second through hole, having a diameter larger than the diameter of the shaft portion of the fixing screw and smaller than the diameter of the head portion of the fixing screw, is formed in the front surface of the lock housing; and the fixing screw with its shaft portion inserted into the second through hole is threadedly engaged with a screw hole opened up in the front surface of the lock unit to thereby fix the lock unit to the inside of the lock housing.

(9) The steering apparatus disclosed in (1), wherein:

the outer column is made of steel;

the lock housing is made of a light alloy; and a portion of the outer column is embedded in a portion of the lock housing, whereby these two parts are formed as an integral body.

(10) The steering apparatus disclosed in (1), wherein:

a slit extending in the axial direction of the outer column and opened in the front end of the outer column is formed on the front end side of the outer column;

a clamp device is provided for changing the width of the slit to reduce or increase the diameter of the front end portion of the outer column, thereby switching the steering shaft between a state where the steering shaft is prevented from moving in the axial direction thereof and a state where it is allowed to move in the axial direction thereof;

a through hole is formed in the lower surface of such portion of the front end side of the outer column as exists out of the slit;

a key lock recessed portion is formed in the steering shaft, at a position corresponding to the through hole in the axial direction of the steering shaft;

the lock housing is formed integrally with such portion of the outer peripheral surface of the outer column as exists out of the slit and near to the through hole in such a manner that it projects downwardly of the outer column;

the lock apparatus includes the lock pin and a lock unit connected through a connecting member to the outer column; and the lock pin can penetrate through the through hole of the outer column, move in the diameter direction of the outer column and project into the key lock recessed portion of the steering shaft.

(11) The steering apparatus disclosed in (10), wherein:

the slit is formed in the lower surface of the outer column;

the through hole and lock housing are respectively formed in such portion, of the lower surface of the outer column as exists nearer to the rear end side of the outer column than the slit;

the lock housing includes a front plate portion formed in the lower surface of the outer column; and the front plate portion partitions a portion between the slit and through hole in the longitudinal direction of the outer column.

(12) The steering apparatus disclosed in (10), wherein:

the lock housing has a box shape which surrounds the periphery of the through hole and opens in the lower surface thereof; and the lock unit includes a held portion which is to be held within the lock housing.

(13) The steering apparatus disclosed in (12), wherein:

the lock housing includes a pair of side plate portions for sandwiching the held portion of the lock unit from both sides in the width direction of a vehicle body;

the pair of side plate portions respectively have lock housing side insertion holes;

the held portion of the lock unit includes lock unit side insertion holes respectively formed at positions corresponding to a pair of insertion holes formed in the pair of side plate portions;

the connecting member is constituted of a bolt and a nut;

the bolt is inserted through the lock housing side insertion holes and lock unit side insertion holes; and the nut is threadedly engaged with such portion of the bolt as projects from the respective insertion holes.

(14) The steering apparatus disclosed in (13), wherein the head portion of the bolt is disposed inside the insertion hole formed in one of the paired side plate portions and, in a state where the held portion and the other side plate portion are held by and between the head portion of the bolt and nut, the nut is fastened to thereby bring the side surface of the held portion into contact with the inner surface of the other side plate portion.

(15) The steering apparatus disclosed in (13), wherein at least one lock housing side slit, which opens in the lower surface of the lock housing, is formed in the lock housing.

Effects of the Invention

According to the steering apparatus of the invention, the lock housing for storing the lock apparatus is formed integrally with the outer column. Therefore, the rigidity of the lock housing and outer column, which receive a reactive force occurring when the steering shaft is locked, can be increased, the weights of these parts can be reduced, and the telescopic clamp force thereof can be increased.

Also, according to the steering apparatus disclosed in (5), the lock housing and steering column (outer column) cannot be separated from each other and thus, in a state where the steering shaft and steering column are left supported at given positions, the head portion of the lock housing fixing screw cannot be operated with a tool. Owing to this, while securing the freedom of the design of the steering apparatus, the anti-theft function thereof can be enhanced.

Also, since the steering column and lock housing are formed as an integral body or are combined together in an integral manner, the assembling operation of the steering apparatus can be facilitated and thus the manufacturing cost of the lock apparatus can be reduced. Further, the size and weight of the whole steering apparatus with the lock apparatus incorporated therein can be reduced.

Further, according to the steering apparatus disclosed in (10), the lock housing for mounting the lock unit onto the outer column is formed such that it does not project rightward or leftward of the outer column but projects downward thereof. Owing to this, the lock housing of the steering apparatus according to the invention can be mounted onto both of a right-hand drive vehicle and a left-hand drive vehicle. That is, since only one lock housing is necessary, in a state where the steering apparatus is mounted on the vehicle, there is no possibility that there can occur a lock housing which is not in use.

Further, even when, as a fastening force by the clamp device is applied, there is generated internal stress in the outer column, the front plate portion can prevent a crack from occurring between the slit and through hole.

Also, the lock housing of the steering apparatus of the invention is formed to have any one of the following structures: that is, a box-like structure; a structure including a front plate portion, a rear plate portion and a side plate portion; and, a structure including a front plate portion and a rear plate portion. Therefore, when compared with a structure employing a plane lock housing (mounting portion), the mounting position of the lock unit is hard to shift and the mounting strength of the lock unit can be secured easily.

BRIEF DESCRIPTION OF THE DRAWINGS

FIG. 47A shows a state where a steering shaft is locked by a key, while FIG. 47B shows a state where the locked state of the steering shaft by the key is removed.

DESCRIPTION OF REFERENCE NUMERALS AND SIGNS

Figure 1:
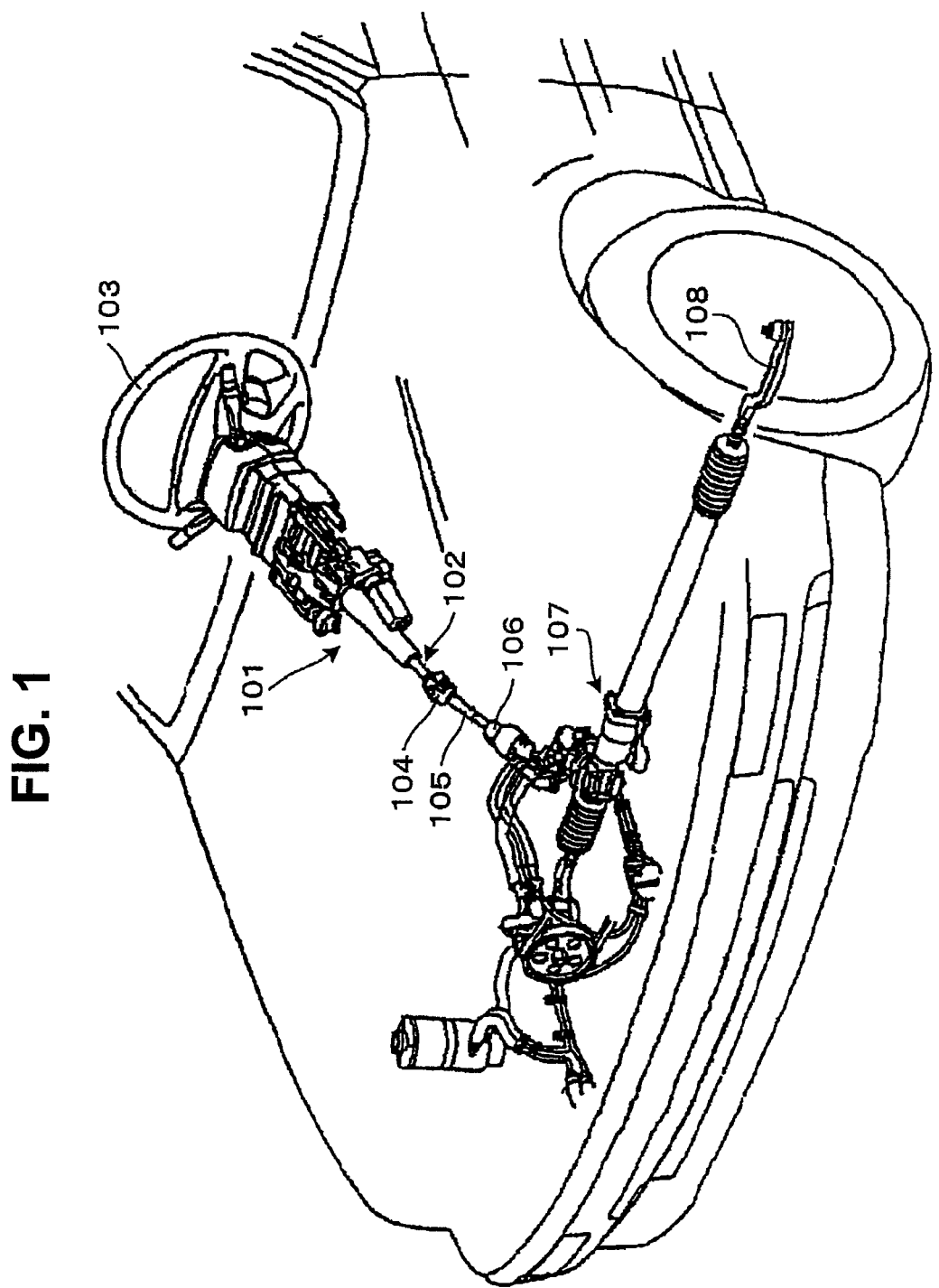
FIG. 1 is a perspective view of the whole of a steering apparatus according to a first embodiment of the invention, showing a state where it is mounted on a vehicle.

101: Steering apparatus
102: Steering shaft
102A: Upper steering shaft
102B: Lower steering shaft
103: Steering wheel
104: Universal joint
105: Intermediate shaft
106: Universal joint
107: Steering gear
108: Tie rod
11: Vehicle body
12: Vehicle mounting lower bracket
2: Vehicle mounting upper bracket
21: Upper plate
22: Left side plate
23: Right side plate
24: Capsule
25: Tilt adjusting elongated groove
3: Inner column (lower column)
31: Bracket
32: Tilt center collar
33: Bolt
4: Outer column (upper column)
41: Telescopic adjusting elongated groove
42: Outer periphery
43: Slit
44: Lock pin elongated hole
45: Crack
46: Side surface (column fastening surface)
5: Fastening rod
6: Operation lever
7: Lock apparatus
71: Lock housing
711: Projecting end
72: Connecting portion
73: Electronic unit
73A: Lock pin
74: Vehicle body forward side surface
75: Vehicle body rearward side plate
76, 77: Rib
78, 79: Rib
1001: Vehicle body
1002, 1002*a*, 1002*b*, 1002*c*: Steering column
1003, 1003*a*, 1003*b*: Steering shaft
1004: Steering wheel
1005*a*, 1005*b*: Universal joint
1006: Intermediate shaft
1007: Steering gear unit
1008: Tie rod
1009, 1009*a*, 1009*b*: Lock housing
1010: Clamp metal member
1011: Bolt
1012: Storage portion
1013: Bottom plate portion
1014: Mounting flange
1015: Key lock groove
1016, 1016*a*: Lock unit
1017, 1017*a*: Fixing screw
1018: Recessed hole
1019, 1019*a*, 1019*b*, 1019*c*: Screw hole
1020: Actuator
1021, 1021*a*: Lock pin
1022, 1022*a*: Head portion
1023: Slit
1024: Elongated hole
1025: Bracket portion
1026: Through hole
1027, 1027*a*: Lock collar
1028, 1028*a*: Second through hole
1029: Shaft portion
1030: Recessed portion
1031: Third through hole
1032: Backup piece
1033: Recessed portion
1034: Input shaft
2001: Steering wheel
2002, 2002*a*, 2002*b*: Steering shaft
2003, 2003*a*, 2003*b*, 2003*c*: Steering column
2004: Universal joint
2005: Intermediate shaft
2006: Universal joint
2007: Steering gear unit
2008: Tie rod
2009: Front wheel
2010, 201*a*: Outer column
2011: Inner column
2012: Transverse shaft
2013: Slit
2014: Clamp device
2015: Lever
2016: Outer shaft
2017: Inner shaft
2018: Lock pin
2019, 2019*a*: Key lock collar
2020, 2020*a*, 2020*b*: Through hole
2021: Key lock hole
2022*a*, 2022*b*: Mounting portion
2023, 2023*a*, 2023*b*, 2023*c*: Lock housing
2024, 2024*a*: Front plate portion
2025, 2025*a*: Rear plate portion
2026*a*, 2026*b*: Connecting plate portion
2027*a*, 2027*b*: Side plate portion
2028, 2028*a*: Insertion hole
2029: Lock unit 2030: Cylindrical portion
2031, 2031a: Held portion
2032: Concave surface portion
2033: Cylinder hole
2034: Insertion hole
2035, 2035a to 2035d: Bolt
2036, 2036b to 2036d: Shaft portion
2037, 2037a: Head portion
2038: Nut
2039: Hexagonal hole
2040: Washer
2041: Tubular portion
2042: Friction sleeve
2042b to 2042d: Engaging portion
2043, 2043a, 2043b: Second slit
2044, 2044a: Connecting band
2045: Insertion hole
2046: Thickness reduced portion
2047: Key lock groove

BEST MODE FOR IMPLEMENTING THE INVENTION

First to Fourth Embodiments

First to fourth embodiments according to the invention respectively relate to a steering apparatus which includes a lock housing and a column high in rigidity and light in weight and can apply a large telescopic clamp force. In the following embodiments, description will be given below of an example in which the invention is applied to a tilt/telescopic type of steering apparatus for adjusting the positions of both of the vertical-direction position and longitudinal-direction position of a steering wheel.

First Embodiment

FIG. 1 is a perspective view of the whole of a steering apparatus 101 according to a first embodiment of the invention, showing a state where it is mounted on a vehicle. The steering apparatus 101 supports a steering shaft 102 rotatably. On the upper end (vehicle body rear side) of the steering shaft 102, there is mounted a steering wheel 103 and, on the lower end side (vehicle body front side) of the steering shaft 102, there is connected an intermediate shaft 105 through a universal joint 104.

To the lower end of the intermediate shaft 105, there is connected a universal joint 106 and, to the universal joint 106, there is connected a steering gear 107 constituted of a rack and pinion mechanism and the like.

When a driver operates and rotates the steering wheel 103, the rotation force of the steering wheel 103 is transmitted to the steering gear 107 through the steering shaft 102, universal joint 104, intermediate shaft 105 and universal joint 106 to move a tie rod 108 through the rack and pinion mechanism, thereby being able to change the steering angle of the front wheel of the vehicle.

Figure 2:
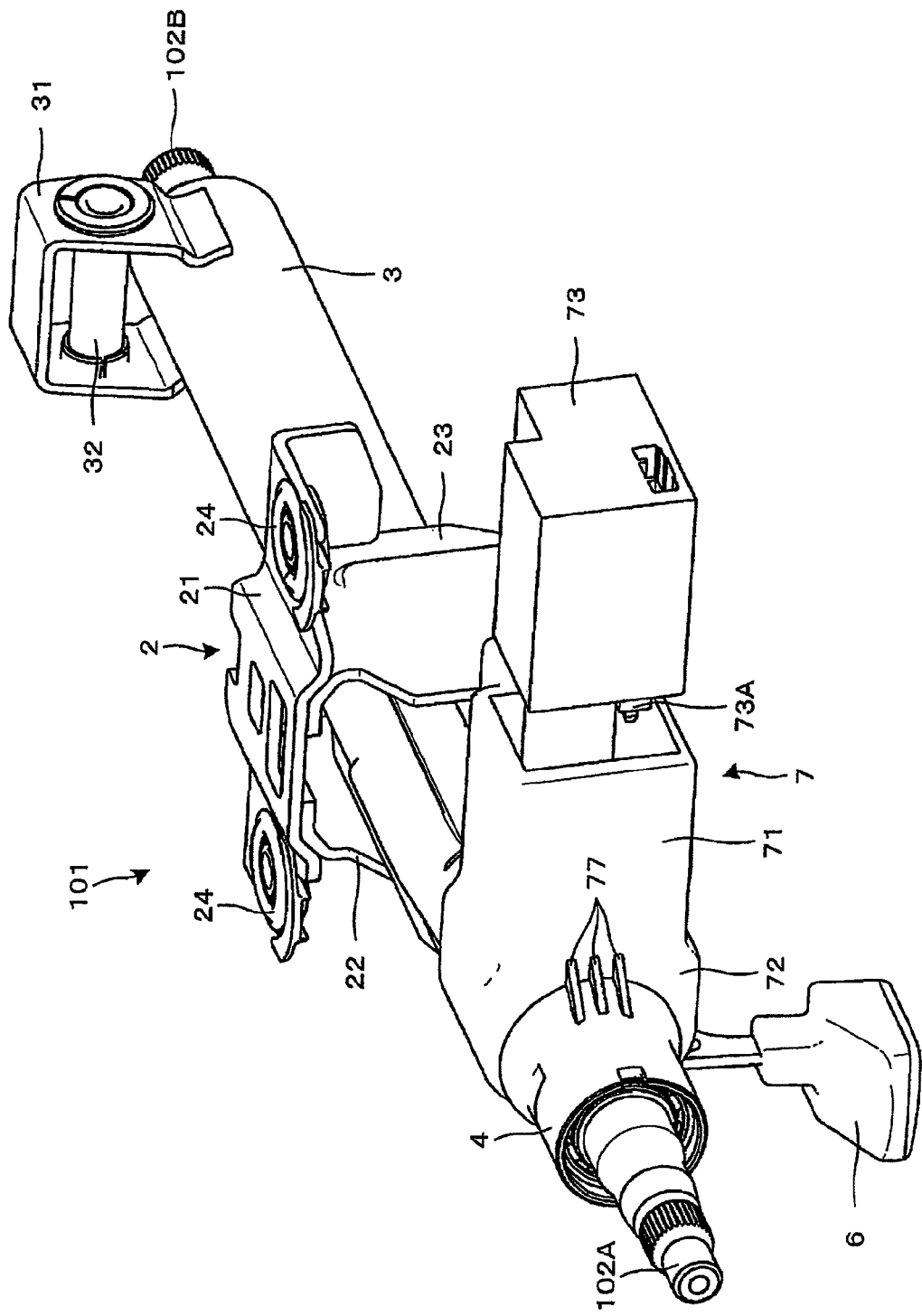
FIG. 2 is a perspective view of the main portions of the steering apparatus according to the first embodiment of the invention.
Figure 3:
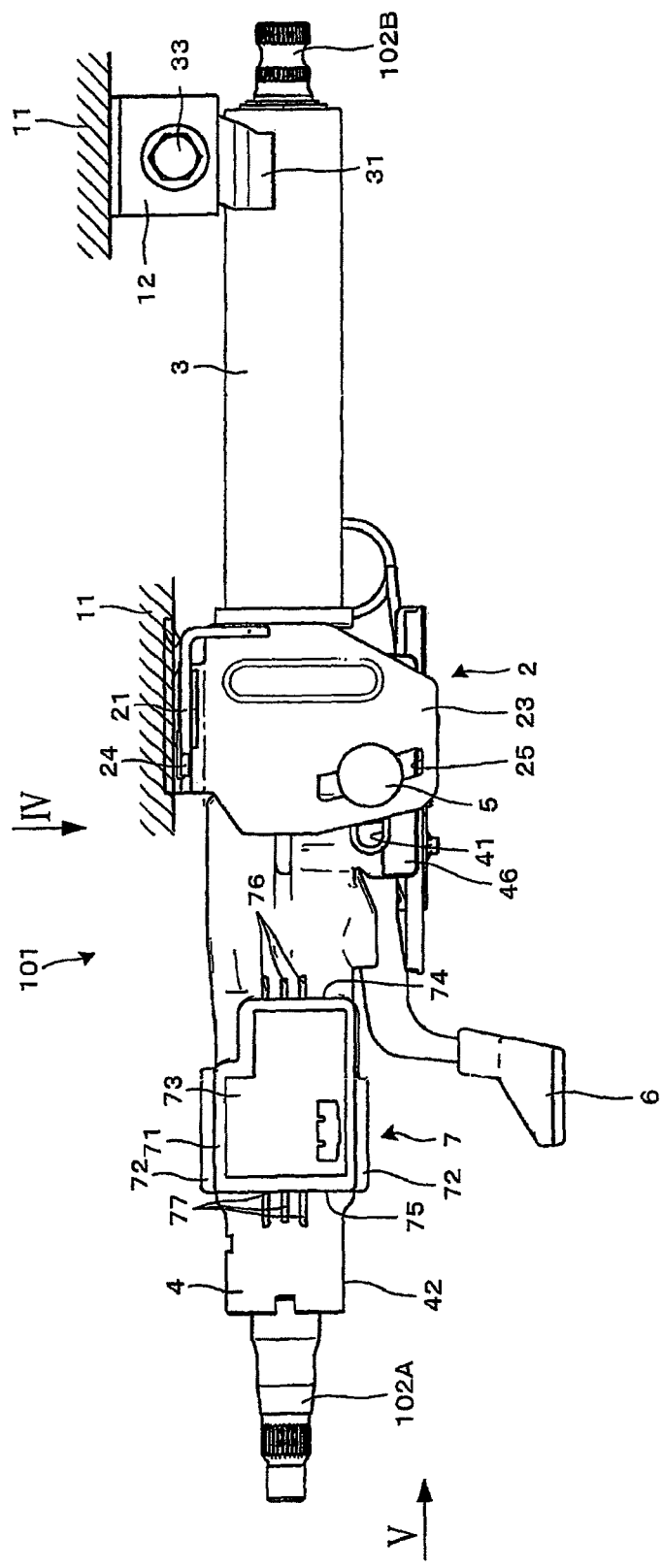
FIG. 3 is a side view of the main portions of the steering apparatus according to the first embodiment of the invention.

FIG. 2 is a perspective view of the main portions of the steering apparatus according to the first embodiment of the invention. As shown in FIGS. 2 to 5, the steering apparatus 101 of the invention includes a vehicle body mounting upper bracket 2, an inner column (lower column) 3, an outer column (upper column) 4 and the like.

Referring here to a vehicle body mounting upper bracket 2 which is disposed on the vehicle rear side (in FIGS. 2 to 4, the left side), its upper plate 21 is fixed to a vehicle body 11 (see FIGS. 3 and 5) through capsules 24 and 24.

In the vehicle body front side end portion of the inner column 3, there is formed a bracket 31 integrally therewith. The bracket 31 is connected through a tilt center collar 32 to a lower bracket 12 by a bolt 33. The vehicle body mounting lower bracket 12 is fixed to the vehicle body 11. With the bolt 33 as a fulcrum, the vehicle body front side end portion of the hollow cylindrical inner column 3 is rotatably supported on the vehicle body 11 in such a manner that its tilt position can be adjusted (it can oscillate in a plane parallel to the sheet of FIG. 3).

With the outer surface of the outer periphery of the cylindrical inner column 3 on the vehicle body rear side (in FIGS. 2 to 4, on the left side), there is fitted the inner periphery of the hollow cylindrical outer column 4 in such a manner that its telescopic position can be adjusted (it can slide parallel to the center axis of the inner column 3).

The outer column 4 is formed of a magnesium alloy by casting such as by die casting. The material of the outer column 4 is not limited to the magnesium alloy but there may also be used an aluminum alloy, a zinc alloy, a titanium alloy, and case iron.

On the outer column 4, there is rotatably supported an upper steering shaft 102A and, to the end portion of the upper steering shaft 102A on the vehicle rear side, there is fixed the steering wheel 3 (see FIG. 1).

On the inner column 3, there is rotatably supported a lower steering shaft 102B, while the lower steering shaft 102B is spline fitted with the upper steering shaft 102A. Therefore, regardless of the telescopic position of the outer column 4, the rotation of the upper steering shaft 102A can be transmitted to the lower steering shaft 102B.

The vehicle body front side (in FIGS. 2 to 4, the right side) of the lower steering shaft 102B is connected through the universal joint 104 (see FIG. 1) to the steering gear 107 (see FIG. 1). When a driver turns the steering wheel 103 by hands, the lower steering shaft 102B is rotated through the upper steering shaft 102A to thereby be able to change the steering angle of the vehicle front wheel.

As shown in FIGS. 2 to 5, the upper plate 21 of the vehicle body mounting upper bracket 2 includes a left side plate 22 and a right side plate 23 respectively extending downwardly parallel to each other. By and between the respective inner surfaces of the left and right side plates 22 and 23, there are held the right and left side surfaces 46 (column fastening surfaces) of the outer column 4 in such a manner that they can slide tiltingly and telescopically.

In the left and right side plates 22 and 23 of the vehicle body mounting upper bracket 2, there are respectively formed tilt adjusting elongated grooves 25. Also, in the right and left side surfaces 46 of the outer column 4, there are formed telescopic adjusting elongated grooves 41 respectively. Into the tilt adjusting elongated grooves 25 and telescopic adjusting elongated grooves 41, there is inserted a round-bar-like fastening rod 5 from a direction perpendicular to the sheet surface of FIG. 3.

When an operation lever 6 mounted on the left end (in FIG. 5, the left side end) of the fastening rod 5 is operated and oscillated, a cam lock mechanism constituted of a fixed cam and a movable cam is operated to thereby fasten the left and right side plates 22 and 23 of the vehicle body mounting upper bracket 2. As a result of this, the left and right side surfaces 46 of the outer column 4 are fastened strongly against the left and right side plates 22 and 23 of the vehicle body mounting upper bracket 2.

Here, the outer column 4 has a slit (not shown) formed in the lower surface thereof. That is, in this case, the slit of the outer column 4 is compressed and thus the diameter of the outer column 4 is reduced, thereby fastening the outer periphery of the inner column 3 strongly. Owing to this, the outer column 4 is clamped by the vehicle body mounting upper bracket 2 at desired tilt position and telescopic position.

As shown in FIGS. 2 to 5, on the vehicle body rear side of the outer column 4, there is formed the lock housing 71 of a lock apparatus 7 integrally with the outer column 4 by die casting. In the lock housing 71 of the lock apparatus 7, there is incorporated an electronic unit 73 which includes an operation mechanism for operating a lock pin 73A (see FIG. 2) using an actuator (not shown). The lock pin 73A is engaged with the key lock groove of the upper steering shaft 102A to thereby lock the steering shaft 102 against rotation.

The lock housing 71 is formed to have a hollow box shape which projects from the outer column 4 rightward in the vehicle width direction. When it is viewed in FIG. 5, the lock housing 71 is symmetric in the vertical direction, while its height H1 is set substantially equal to the outside diameter dimension of the cylindrical outer periphery 42 of the outer column 4. Also, the height H2 of the connecting portion 72 between the outer periphery 42 of the outer column 4 and lock housing 71 is set larger than the outside diameter dimension of the outer periphery 42 of the outer column 4.

Therefore, since a connecting surface between the outer periphery 42 of the outer column 4 and connecting portion 72 is formed substantially ¾ of the periphery of the outer periphery 42 of the outer column 4, the connecting strength between the lock housing 71 and outer column 4 can be increased. Owing to this, the lock pin elongated hole can be designed small. Also, since the height H2 of the connecting portion 72 is large, the rigidity of the connecting portion 72 itself is also enhanced.

Also, as shown in FIGS. 2 to 5, on the vehicle body front side and rear side side surfaces 74 and 75 of the lock housing 71, there are provided three thin-plate-shaped ribs 76 and 77 apiece which are used to connect the outer periphery 42 of the outer column 4 to the vehicle body front side side surface 74 and connect the outer periphery 42 of the outer column 4 to the vehicle body rear side side surface 75.

Figure 4:
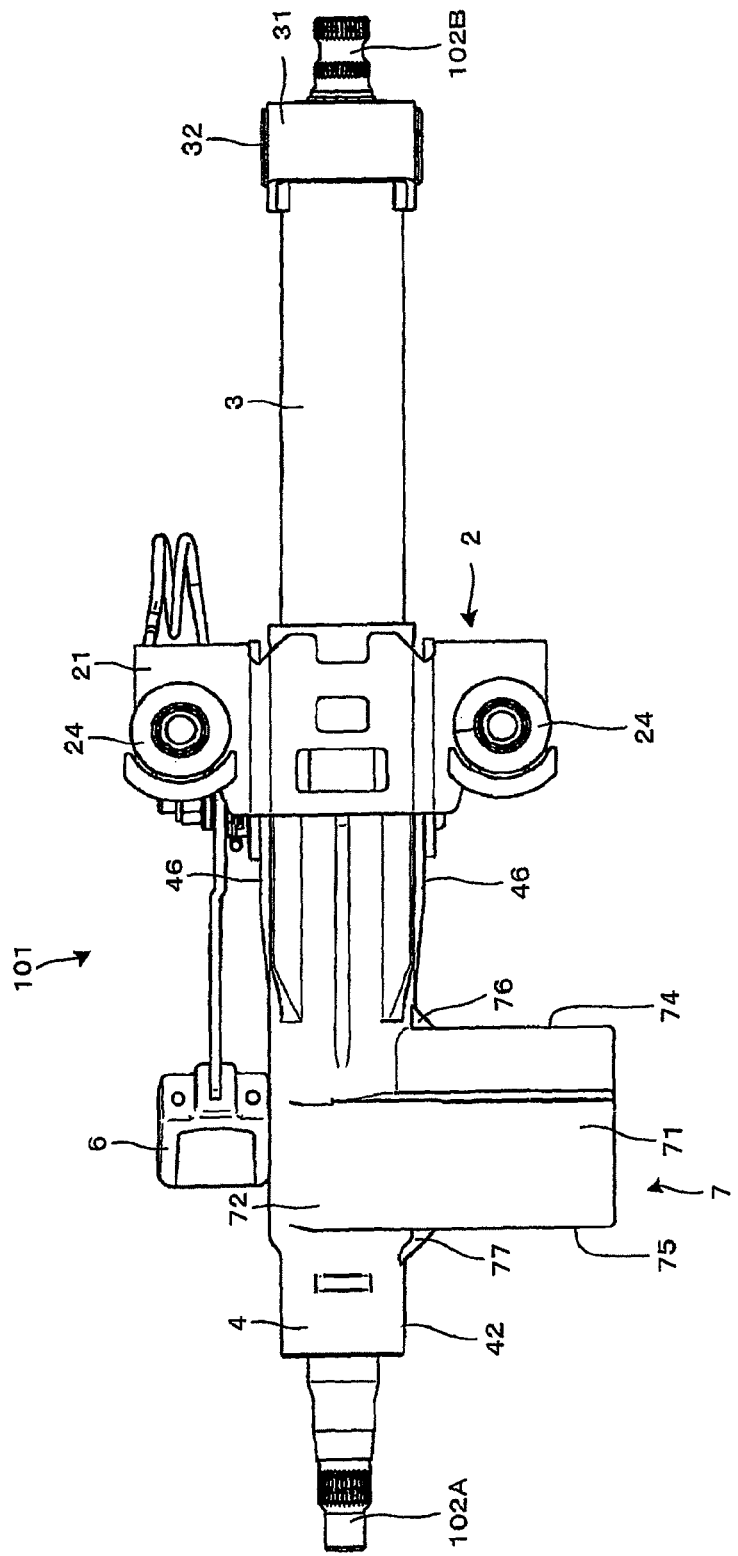
FIG. 4 is a view taken along the IV arrow line shown in FIG. 3.
Figure 5:
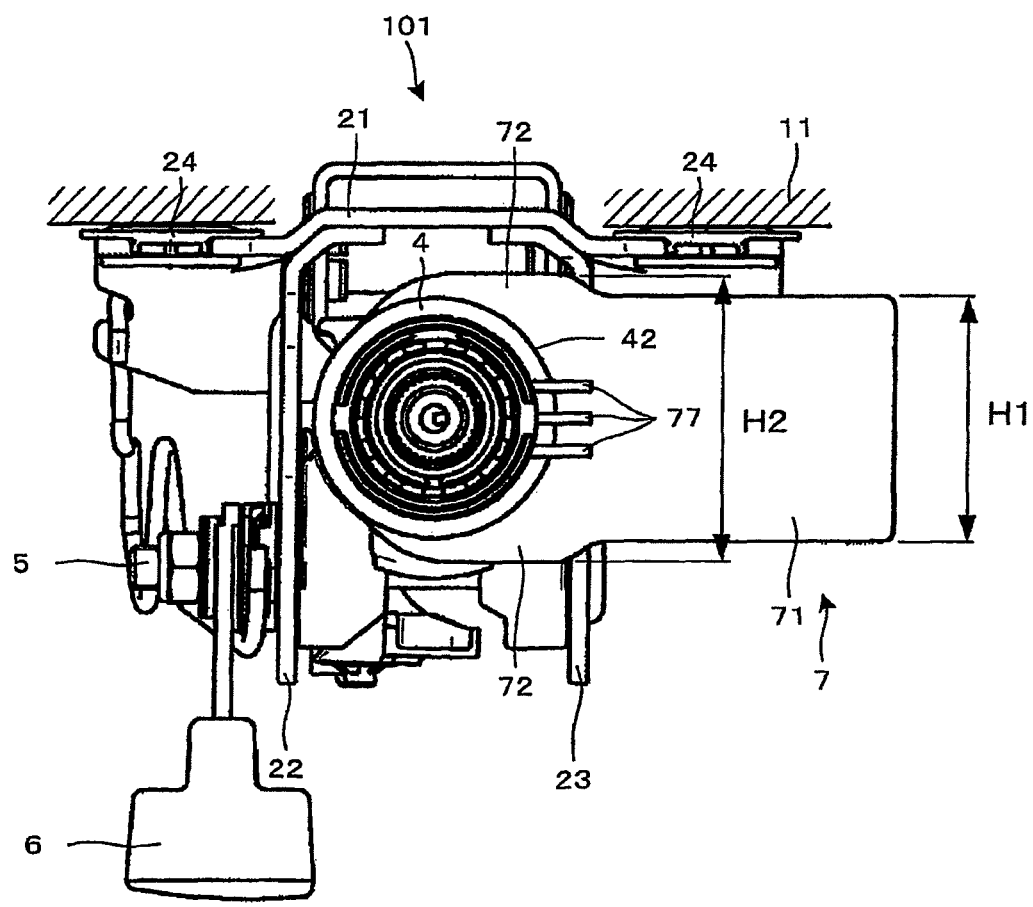
FIG. 5 is a view taken along the V arrow line shown in FIG. 3.

Each rib 76 extends from the vehicle body forward side surface 74 toward the vehicle body front side parallel to the axis of the outer column 4. Also, each rib 77 extends from the vehicle body rearward side surface 75 toward the vehicle body rear side parallel to the axis of the outer column 4. As shown in FIG. 4, the ribs 76 and 77 are respectively formed to have a substantially triangular shape. When the ribs 76 are respectively extended up to the right and left side surfaces 46 (column fastening surfaces) of the outer column 4, the strength thereof in the twisting direction can be enhanced.

Therefore, since the ribs 76, 77 increase the connecting strength between the outer column 4 and lock housing 71, the rigidity of the lock housing 71 is enhanced to thereby increase the strength thereof when the steering shaft is locked. Also, since the lock housing 71 itself may be light in weight, the weight of the whole steering apparatus can be reduced.

Also, since the strength of such portion of the outer column 4 as existing around the lock housing 71 is also enhanced, it is possible to prevent a crack from occurring in a slit formed in the lower surface of the outer column 4. This can reduce restrictions on the mounting position of the lock apparatus and also can increase the telescopic clamp force.

Second Embodiment

Figure 6:
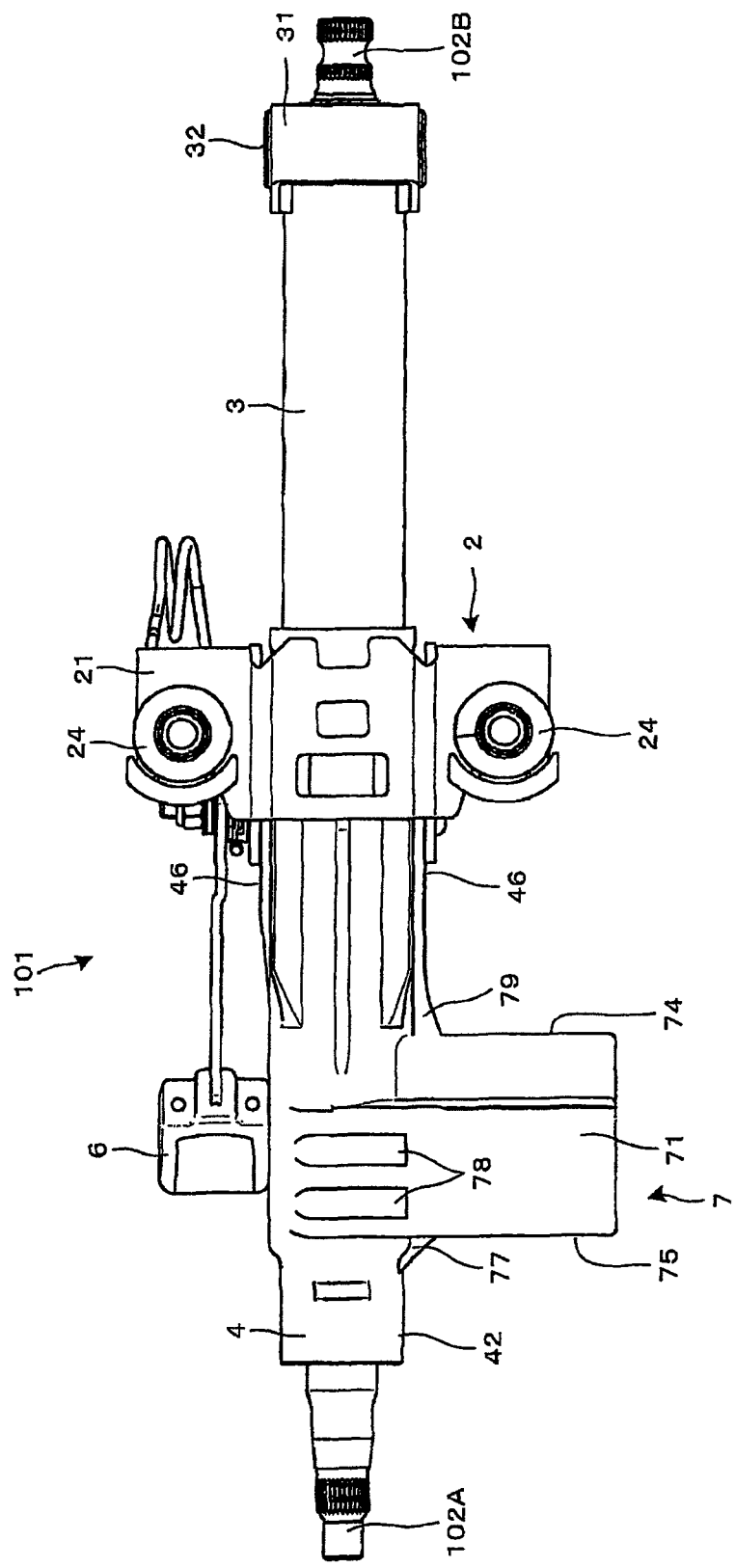
FIG. 6 is a view of the main portions of a steering apparatus according to a second embodiment of the invention, corresponding to FIG. 4.

Next, description will be given below of a second embodiment according to the invention. FIG. 6 is a structure view of the main portions of a steering apparatus according to the second embodiment of the invention, corresponding to FIG. 4. In the following description, description will be given only of the structural portions of the second embodiment different from the above-mentioned first embodiment and thus the duplicate description of the same portions is omitted here. Also, the same parts are given the same reference numerals.

The second embodiment provides the modified versions of the shape of the connecting portion between the outer periphery 42 of the outer column 4 and lock housing 71 and the shape of the vehicle body front side side surface 74 of the lock housing 71.

As shown in FIG. 6, in the second embodiment as well, similarly to the first embodiment, on the vehicle body rear side of the outer column 4, there is formed the lock housing 71 of the lock apparatus 7 integrally with the outer column 4 by die casting.

The lock housing 71 is formed to have a hollow box shape which projects from the outer column 4 to the right in the vehicle width direction. Also, the outer periphery 42 of the outer column 4 and lock housing 71 are connected together by two ribs 78 which respectively project in the radial direction of the outer periphery 42 of the outer column 4 further outwardly than the outside diameter dimension of the outer periphery 42. This structure can increase the connecting strength between the outer periphery 42 of the outer column 4 and lock housing 71.

Also, as shown in FIG. 6, on the vehicle body forward side surface 74 and rearward side surface 75 of the lock housing 71, there are provided multiple thin-plate-shaped ribs 79 and 77 which are respectively used to connect the outer periphery 42 of the outer column 4 to the vehicle body forward side surface 74 and to connect the outer periphery 42 of the outer column 4 to the vehicle body backward side surface 75.

Each rib 79 extends from the vehicle body forward side surface 74 forwardly of the vehicle body parallel to the axis of the outer column 4 up to the side surface 46 (column fastening surface) of the outer column 4, thereby enhancing the strength in the twist direction of the outer column 4. Each rib 77 for connecting together the outer periphery 42 of the outer column 4 and the vehicle body backward side surface 75 has the same shape as the rib used in the first embodiment.

Thus, in the present embodiment, due to provision of such ribs 79 and 77, the connecting strength between the outer column 4 and lock housing 71 is greater than that in the first embodiment. This can enhance the rigidity of the lock housing 71 to thereby increase the strength of the lock housing 71 when the steering shaft is locked, and also can reduce the weight of the lock housing 71 itself to thereby reduce the weight of the whole steering apparatus.

Also, since the strength of such portion of the outer column 4 as exists around the lock housing 71 is increased, it is possible to prevent the slit formed in the lower surface of the outer column 4 from cracking, whereby restrictions on the mounting position of the lock apparatus can be reduced and the telescopic clamp force of the outer column 4 can be increased easily.

Third Embodiment

Figure 7:
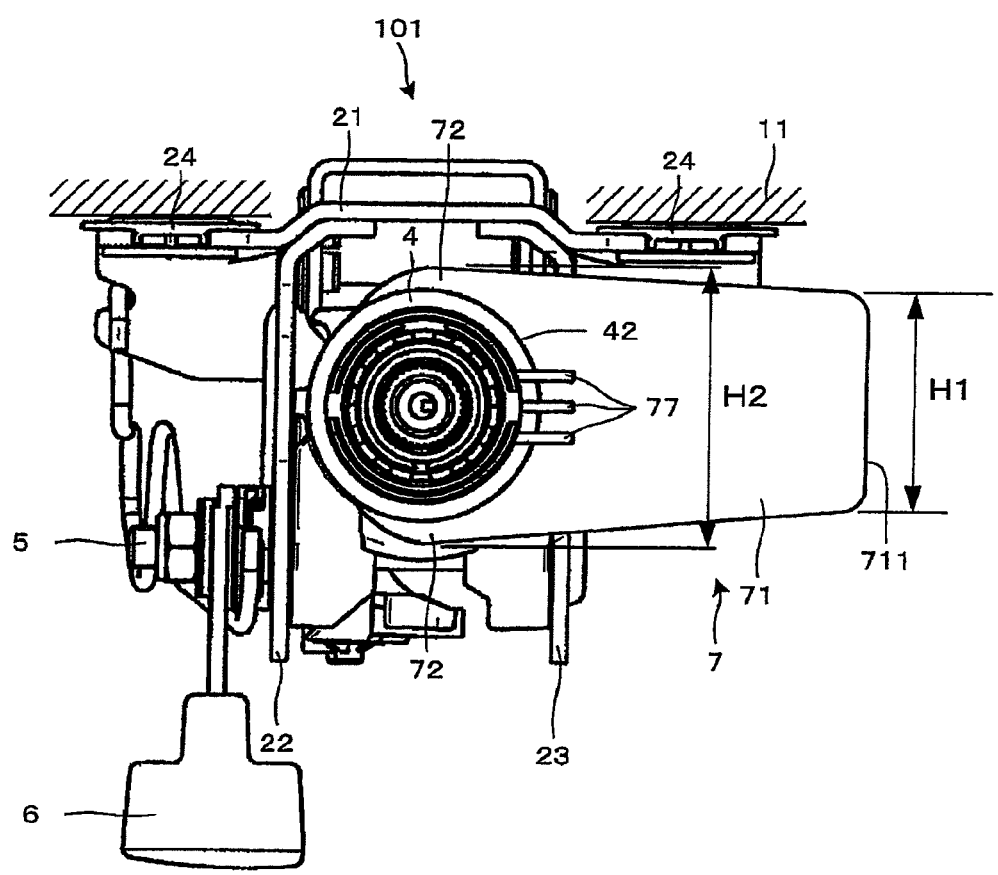
FIG. 7 is a view of the main portions of a steering apparatus according to a third embodiment of the invention, corresponding to FIG. 5.

Next, description will be given below of a third embodiment according to the invention. FIG. 7 is a structure view of the main portions of a steering apparatus according to the third embodiment of the invention, corresponding to FIG. 5. In the following description, description will be given only of such structural portions of the second embodiment as are different from the above-mentioned first embodiment and thus the duplicate description of the same portions is omitted here. Also, the same parts are given the same reference numerals.

The third embodiment provides the modified version of the shape of the lock housing 71. As shown in FIG. 7, in the third embodiment as well, on the vehicle body rear side of the outer column 4, there is formed the lock housing 71 of the lock apparatus 7 integrally with the outer column 4 by die casting.

The lock housing 71 is formed to have a hollow box shape which projects from the outer column 4 to the right in the vehicle width direction. That is, the housing 71, when it is viewed in FIG. 7, is symmetric in shape in the vertical direction and the height H1 of the right projecting end 711 of the housing 71 is substantially equal to the outside diameter dimension of the cylindrical outer periphery 42 of the outer column 4. Also, the height H2 of a connecting portion 72 between the outer periphery 42 of the outer column 4 and lock housing 71 is set larger than the outside diameter dimension of the cylindrical outer periphery 42 of the outer column 4, while the lock housing 71 is formed tapered from the connecting portion 72 toward the projecting end 711.

Since the connecting surface between the outer periphery 42 of the outer column 4 and connecting portion 72 is formed to extend substantially ¾ of the outer periphery 42 of the outer column 4, the connecting strength between the lock housing 71 and outer column 4 is increased. Also, since the height H of the connecting portion 72 is large, the rigidity of the connecting portion 72 itself can also be enhanced.

Also, in the third embodiment, similarly to the first embodiment, there are provided three thin-plate-shaped ribs (not shown) which are respectively used to connect the outer periphery 42 of the outer column 4 to the vehicle body forward side surface and three thin-plate-shaped ribs 77 which are respectively used to connect the outer periphery 42 of the outer column 4 to the vehicle body rearward side surface. In the third embodiment, since the shape of the lock housing 71 is simplified, the shape of a die for die casting the lock housing 71 can be simplified, thereby being able to enhance the formability of the lock housing 71.

Fourth Embodiment

Figure 8:
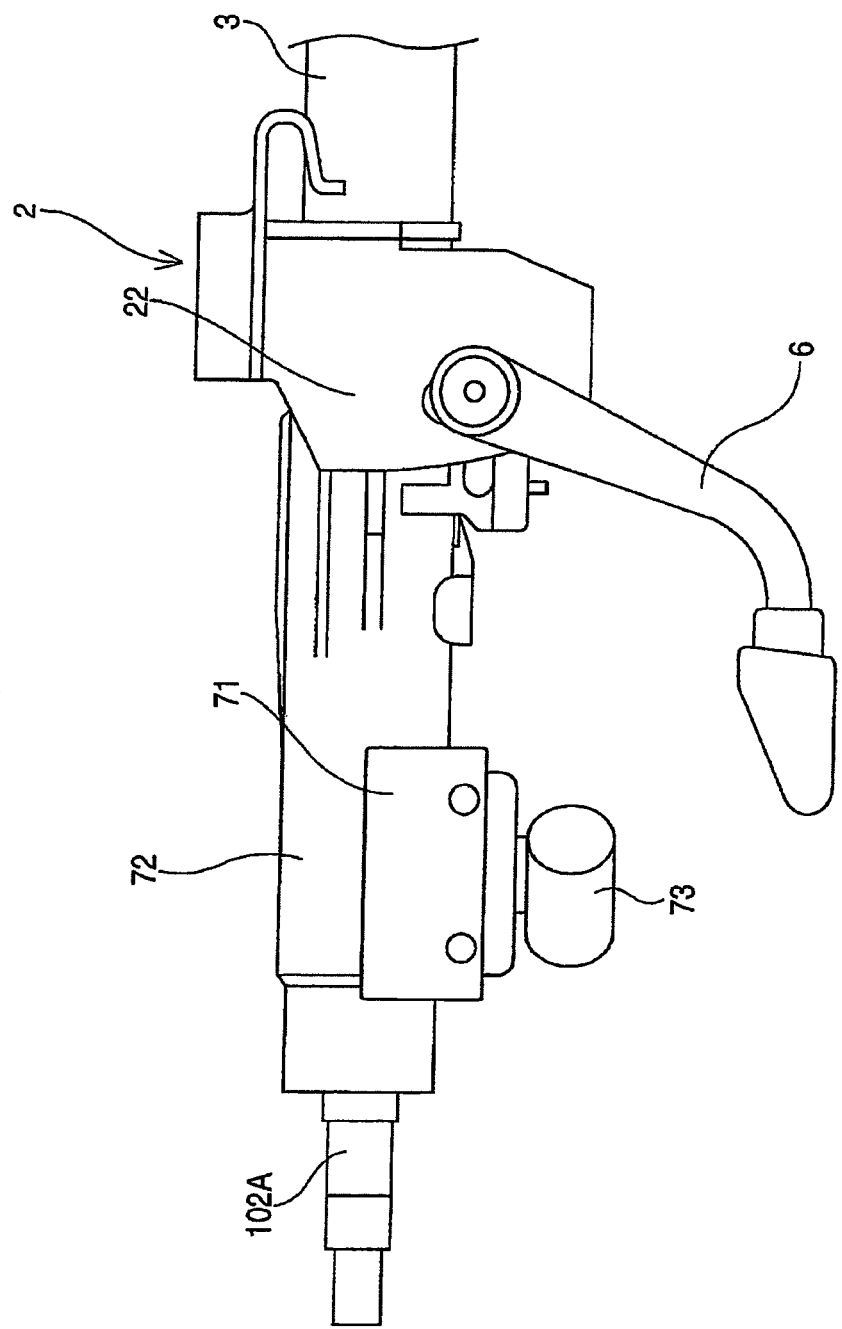
FIG. 8 is a perspective view of the main portions of a steering apparatus according to a fourth embodiment of the invention.
Figure 9:
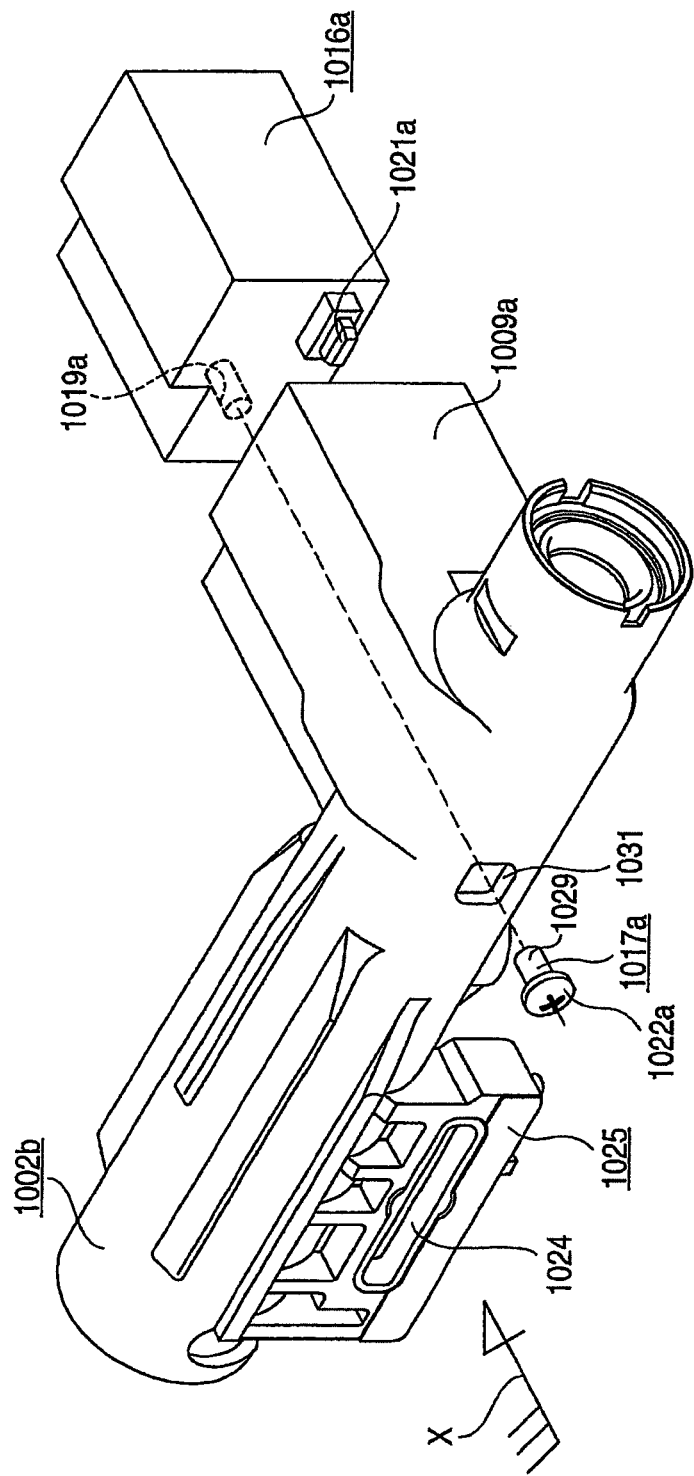
FIG. 9 is an exploded perspective view of a fifth embodiment according to the invention.
Figure 10:
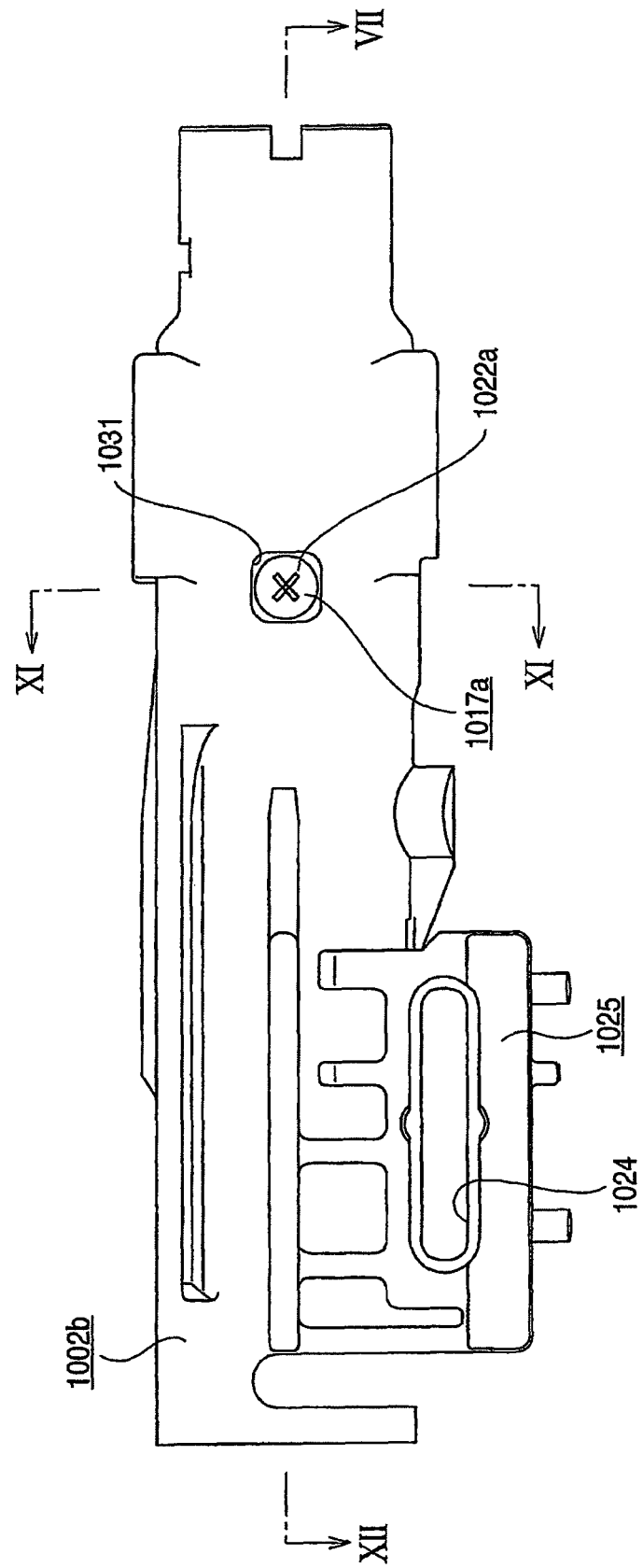
FIG. 10 is a view taken along the X arrow line shown in FIG. 9.
Figure 11:
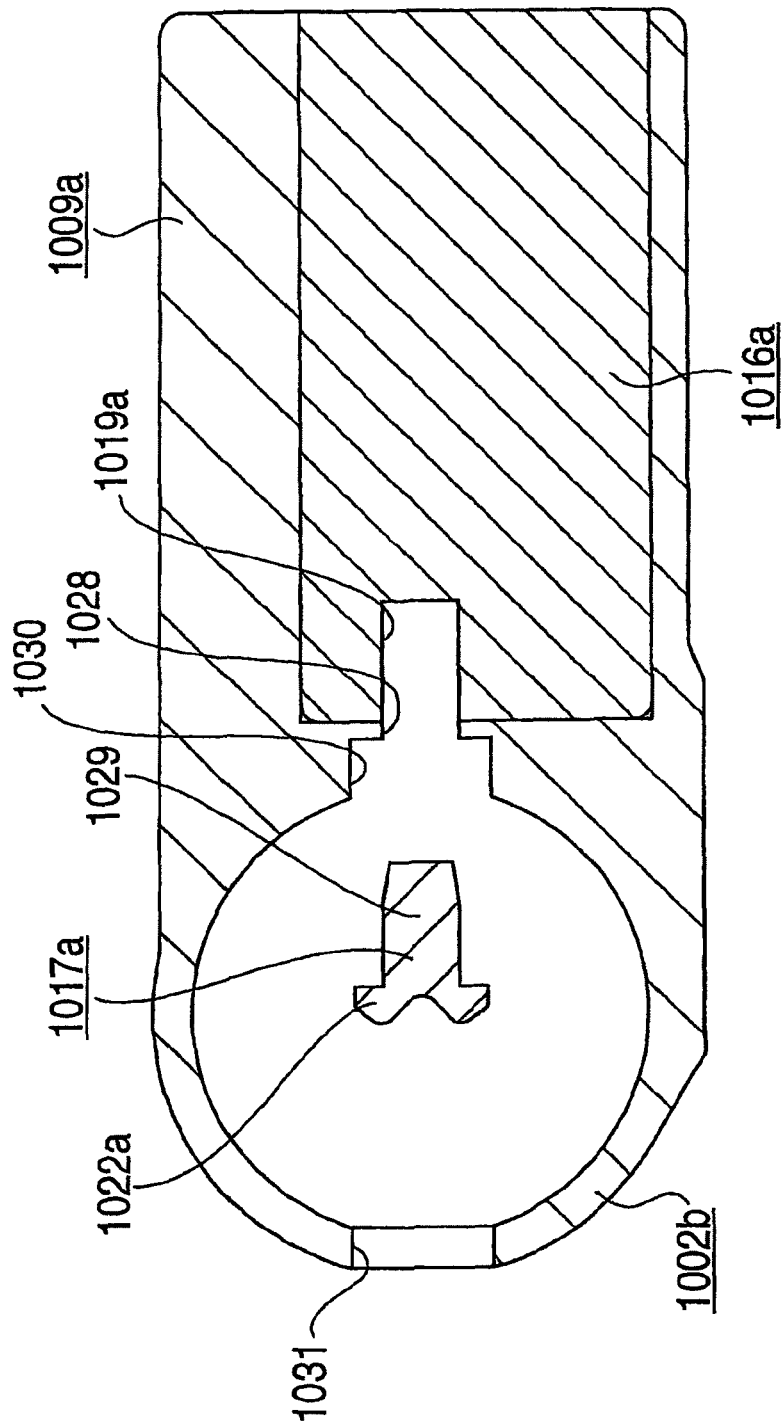
FIG. 11 is a section view taken along the XI-XI line shown in FIG. 10, showing the intermediate state of assembling the steering apparatus.

Next, description will be given below of a fourth embodiment according to the invention. FIG. 8 is a perspective view of the main portions of a steering apparatus according to the fourth embodiment of the invention. In the following description, description will be given only of such structural portions of the second embodiment as are different from the above-mentioned first embodiment and thus the duplicate description of the same portions is omitted here. Also, the same parts are given the same reference numerals.

The fourth embodiment provides an example in which the projecting direction of the lock housing 71 from the outer column 4 is set for a direction going downwardly of the vehicle body. As shown in FIG. 8, in the fourth embodiment as well, similarly to the first to third embodiments, on the vehicle body rear side of the outer column 4, there is formed the lock housing 71 of the lock apparatus 7 integrally with the outer column 4 by die casting.

Into the lock housing 71 of the lock apparatus 7, there is incorporated an electronic unit 73 having an operation mechanism which operates the lock pin 73A (see FIG. 2) using an actuator (not shown). In operation, the lock pin 73A is engaged into the key lock groove of the upper steering shaft 102A to thereby prevent the steering shaft 102 (see FIG. 1) against rotation.

The lock housing 71 is formed as a hollow box which projects from the outer column 4 downwardly of the vehicle body and the vehicle body downward side of which is opened. The lock housing 71 is symmetric in shape in the vehicle body right and left direction, and the width of the lock housing 71 in the vehicle body right and left direction is set substantially equal to the outside diameter dimension of the cylindrical outer periphery 42 of the outer column 4. Also, the width of a connecting portion between the outer periphery 42 of the outer column 4 and lock housing 71 in the vehicle body right and left direction is set larger than the outside diameter dimension of the outer periphery 42 of the outer column 4.

Since the connecting surface between the outer periphery 42 of the outer column 4 and connecting portion 72 is formed to extend substantially ¾ of the outer periphery 42 of the outer column 4, the connecting strength between the lock housing 71 and outer column 4 is increased, thereby being able to reduce the size of the lock pin elongated hole. Also, since the width of the connecting portion 72 in the vehicle body right and left direction is large, the rigidity of the connecting portion 72 itself is enhanced. The extension range of the connecting surface between the outer periphery 42 of the outer column 4 and connecting portion 72 is not limited to ¾ of the outer periphery 42 of the outer column 4, but it may also be selected differently depending on cases; for example, ½ to ⅘ of the outer periphery 42 of the outer column 4 can also be selected.

Also, although not shown, on the vehicle body forward side (in FIG. 8, the left) surface and backward side (in FIG. 8, the right) surface of the lock housing 71, there may be provided multiple thin-plate-shaped ribs which are respectively used to connect the outer periphery 42 of the outer column 4 to the vehicle body forward side surface and to connect the outer periphery 42 of the outer column 4 to the vehicle body rearward side surface.

Therefore, since the strength of such portion of the outer column 4 as exists around the lock housing 71 is increased, it is possible to prevent the slit formed in the lower surface of the outer column 4 from cracking, whereby restrictions on the mounting position of the lock apparatus can be reduced and the telescopic clamp force of the outer column 4 can be increased easily.

In the previously described first to third embodiments, the lock housing 71 is formed to project from the outer column 4 in the vehicle width direction. When the lock housing 71 is formed to project from the outer column 4 in the vehicle width direction, preferably, there can be avoided a possibility that the knees of a driver can hit against the lock housing 71, and also the visibility of a meter panel can be enhanced.

In the fourth embodiment, since the lock housing 71 is formed to project from the outer column 4 in the vehicle downward direction, the visibility of a meter panel can be enhanced. Also, before the steering apparatus is mounted onto the vehicle body, when assembling peripheral parts to the steering apparatus, the steering apparatus may be turned upside down. In this case, when the lock housing 71 projects from the outer column 4 in the vehicle downward direction, it is easy to incorporate the electronic unit 73 of the lock apparatus 7 and arrange wiring.

Also, when die-cast forming the right and left side surfaces 46 (column fastening surfaces) of the outer column 4, the mold removing direction provides the vehicle width direction (a direction perpendicular to the right and left side surfaces 46 of the outer column 4). Therefore, when the lock housing 71 is formed to project from the outer column 4 in the vehicle width direction, preferably, it is easy to form the lock housing 71. Also, as in the fourth embodiment, when the lock housing 71 is formed to project from the outer column 4 in the vehicle downward direction, the mold removability is good when the mold removing direction provides the vehicle body vertical direction.

Although, in the first to fourth embodiments, the inner column 3 is constituted of a lower column and the outer column 4 is constituted of an upper column, the inner column 3 may also be constituted of an upper column and the outer column 4 may also be constituted of a lower column. In the above embodiments, there is formed a slit in the lower surface of the outer column 4 and the space of this slit is compressed to fasten the outer periphery of the inner column 3. Also, the slit structure may also be applied to a column structured such that only the lower portions of the column fastening surfaces 46 are connected together to connect together the column fastening surfaces 46.

Also, in the first to fourth embodiments, description has been given of an example in which the invention is applied to a tilt/telescopic type of steering apparatus capable of adjusting both its tilt position and telescopic position. However, the invention may also be applied to a steering apparatus capable of adjusting one of its tilt position and telescopic position; or, to a steering apparatus structured such that it adjusts neither its tilt position nor its telescopic position. Further, on the portion near to the mounting position of the vehicle body mounting lower bracket 12, there may be mounted the reduction mechanism of an electric power steering apparatus.

Fifth to Tenth Embodiments

Next, description will be given below of fifth to tenth embodiments according to the invention.

The fifth to tenth embodiments respectively relate to a steering apparatus which can enhance the rigidity of a housing and also, while securing the freedom of the design of the steering apparatus, can enhance its antitheft function.

Prior to description of the fifth to tenth embodiments according to the invention, description will be given of the structure and problems of a conventional steering apparatus to thereby make clear the improvements that can be made by the fifth to tenth embodiments.

Figure 22:
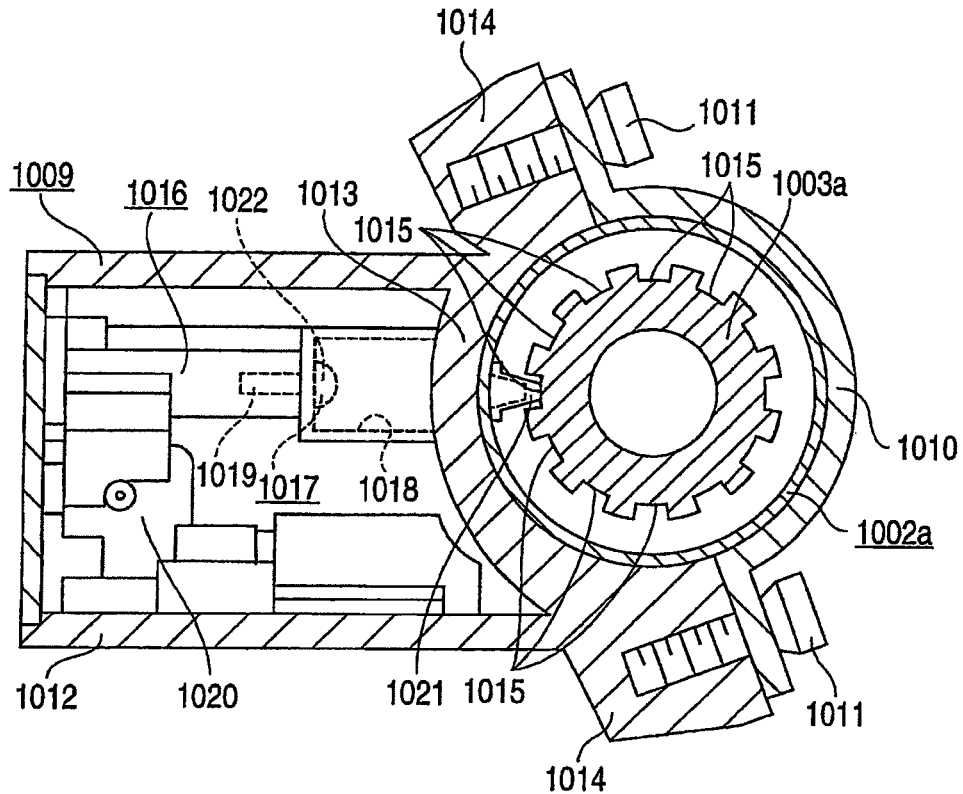
FIG. 22 is a section view of an example of a conventional structure of a lock apparatus.
Figure 23:
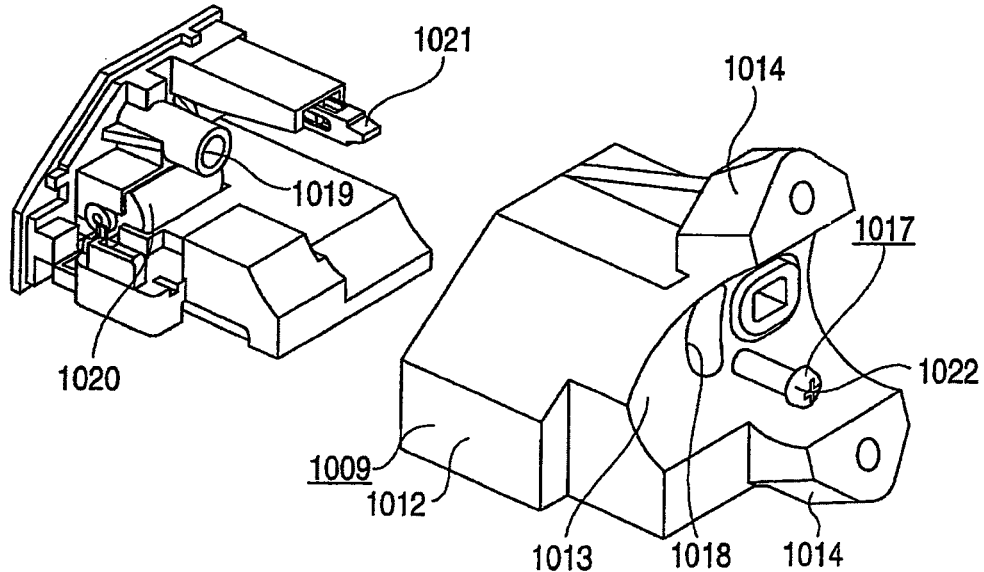
FIG. 23 is an exploded perspective view of a lock housing and a lock unit.

FIGS. 22 and 23 respectively show a conventional steering apparatus disclosed in the patent reference 1. In this steering apparatus, on the inside diameter side of a cylindrical steering column 1002 supported on a vehicle body 1001, there is rotatably supported a steering shaft 1003. To the rear end portion of the steering shaft 1003 that projects backwardly beyond the rear end opening of the steering column 2, there is fixed a steering wheel 1004.

When rotating the steering wheel 1004, the rotation of the steering wheel 1004 is transmitted through the steering shaft 1003, universal joint 1005a, intermediate shaft 1006 and universal joint 1005b to the input shaft 1034 of a steering gear unit 1007. When the input shaft 1034 is rotated, a pair of tie rods 1008 and 1008 respectively disposed on both sides of the steering gear unit 1007 are pushed and pulled to apply a steering angle, which corresponds to the operation amount of the steering wheel 1004, to a pair of right and left front wheels.

Figure 21:
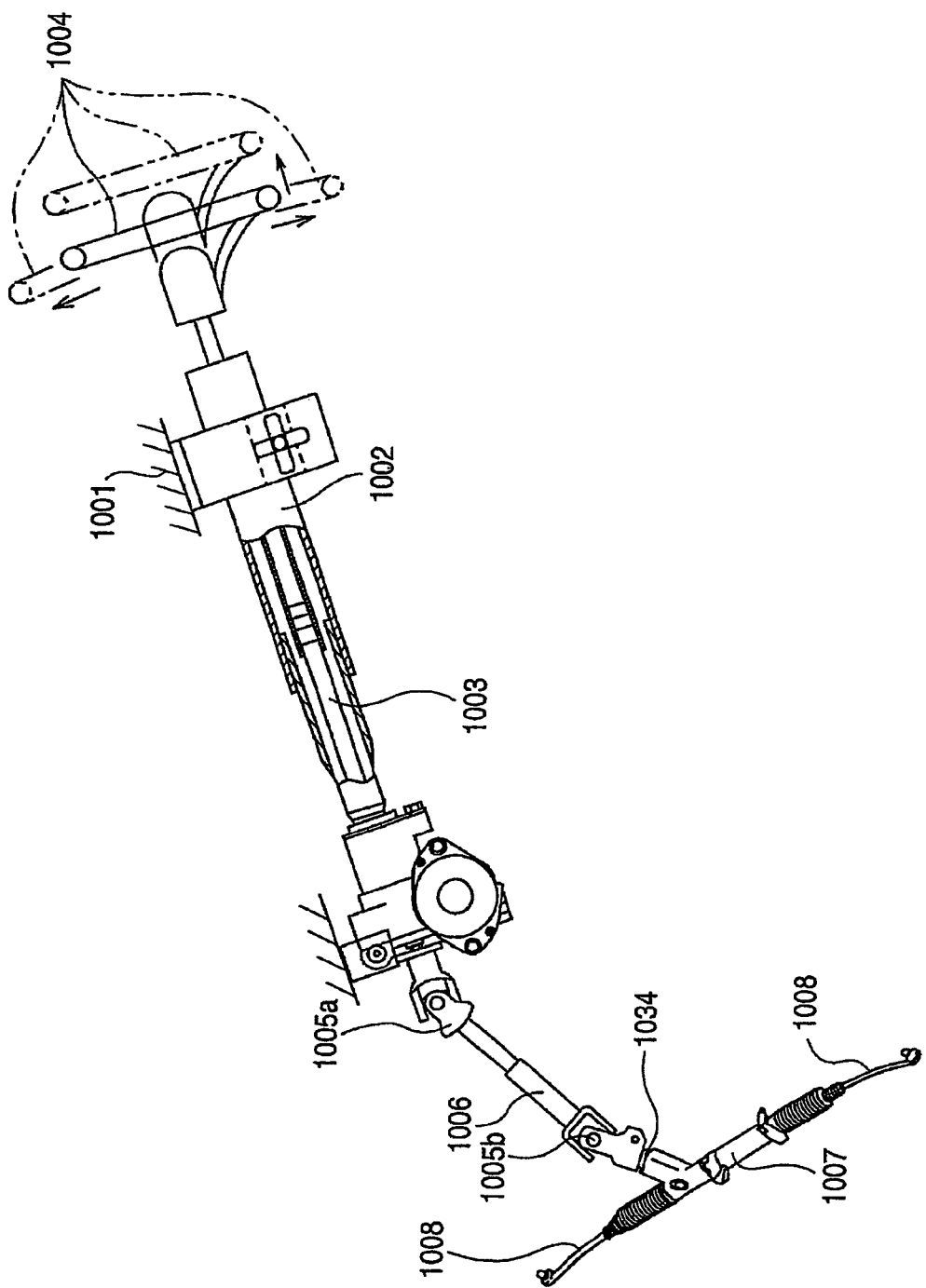
FIG. 21 is a side view of an example of a steering apparatus, with a portion thereof cut away.

Here, in the structure shown in FIG. 21, in order to be able to adjust the back and forth position of the steering wheel 1004, as the steering column 1002 and the steering shaft 1003, there are used a steering column and a steering shaft which are respectively of a telescopic type. The back and forth positions of an outer column and an inner column constituting such telescopic type of steering column, and the back and forth positions of an outer tube and an inner shaft constituting such telescopic type of steering shaft may also be reversed to those of the structure shown in FIG. 21.

A lock housing 1009 is fixed to a portion of a steering column 1002a using a clamp metal member 1010 and a pair of bolts 1011 and 1011.

The lock housing 1009 includes a tubular-shaped storage portion 1012, a bottom plate portion 1013 provided in a state where it closes the base end opening of the storage portion 1012, and a pair of mounting flange portions 1014 and 1014 disposed in such a manner that they project from the base end portion outer peripheral surface of the storage portion 1012. In a portion of the bottom plate portion 1013, there is formed a through hole (not shown) and, in a portion of the steering column 1002a that is matched to the through hole of the bottom plate portion 1013, there is formed another through hole (not shown), whereby the interior of the storage portion 1012 and the interior of the steering column 1002a are allowed to communicate with each other. Also, such portion of a steering shaft 1003a the axial position of as coincides with the above two through holes is formed as a male spline shape having a rough pitch, whereby there are formed multiple key lock grooves 1015, 1015 in the multiple portions of the steering shaft 1003a in the circumferential direction thereof.

Also, a lock unit 1016 is stored into the lock housing 1009 and further the lock unit 1016 is fixed to the interior of the lock housing 1009 using a fixing screw 1017. The fixing screw 1017, in a state where it is inserted into a recessed hole 1018 formed in the lock housing 1009, is threadedly engaged into a screw hole 1019 formed in the lock unit 1016 and is then fastened further. The lock unit 1016 includes a lock pin 1021 which can be advanced and retreated by an electric actuator 1020.

The above-structured lock apparatus operates in the following manner. That is, when an ignition key is rotated up to a lock position, the actuator 1020 advances the lock pin 1021 toward the inside diameter portion of the steering column 1002a. To the lock pin 1021, there is applied by an elastic portion (not shown) an energizing force in a direction where the lock pin 1021 is made to advance. Owing to this, the lock pin 1021 penetrates through the two through holes and the leading end of the lock pin 1021 moves into the grooves of the key lock grooves 1015, whereby the lock pin 1021 prevents the steering shaft against rotation.

In the steering apparatus including the above-mentioned conventional lock apparatus, the opening of the recessed hole 1018, in which the head portion 1022 of the fixing screw 1017 for fixing the lock unit 1016 is stored, is covered with the steering column 1002a. Thus, as the lock housing 1009 is left fixed to the steering column 1002a, the fixing screw 1017 cannot be operated. Therefore, it is possible to prevent the fixing screw 1017 from being loosened and thus to prevent the lock unit 1016 from being removed from the lock housing 1009. However, since the pair of bolts 1011 and 1011, which connect and fix the lock housing 1009 and clamp metal member 1010 to each other, are exposed, there is a possibility that a sufficient antitheft effect cannot be always obtained.

That is, since the two bolts 1011 and 1011 are exposed to the outside, it is possible to loosen the two bolts 1011 and 1011 using some tool. And, when two bolts 1011 and 1011 are loosened to thereby separate the lock housing 1009 and clamp metal member 1010 from each other, the leading end portion of the lock pin 1021 can be removed from the key lock groove 1015 and thus the steering shaft 1003a can be rotated.

Although one of the two bolts 1011 and 1011 can be made inoperable, for example, by disposing it such that it adjoins and opposes a portion fixed to the vehicle body, it is difficult to design such that neither of the two bolts 1011 and 1011 can be operated. In other words, undesirably, the freedom of the design of the steering apparatus is impaired.

And, if any one of the two bolts 1011 and 1011 is loosened, there is a possibility that, by inserting a tool such as a crowbar in between the lock housing 1009 and steering column 1002*a*, the lock housing 1009 can be separated from the steering column 1002*a*.

Now, description will be given below of the fifth to tenth embodiments of the invention in which, in view of the above conventional steering apparatus and the problems thereof, an antitheft function is improved.

Fifth Embodiment

FIGS. 9 to 14 respectively show the fifth embodiment according to the invention. The description of such structures and operations of the fifth embodiment as are similar to the above conventional steering apparatus is omitted or simplified, and thus description will be given below mainly of the characteristic portions of the present embodiment.

According to the present embodiment, the lock housing 1009*a* is formed integrally with the steering column (for example, outer column) 1002*b*. That is, by die casting a light alloy such as an aluminum alloy and a magnesium alloy, the lock housing 1009*a* and steering column 1002*b* are formed as an integral body. Therefore, the lock housing 1009*a* and steering column 1002*b* are connected to each other in such a manner that they cannot be separated from each other.

Here, in the illustrated example, the steering column 1002*b* is formed as an outer column for constituting a telescopic type of steering apparatus which is used to adjust the back and forth positions of a steering wheel. Thus, in the steering column 1002*b*, there are formed a slit 1023 (see FIG. 12) for elastically increasing or decreasing the diameter of the steering column 1002*b*, and two bracket portions 25 (see FIGS. 9 and 10) which are disposed such that they sandwich the slit 1023 from both sides and also which respectively include an elongated hole 1024 formed long in the axial direction thereof. However, the structure and operation of a telescopic type of steering apparatus including such elongated hole 1024 and bracket portion 25 are conventionally widely known and are not associated with the subject matter of the present invention. Thus, the illustration and description thereof are omitted here.

The lock housing 1009*a* is disposed on the outer peripheral surface of the steering column 1002*b* in such a manner that it is opened outwardly in the diameter direction of the steering column 1002*b*. Also, in such portion of the steering column 1002*b* as is matched to the lock housing 1009*a* (the portion that is surrounded by the lock housing 1009*a*), there is formed a through hole 1026 (see FIG. 12). The through hole 1026 penetrates through the steering column 1002*b* in the diameter direction thereof.

Figure 12:
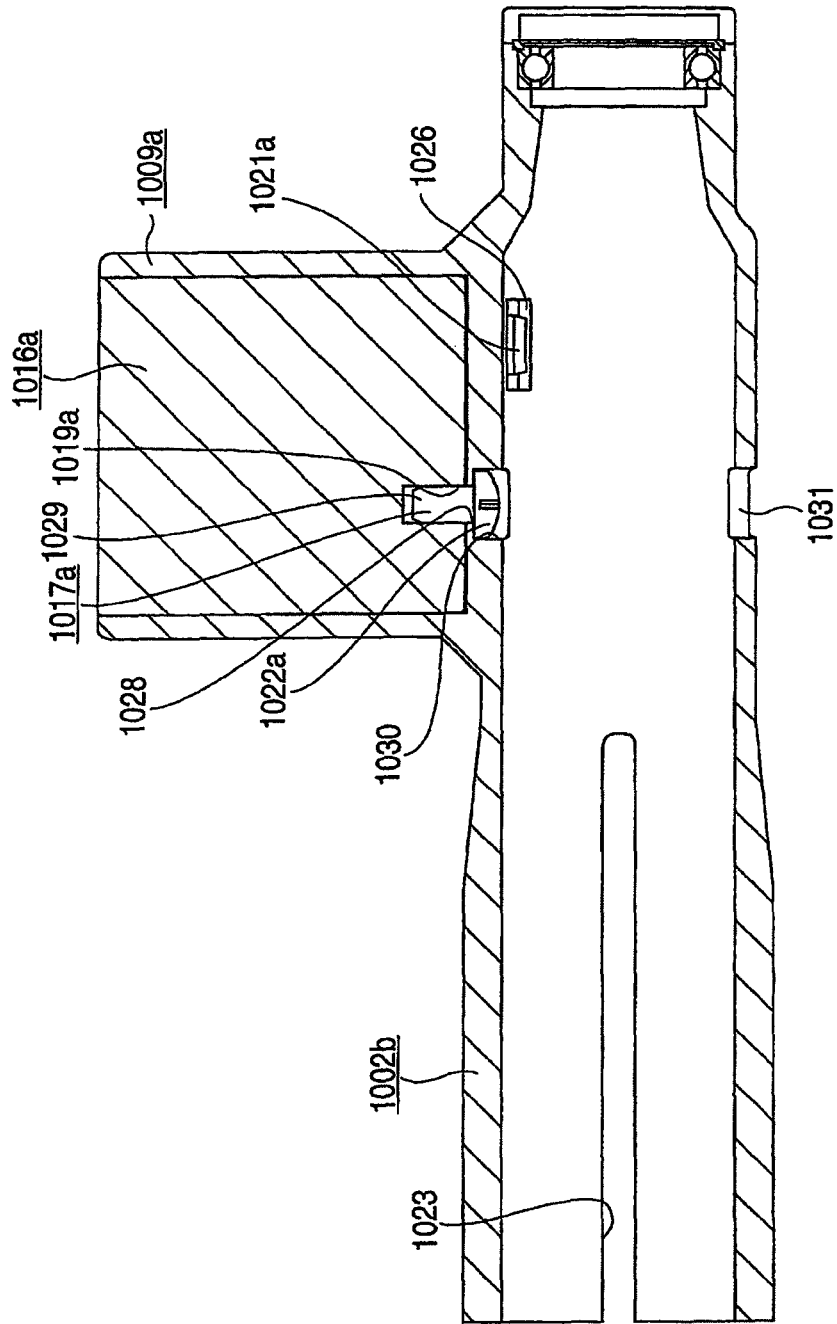
FIG. 12 is a section view taken along the XII-XII line shown in FIG. 10, showing the completed state of the engagement and fastening of a fixing screw.

In a state where the lock unit 1016*a* is stored in the lock housing 1009, the leading end portion of a lock pin 1021*a* provided in a lock unit 1016*a*, as shown in FIG. 12, is situated within the through hole 1026. As an ignition key is turned up to the lock position, the lock pin 1021*a* is projected through the through hole 1026 from the inner peripheral surface of the steering column 1002*b* inwardly in the diameter direction thereof.

Figure 13:
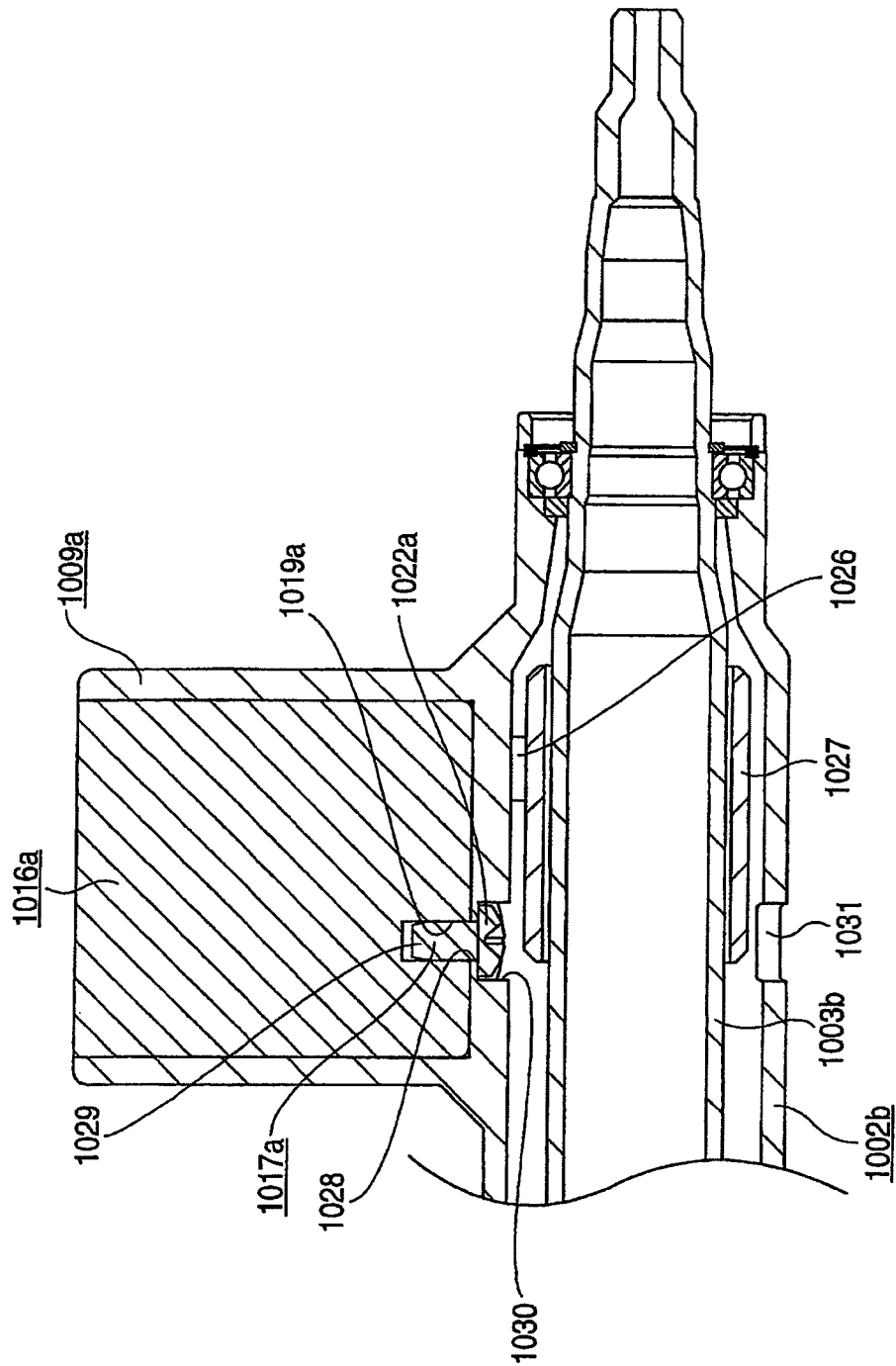
FIG. 13 is a view similar to FIG. 12, showing the completed state of the assembling of the steering apparatus.
Figure 14:
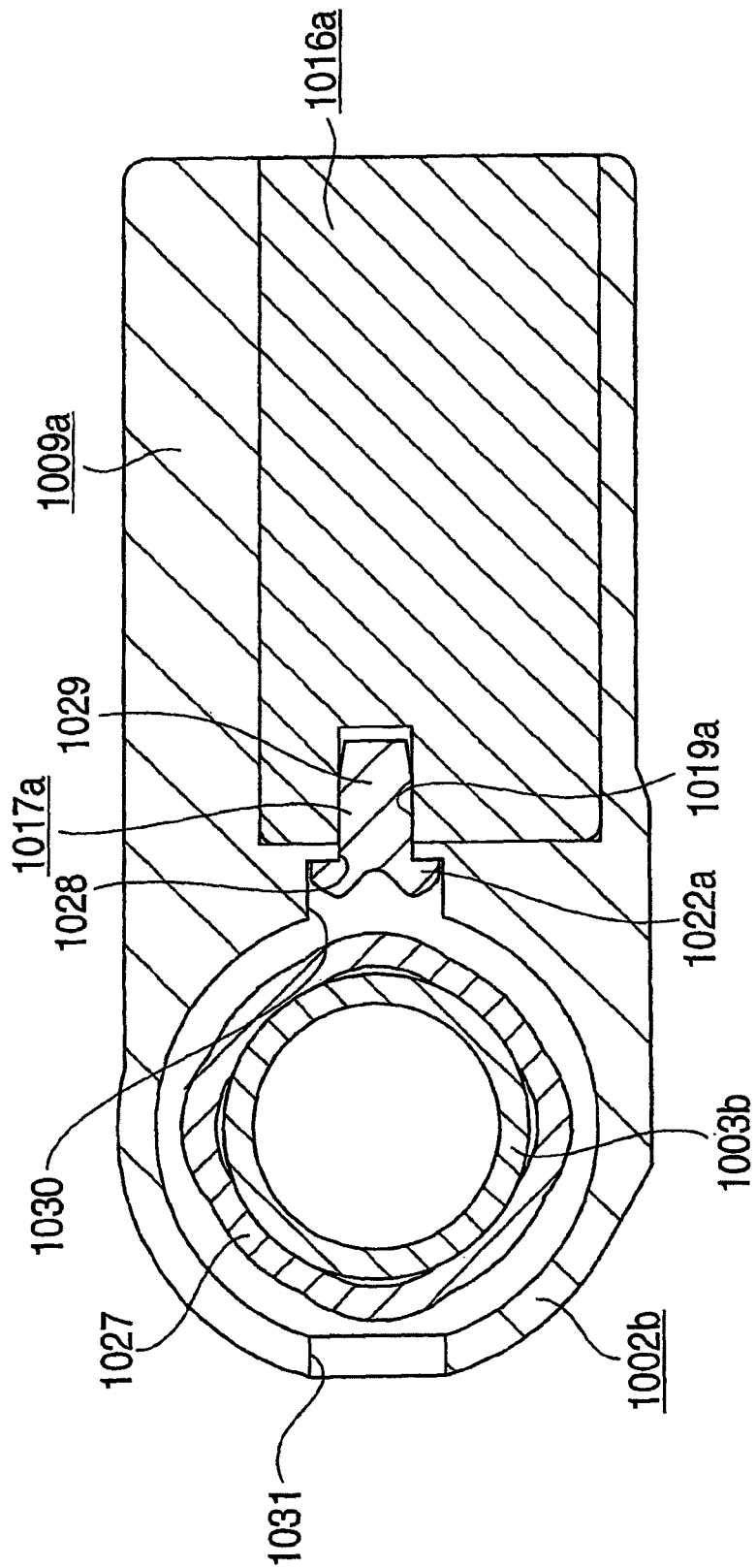
FIG. 14 is a view similar to FIG. 11.

A lock collar 1027, as shown in FIGS. 13 and 14, is fitted with and fixed to the outer surface of such portion of the steering shaft 1003*b* rotatably supported on the inside diameter side of the steering column 1002*b* as faces the through hole 1026. The lock collar 1027 is fixed to the steering shaft 1003*b* by welding or the like in such a manner that it can be prevented against rotation even when a large rotational force is applied to the lock collar 1027.

Also, in the multiple portions of the lock collar 1027 in the circumferential direction thereof, there are formed elongated holes (not shown) respectively long in the axial direction of the lock collar 1027, while they are used as key lock grooves into which the leading end portion of the lock pin 1021*a* can be engaged. The shape and the like of such lock collar 1027 are also conventionally widely known and thus the detailed description thereof is omitted here.

Here, the fixed state of the lock collar 1027 to the steering shaft 1003*b* may not be such that it is completely prevented against rotation with respect to the steering shaft 1003*b*. That is, the lock collar 1027 may only be fitted with the outer surface of the steering shaft 1003*b* in such a manner that it can generate resistance of such degree as can substantially prevent execution of a steering operation by the steering wheel. Therefore, the lock collar 1027 may also be fitted with the outer surface of the steering shaft 1003*b* by close fit, or may be fitted with such outer surface through a sleeve-like member which is made of a plate spring or the like and also which can generate large frictional resistance.

In the end face of the lock unit 1016*a*, that is, in the surface of the lock unit 1016*a* facing such portion of the outer peripheral surface of the steering column 1002*b* as is surrounded by the lock housing 1009*a*, there is formed a screw hole 1019*a*. With the screw hole 1019*a*, there can be threadedly engaged a fixing screw 1017*a* which is used to fix the lock unit 1016*a* to the inside of the lock housing 1009*a*.

Also, in such portion of the portion of the steering column 1002*b* surrounded by the lock housing 1009*a* as is shifted from the through hole 1026 and is matched to the screw portion 1019*a*, there is formed a second through hole 1028. The second through hole 1028 is formed to have a size which allows the shaft portion 1029 of the fixing screw 1017*a* to pass therethrough but prevents the head portion 1022*a* of the fixing screw 1017*a* against passage. However, in such portion of the second through hole 1028 as exists in the opening peripheral edge portion of the inner peripheral surface side of the steering column 1002*b*, there is formed a recessed portion 1030 which is capable of storing the head portion 1022*a* therein.

Also, in such portion of the steering column 1002*b* as exists on the opposite side to the second through hole 1028 in the peripheral direction of the steering column 1002*b*, there is formed a third through hole 1031 having a size which allows the head portion 1022*a* of the fixing screw 1017*a* to pass therethrough.

To fix the lock unit 1016*a* to the inside of the lock housing 1009*a*, the lock unit 1016*a* may be inserted into the lock housing 1009*a* from the lock pin 1021*a* and screw hole 1019*a*.

And, the shaft portion 1029 of the fixing screw 1017*a* having passed through the third through hole 1031 is inserted into the second through hole 1028 and a male screw formed in the outer peripheral surface of the shaft portion 1029 is threadedly engaged with the screw hole 1019*a*. And, a tool such as a driver is inserted from the third through hole 1031 to fasten the fixing screw 1017*a*, whereby the lock unit 1016*a* is fixed to the inside of the lock housing 1009*a*.

After the lock unit 1016*a* is fixed to the inside of the lock housing 1009*a* in this manner, as shown in FIGS. 13 and 14, the steering shaft 1003*b* is assembled to the inside diameter side of the steering column 1002*b*.

In this state, the steering shaft 1003*b* is situated between the second and third through holes 1028 and 1031. Therefore, even when a tool is inserted from the third through hole 1031, the tool is prevented from being engaged with the head portion 1022a of the fixing screw 1017a. That is, according to the present embodiment, while the steering shaft 1003b is left situated within the steering column 1002, the fixing screw 1017a cannot be loosened. In other words, while the function of the steering apparatus remains secured, the lock unit 1016a is prevented from being removed from the lock housing 1009a.

Also, since the lock housing 1009a is formed integrally with the steering column 1002b, even a tool such as a file or a hack-saw is used, it takes a long time to separate the lock housing 1009a together with the lock unit 1016a from the steering column 1002b. This can enhance the antitheft function.

Since the tool and the head portion 1022a of the fixing screw 1017a cannot be engaged with each other unless the steering shaft 1003b is taken out from the steering column 1002b, there is eliminated the need to arrange the respective structure members specially for preventing them from being engaged with each other, and thus there is eliminated a possibility that the freedom of the design of the steering apparatus can be lowered.

Also, since the steering column 1002b and lock housing 1009a are formed an integral body, it is possible to facilitate the assembling operation and thus to reduce the manufacturing cost of the steering apparatus.

Further, since the steering column 1002b and lock housing 1009a are formed an integral body, the size and weight of the whole steering apparatus with a lock apparatus incorporated therein can be reduced.

Sixth Embodiment

Figure 15:
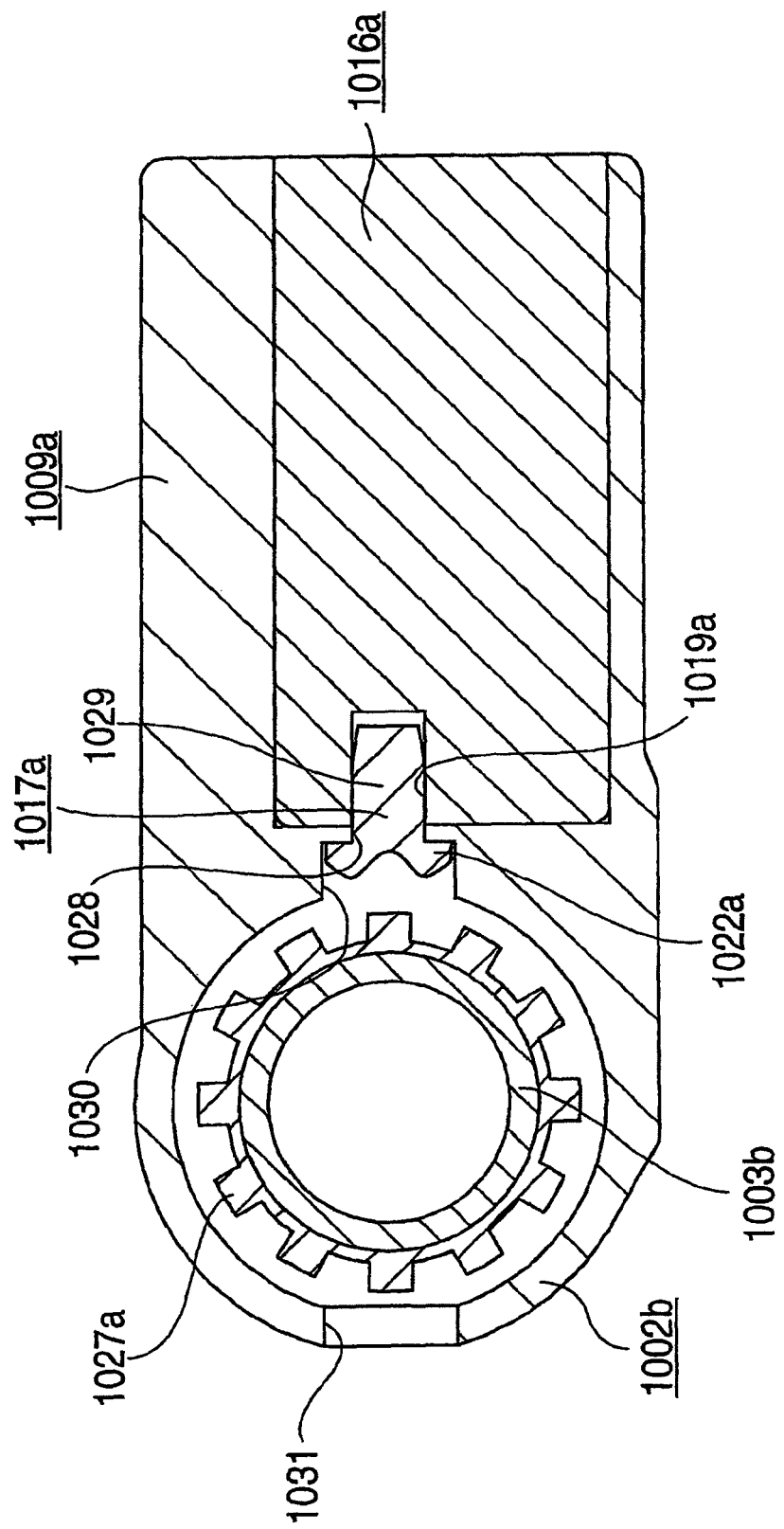
FIG. 15 is a view of a sixth embodiment according to the invention, similar to FIG. 14.

FIG. 15 shows a sixth embodiment according to the invention. In the present embodiment, on such portion of the outer peripheral surface of the steering shaft 1003b as faces the through hole 1026 (see FIG. 12), there are formed rough male-spline-groove-shaped uneven portions respectively serving as lock collars 1027a which can be fitted with and fixed to the outer surface of such portion. The structures and operations of the other remaining portions of the present embodiment are similar to those of the above-mentioned fifth embodiment, and thus the illustration and description of the equivalent portions thereof are omitted here.

Seventh Embodiment

Figure 16:
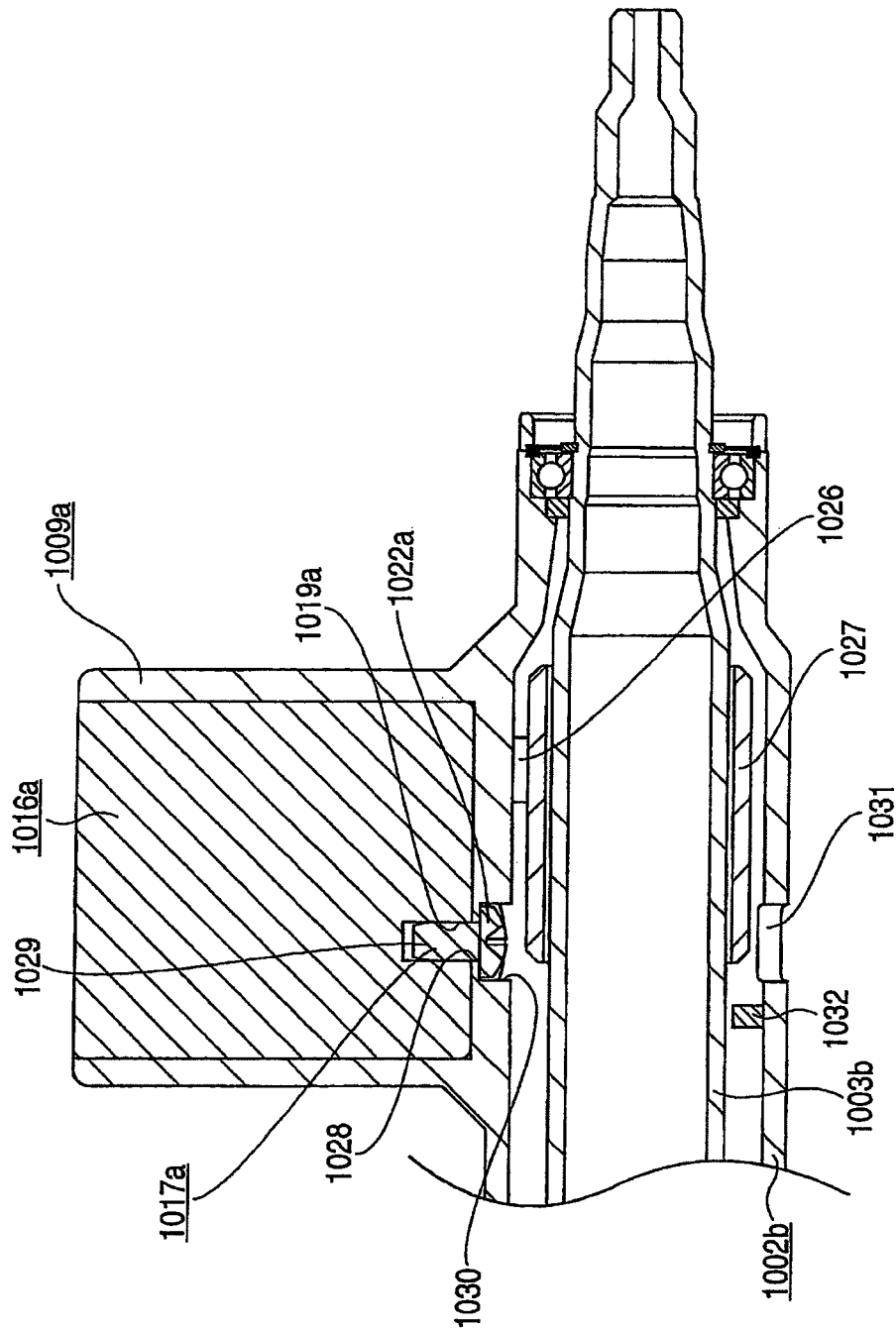
FIG. 16 is a view of a seventh embodiment according to the invention, similar to FIG. 13.

FIG. 16 shows a seventh embodiment according to the invention. In the present embodiment, to such portion of the inner peripheral surface of the steering column 1002b as exists on the opposite side to the lock housing 1009a in the peripheral direction of the steering column 1002b, there is fixed by adhesion or the like a backup piece 1032 which is formed to have a partial arc shape to match the shape of, for example, the inner peripheral surface of the steering column 1002b.

The backup piece 1032 prevents the steering shaft 1003b from shifting in a direction where it parts away from the lock housing 1009a. That is, in a state where the lock pin 1021a (see FIGS. 9 and 12) and key lock groove are engaged with each other, when trying to rotate the steering shaft 1003b through the steering wheel with a large force, there is a possibility that the steering shaft 1003b can shift in a direction to part away from the lock housing 1009a to thereby remove the engagement between the lock pin 1021a (see FIGS. 9 and 12) and key lock groove. However, according to the present embodiment, the backup piece 1032 can prevent the steering shaft 1003b from shifting in a direction to part away from the lock housing 1009a and thus can prevent the removal of the engagement between the lock pin 1021a and key lock groove, thereby being able to secure the antitheft function of the lock apparatus.

Here, the backup piece 32, in a vehicle crash, is slipped down from the inner peripheral surface of the steering column 1002 to thereby prevent the steering shaft 1003b from shifting forwardly. The structures and operations of the other remaining portions of the present embodiment are similar to those of the above-mentioned fifth and sixth embodiments, and thus the illustration and description of the equivalent portions thereof are omitted here.

Eighth Embodiment

Figure 17:
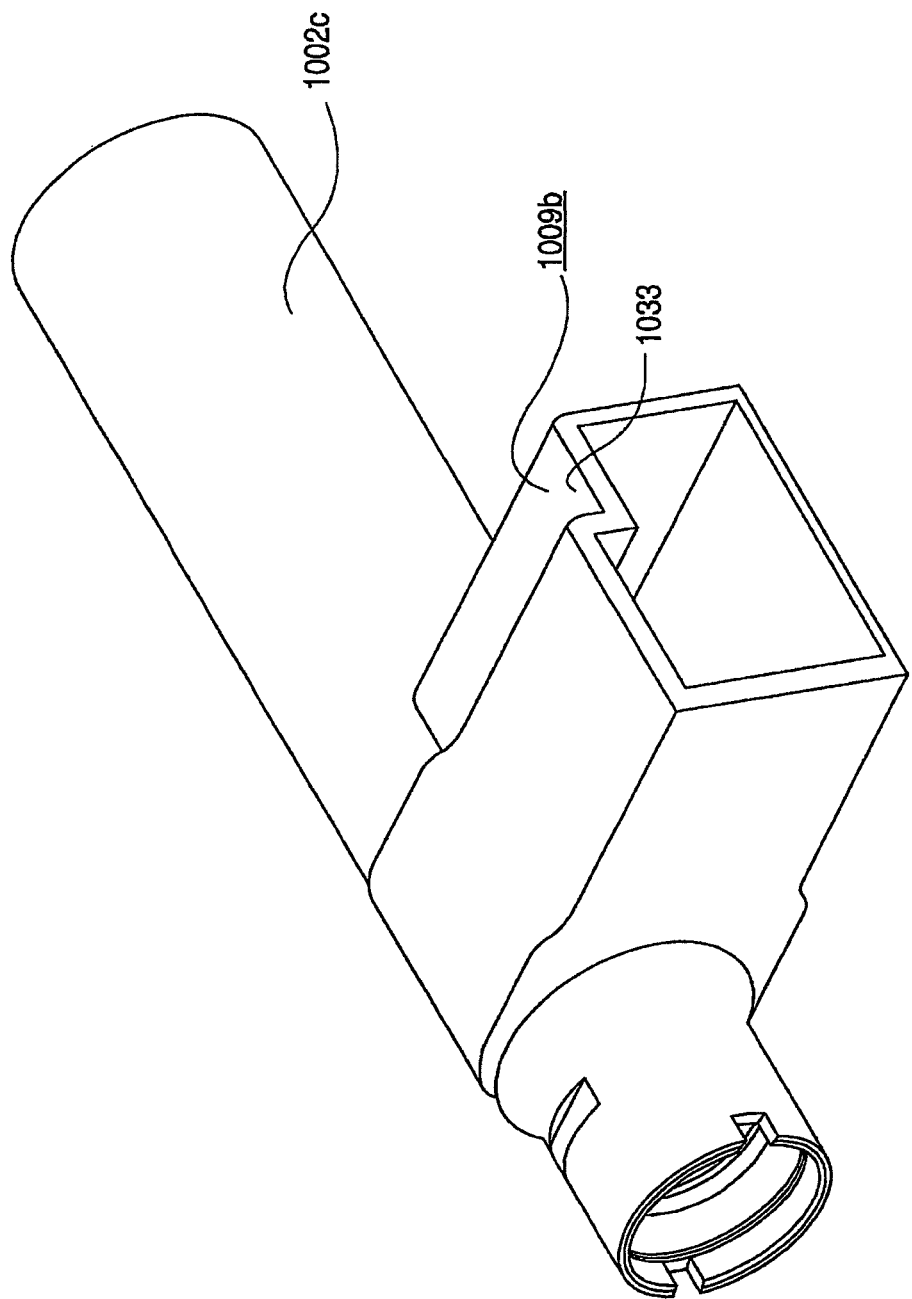
FIG. 17 is a perspective view of a lock housing and a steering column employed in an eighth embodiment according to the invention.
Figure 18:
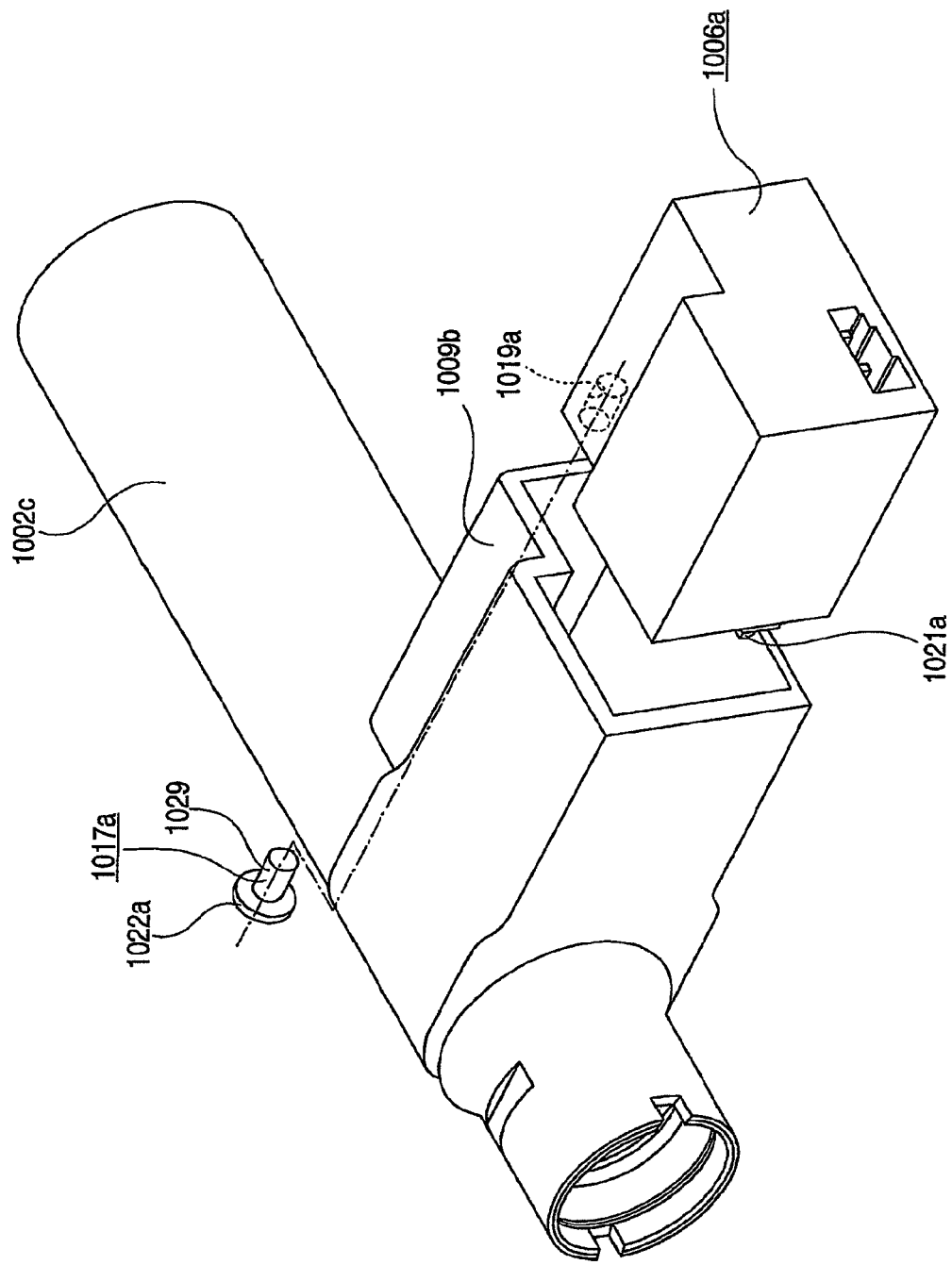
FIG. 18 is an exploded perspective view of the lock housing and steering column together with a lock unit and a fixing screw.

FIGS. 17 and 18 respectively show an eighth embodiment according to the invention. In the present embodiment, a steering column (outer column) 1002c is made of steel and a lock housing 1009b is made of a light alloy. They are both formed by die casting into an integral body. Specifically, a portion of the outer column 1002c is embedded into a portion of the lock housing 1009b to thereby form them as an integral body. In this manner, the outer column 1002c and lock housing 1009b are connected together in such a manner that they cannot be separated from each other. The structures and operations of the other remaining portions of the present embodiment are similar to the above-mentioned fifth embodiment. Thus, the illustration and description of the equivalent portions are omitted here.

Ninth Embodiment

Figure 19:
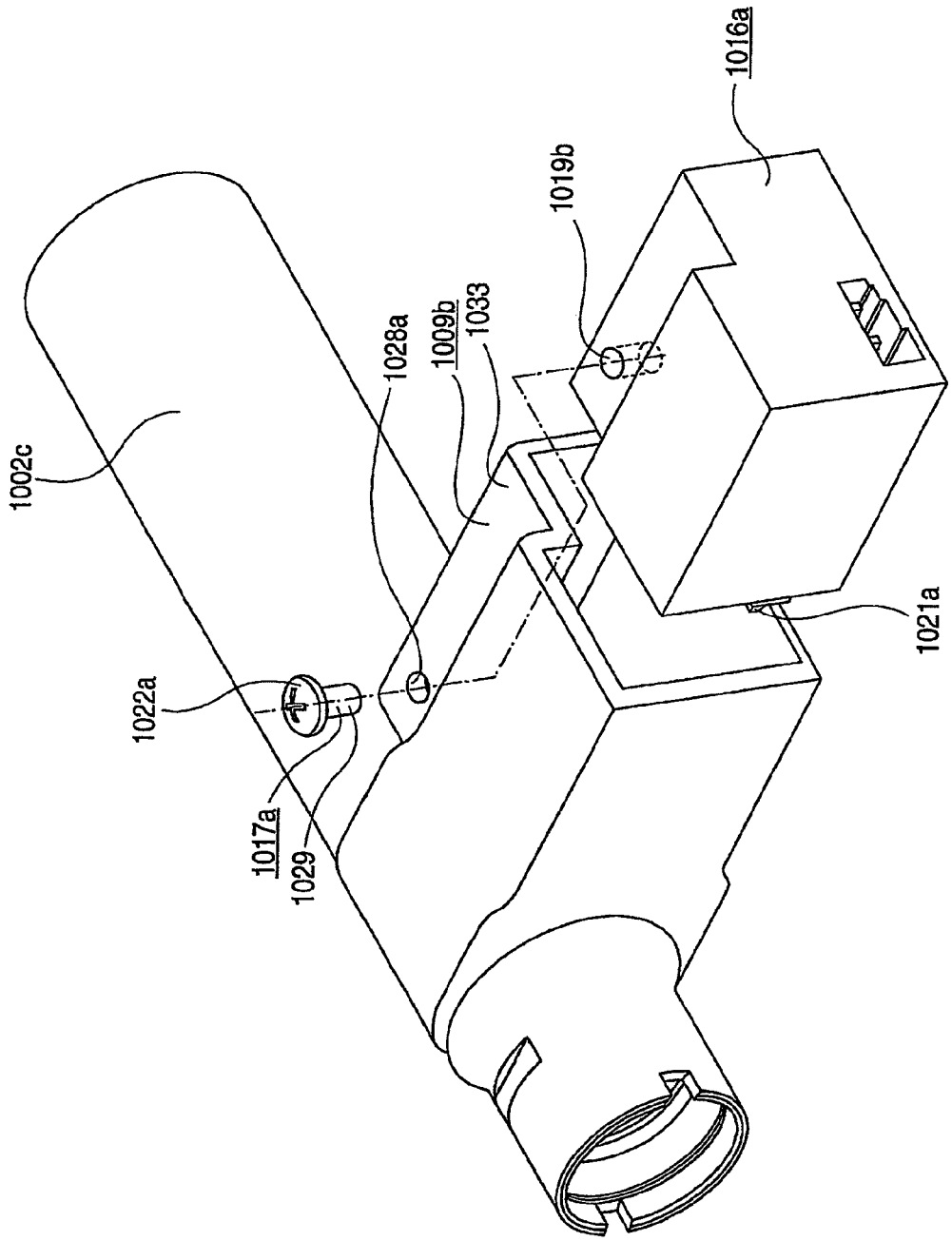
FIG. 19 is a view of a ninth embodiment according to the invention, similar to FIG. 18.

FIG. 19 shows a ninth embodiment according to the invention. In the ninth embodiment, similarly to the eighth embodiment, a steering column 1002c made of steel and a lock housing 1009b made of a light alloy are formed into an integral body. Further, in the front end portion of the upper surface of the lock housing 1009b, there is formed a recessed portion 1033 which is recessed downwardly of the longitudinal direction central and rear end portions of the above upper surface. Also, in such portion of the recessed portion 1033 as exists on the steering column 1002c side, there is formed a second through hole 1028a having a size which allows the shaft portion 1029 of the fixing screw 1017a to pass therethrough but prevents the head portion 1022a of the fixing screw 1017a from passing therethrough.

In order that the lock unit 1016a can be inserted into the lock housing 1009b without shaking, the outer peripheral surface of the lock unit 1016a is formed to have a shape substantially equal to or slightly smaller than the shape of the inner peripheral surface of the lock housing 1009b. In such portion of the upper surface of the lock unit 1016a as is matched to the second through hole 1028a, there is formed a screw hole 1019b. A male screw formed in the shaft portion 1029 of the fixing screw 1017a can be threadedly engaged with the screw hole 1019b. And, when, after the shaft portion 1029 of the fixing screw 1017a is inserted into the second through hole 1028a, it is threadedly engaged with the screw hole 1019b and is tightened further, the lock unit 1016a can be supported by and fixed to the inside of the lock housing 1009b.

Here, in a state where the steering column 1002c is supported on the vehicle body, between the upper surface of the lock housing 1009b and a portion to be fixed to the vehicle body such as a dash board, there must not be generated a clearance having a size which allows the engagement between the head portion 22a of the fixing screw 1017a and a tool. For example, the clearance between the upper surface of the lock housing 1009b and the portion to be fixed to the vehicle body should be set substantially equal to the axial dimension of the head portion 1022a of the fixing screw 1017a, or a level difference the recessed portion 1033 and lock housing 1009b should be set substantially equal to the axial dimension of the head portion 1022a of the fixing screw 1017a. The structures of the other remaining portions of the present embodiment are similar to the above-mentioned fifth embodiment. Thus, the duplicate illustration and description of the equivalent portions are omitted here.

In the structure according to the present embodiment as well, since, while securing the function of the steering apparatus, the lock unit 1016a is prevented from being removed from the lock housing 1009a, the antitheft function of the lock apparatus can be enhanced.

Tenth Embodiment

Figure 20:
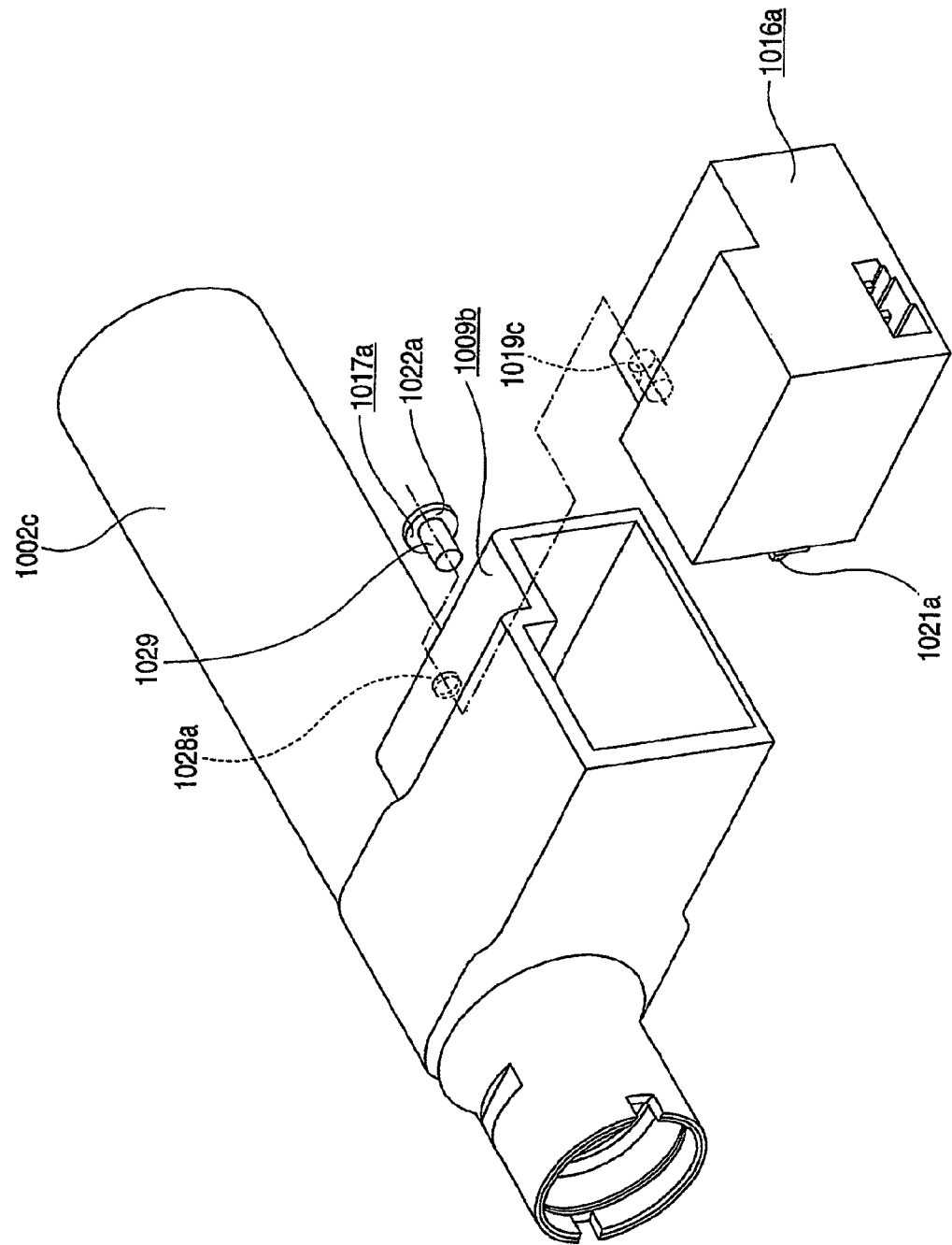
FIG. 20 is a view of a tenth embodiment according to the invention, similar to FIG. 18.

FIG. 20 shows a tenth embodiment according to the invention. In the present embodiment, in such end portion of the front surface of the lock housing 1009b as, exists on the steering column 1002c side, there is formed a second through hole 1028a having a size which allows the shaft portion 1029 of the fixing screw 1017a to pass therethrough but prevents the head portion 1022a of the fixing screw 1017a from passing therethrough. In such portion of the front surface of the lock unit 1016a as is matched to the second through hole 1028a, there is formed a screw hole 1019c with which there can be threadedly engaged a male screw formed in the shaft portion 1029 of the fixing screw 1017a. And, when, after the shaft portion 1029 of the fixing screw 1017a is inserted into the second through hole 1028a, it is threadedly engaged with the screw hole 1019b and is tightened further, the lock unit 1016a can be supported by and fixed to the inside of the lock housing 1009b.

According to this structure, in a state where the steering column 1002c is supported on the vehicle body, between the front surface of the lock housing 1009b and a portion to be fixed to the vehicle body such as a dash board, there must not be generated a clearance having a size which allows the engagement between the head portion 1022a of the fixing screw 1017a and a tool. The structures of the other remaining portions of the present embodiment are similar to the above-mentioned eighth embodiment. Thus, the duplicate description of such portions is omitted here.

Here, in enforcing the above-mentioned fifth to tenth embodiments, the structure of the lock unit is not limited to any specific one. That is, besides the above-mentioned structure in which, by rotating an ignition key up to the lock position, the lock pin is projected from the inner peripheral surface of the steering column, there may also be employed a structure in which the lock pin is left projected from the inner peripheral surface of the steering column unless a regular key is used.

Eleventh to Twenty-Second Embodiments

Now, description will be given below of eleventh to twenty-second embodiments according to the invention.

The eleventh to twenty-second embodiments respectively relate to a steering apparatus which is enhanced in the rigidity of a housing, includes a housing structured such that, whether the steering apparatus is mounted on a right-hand drive vehicle or a left-hand drive vehicle, a portion not in use is left therein, and, even when the slit of a clamp device and the through hole of a lock apparatus are disposed adjacent to each other, a crack is hard to occur between the slit and through hole.

Figure 43:
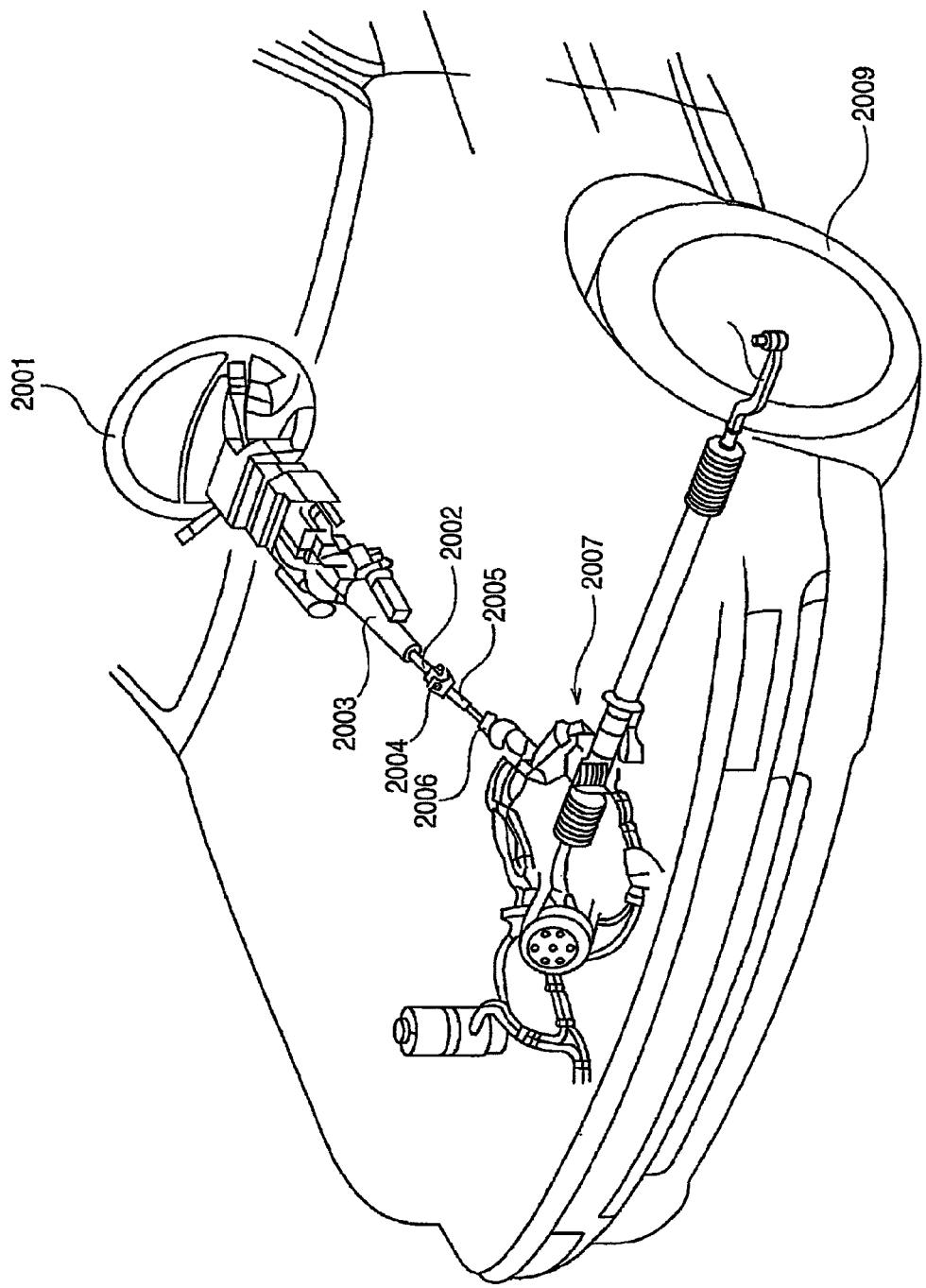
FIG. 43 is a schematic perspective view of a steering apparatus which is assembled to a vehicle.

Before describing eleventh to twenty-second embodiments according to the invention, in order to make clear the improvements that can be made by the eleventh to twenty-second embodiments according to the invention, description will be given below firstly of the structure of a conventional steering apparatus and problems found in the conventional steering apparatus. In a steering apparatus for applying a steering angle to the front wheels of a vehicle, as shown in FIG. 43, a steering shaft 2002 with a steering wheel 2001 fixed to the rear end portion thereof is rotatably supported on the inside diameter side of a steering column 2003 which is supported on the vehicle body. To the front end portion of the steering shaft 2002, there is connected the rear end portion of an intermediate shaft 2005 through a universal joint 2004. Also, to the front end portion of the intermediate shaft 2005, there is connected through a universal joint 2006 a steering gear unit 2007 which is constituted of a rack and pinion and the like.

In this state, when a driver operates and rotates the steering wheel 2001, the rotation force of the steering wheel 2001 is transmitted through the above respective members 2002, 2004, 2005 and 2006 to the steering gear unit 2007. As a result of this, a tie rod 2008, which is connected to the two end portions of the steering gear unit 2007, is pushed and pulled to thereby apply a steering angle to the right and left front wheels 2009.

Here, since the position relationship between the steering wheel 2001 and a driver's seat varies depending on the build and driving posture of the driver, in order to realize a proper driving posture, it is necessary to use, in addition to a device for adjusting the back and forth position of the driver's seat, a device for adjusting the back and forth position and vertical position of the steering wheel 2001.

Figure 44:
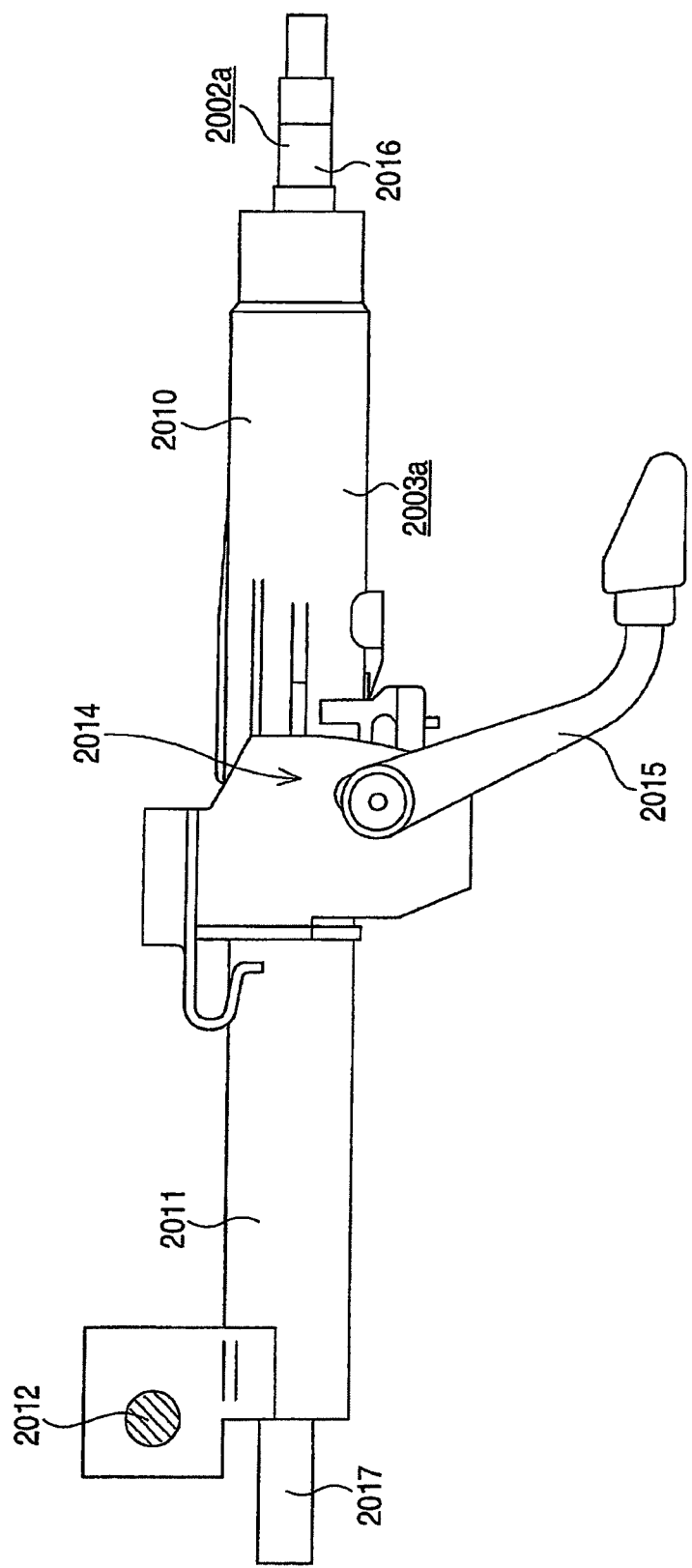
FIG. 44 is a side view of the main portions of the conventional structure of a steering apparatus having a function to adjust the position of a steering wheel.
Figure 45:
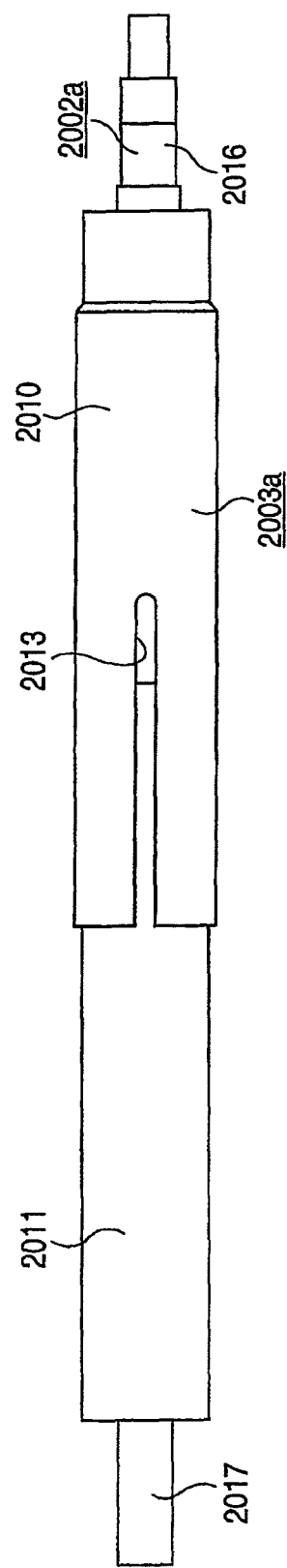
FIG. 45 is a partially omitted view of the conventional structure when it is viewed from below FIG. 44.

FIGS. 44 and 45 respectively show an example of a conventional structure of a steering apparatus having such steering wheel position adjusting function. Here, of these FIGS. 44 and 45, FIG. 44 is a side view of the rear end side portion of the conventional structure, and FIG. 45 is a partially omitted view of the conventional structure when it is viewed from below FIG. 44.

A steering column 2003a constituting the conventional structure is produced in the following manner. That is, a cylindrical outer column 2010 situated on the rear side of the vehicle body (on the right side in FIGS. 44 and 45, and in FIGS. 24, 25, 35, 36, 38, 40, 42, 46, 48 and 49 which will be respectively discussed later) and a cylindrical inner column 2011 situated on the front side of the vehicle body (on the right side in FIGS. 44 and 45, and in FIGS. 24, 25, 35, 36, 38, 40, 42, 46, 48 and 49 which will be respectively discussed later) are combined together in such a manner that the whole length thereof can be increased or decreased, that is, a telescopic manner. These outer column 2010 and inner column 2011 are respectively formed of a light alloy such as an aluminum alloy and a magnesium alloy by die casting.

Referring to the structure of the inner column 2011, its front end portion is supported in such a manner that it can be only oscillated about a transverse shaft 2012 with respect to the vehicle body. Also, referring to the structure of the outer column 2010, its front end portion to its front half section is fitted with the outer surface of the rear end portion to its rear half section in such a manner that it can be shifted only in the axial direction. Also, in the front half section of the lower surface of the outer column 2010, there is formed a slit 2013 which is opened on the front end edge of the outer column 2010 and extends in the axial direction of the outer column 2010. And, owing to formation of such slit 2013, the diameter dimension of the front half section of the outer column 2010 can be elastically changed easily.

Also, such portion of the intermediate portion of the steering column 2003a as corresponds to the engagement portion between the outer column 2010 and inner column 2011 is supported by a clamp device 2014 which is fixed to the vehicle body.

The clamp device 2014 can be switched by the rotational operation of a lever 2015 between a state where it applies fastening forces to such portion of the outer column 2010 as ranges from the front end portion thereof to the outer peripheral surface of the front end side thereof from both sides in the right and left direction (in the front and back direction in FIG. 44, and FIGS. 24, 33, 35, 38, 40, 42 and 46 to be discussed later; in the vertical direction in FIG. 45, and FIGS. 25, 36, 48 and 49 to be discussed later; in the right and left direction in FIGS. 26, 27, 29 to 32, 34, 37, 39, 41, 47A and 47B to be discussed later) which is the width direction of the vehicle body, and a state where it does not apply such fastening forces.

Also, on the inside diameter side of the steering column 2003a, there is rotatably supported a steering shaft 2002a. The steering shaft 2002a is structured such that it can bring the front end portion of a circular-pipe-shaped outer shaft 2016 disposed on the rear side of the vehicle body and the rear end portion of a rod-shaped inner shaft 2017 disposed on the front side of the vehicle body into engagement with each other to thereby be able to transmit its rotation force and also to increase or decrease the whole length thereof.

In the thus structured steering shaft 2002a, the rear end side of the outer shaft 2016 is supported on the rear end portion of the outer column 2010 and the front end side of the inner shaft 2017 is supported on the front end portion of the inner column 2011 respectively by their respective antifriction bearings (not shown) such as radial ball bearings in such a manner that only the rotational movements thereof are allowed. And, on such portion of the rear end portion of the outer shaft 2016 as projects backwardly from the rear end of the outer column 2010, there is supported and fixed the steering wheel 2001 (not shown in FIG. 44 or 45; see FIG. 43). Also, to such portion of the front end portion of the inner shaft 2017 as projects forwardly from the front end of the inner column 2011, there is connected the rear end portion of the intermediate shaft 2005 (see FIG. 43) through the universal joint 2004.

According to the above conventional steering apparatus, the state where the fastening force given by the clamp device 2014 is applied and the state where such fastening force is not applied are switched over to each other to thereby adjust the position of the steering wheel 2001 in the following manner.

That is, in the fastening force applied state, since the oscillatory displacement of the steering column 2003a about the transverse shaft 2012 is prohibited, the vertical position of the steering wheel 2001 is fixed. Also, since the width of the slit 2013 of the outer column 2010 narrows and the front half section of the outer column 2010 reduces in diameter, a frictional force in the engagement portion between the outer column 2010 and inner column 2011 increases sufficiently. As a result of this, the axial displacement of the outer column 2010 with respect to the inner column 2011 is prohibited, whereby the back and forth position of the steering wheel 2001 is fixed.

On the other hand, in the fastening force not-applied state, since the oscillatory displacement of the steering column 2003a about the transverse shaft 2012 is possible, the vertical position of the steering wheel 2001 can be changed. Also, since, due to the elasticity of the outer column 2010, the width of the slit 2013 spreads and the front half section of the outer column 2010 increases in diameter, the frictional force in the engagement portion between the outer column 2010 and inner column 2011 decreases sufficiently. As a result of this, the axial displacement of the outer column 2010 with respect to the inner column 2011 is possible, whereby the back and forth position of the steering wheel 2001 can be changed.

Figure 46:
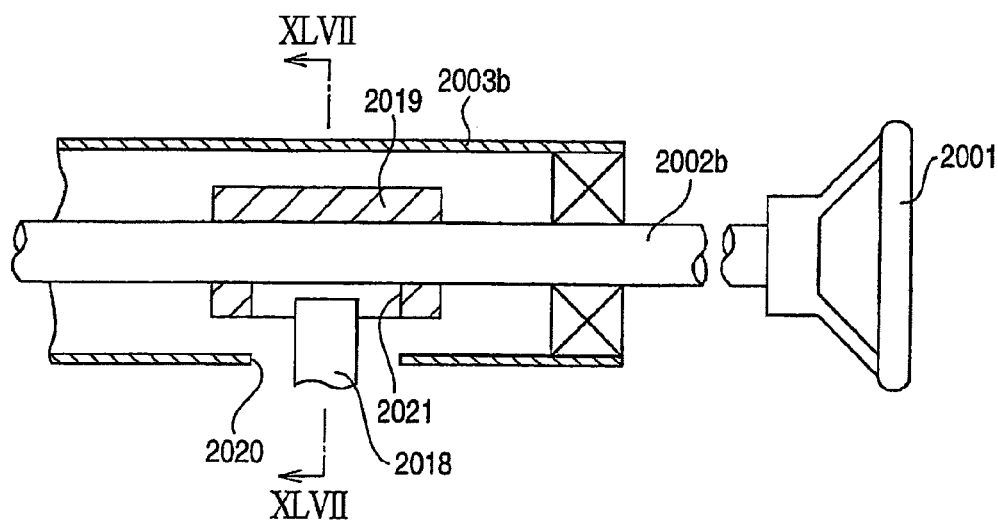
FIG. 46 is a section view of the main portions of an example of the conventional structure of a lock apparatus to be assembled to a steering apparatus.
Figure 47A:
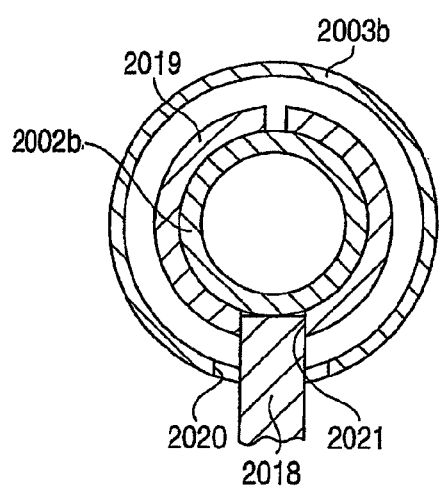
FIGS. 47A and 47B are section views taken along the XLVII-XLVII line shown in FIG. 46. Specifically.
Figure 47B:
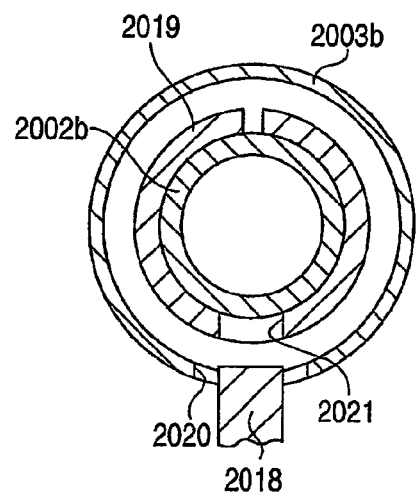

Next, FIGS. 46, 47A and 47B respectively show, as an example of a conventionally used lock apparatus for preventing the theft of a vehicle, a lock apparatus disclosed in the patent reference 5. According to this lock device, when an ignition switch is turned off and also, in order to remove an ignition key from a key hole (not shown), the ignition key is turned up to its lock position, as shown in FIG. 47A, a lock pin 2018 is elastically projected from a key cylinder (not shown) fixed to the steering column 2003b inwardly in the diameter direction of the steering column 2003b through a through hole 2020 formed in the steering column 2003b.

And, the leading end portion of the lock pin 2018 is inserted into and engaged with the key lock hole 2021 of a key lock collar 2019 fixed to the steering shaft 2002b. And, such engagement prevents the rotation of the steering shaft 2002b. On the other hand, in a state where the ignition switch is turned on, as shown in FIG. 47B, the lock pin 2018 does not project inwardly of the steering column 2003b but the steering shaft 2002b with the key lock collar 2019 fixed thereto is allowed to rotate.

Here, to assemble the above-mentioned lock apparatus to the rear end portion (the portion that does not interfere with the clamp device 2014) of the outer column 2010 constituting the conventional steering apparatus shown in FIGS. 44 and 45, the lock housing of a lock unit including a key cylinder must be provided on the outer peripheral surface of the rear end side of the outer column 2010.

Figure 48:
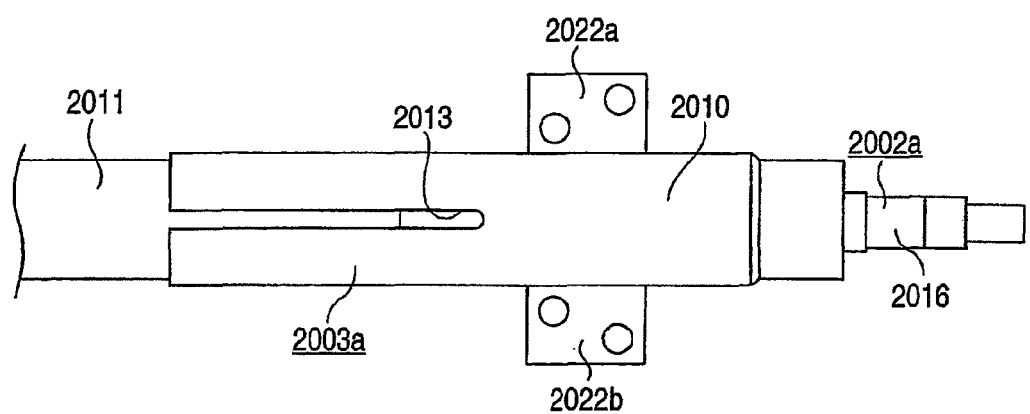
FIG. 48 is a view of a structure where the mounting portion of the lock unit is formed integrally with the outer column, similar to FIG. 45.

FIG. 48 shows an example in which the structure of the lock housing disclosed in the patent reference 2 is applied to the rear end side of the outer column 2010. In the structure shown in FIG. 48, on the rear end side of the outer column 2010, a pair of plate-shaped lock housings 2022a and 2022b, which respectively project on both sides in the width direction of a vehicle, are formed by die casting integrally with the outer column 2010.

And, owing to formation of the paired lock housings 2022a and 2022b, according to the structure of a vehicle to which the steering apparatus is to be assembled, such as the structure of a so called right-hand drive vehicle and the structure of a so called left-hand drive vehicle, one of the paired lock housings 2022a and 2022b can be chosen as a lock housing on which the lock unit is to be mounted.

However, in the structure shown in FIG. 48, there is raised a state where the other of the paired lock housings 2022a and 2022b is not in use. Due to this, the manufacturing cost of the other lock housing is wasted and also, by an amount equivalent to the other lock housing, the installation space of the steering apparatus increases.

Also, when assembling the above-mentioned lock apparatus to the rear end side of the outer column 2010 of the conventional steering apparatus shown in FIGS. 44 and 45, the through hole 2020 (see FIGS. 46, 47A and 47B), into which the lock pin 2018 can be inserted, must be formed in the rear end portion of the outer column 2010.

Figure 49:
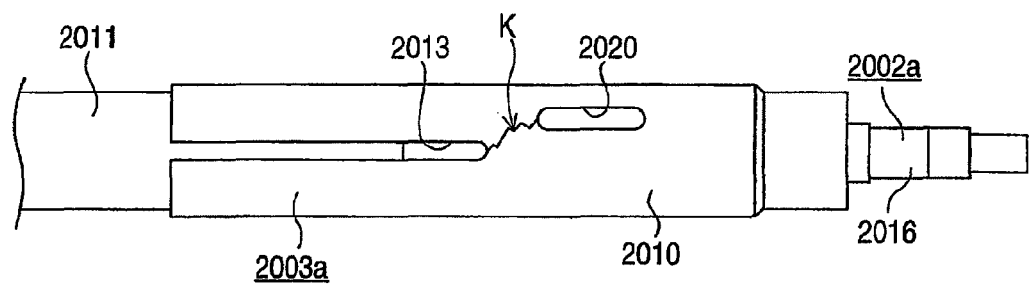
FIG. 49 is a view of a structure where there is formed in the outer column a through hole into which the lock pin is to be inserted, similar to FIG. 45.

FIG. 49 shows an example in which the through hole 2020 is formed in the rear end portion of the outer column 2010. In this structure, the periphery of the through hole 2020 of the outer column 2010 provides a portion which is reduced in strength when compared with the other remaining portion. Thus, as shown in FIG. 49, in the structure where the through hole 2020 is formed in a portion near to the rear end edge of the slit 2013, due to the stress that is generated when the fastening force by the clamp device (see FIG. 44) is applied, there is raised a possibility that there can be caused a crack K between the slit 2013 and through hole 2020.

In view of the above-mentioned conventional steering apparatus and problems raised by such steering apparatus, description will be given below of the eleventh to twenty-second embodiments according to the invention.

Eleventh Embodiment

Figure 24:
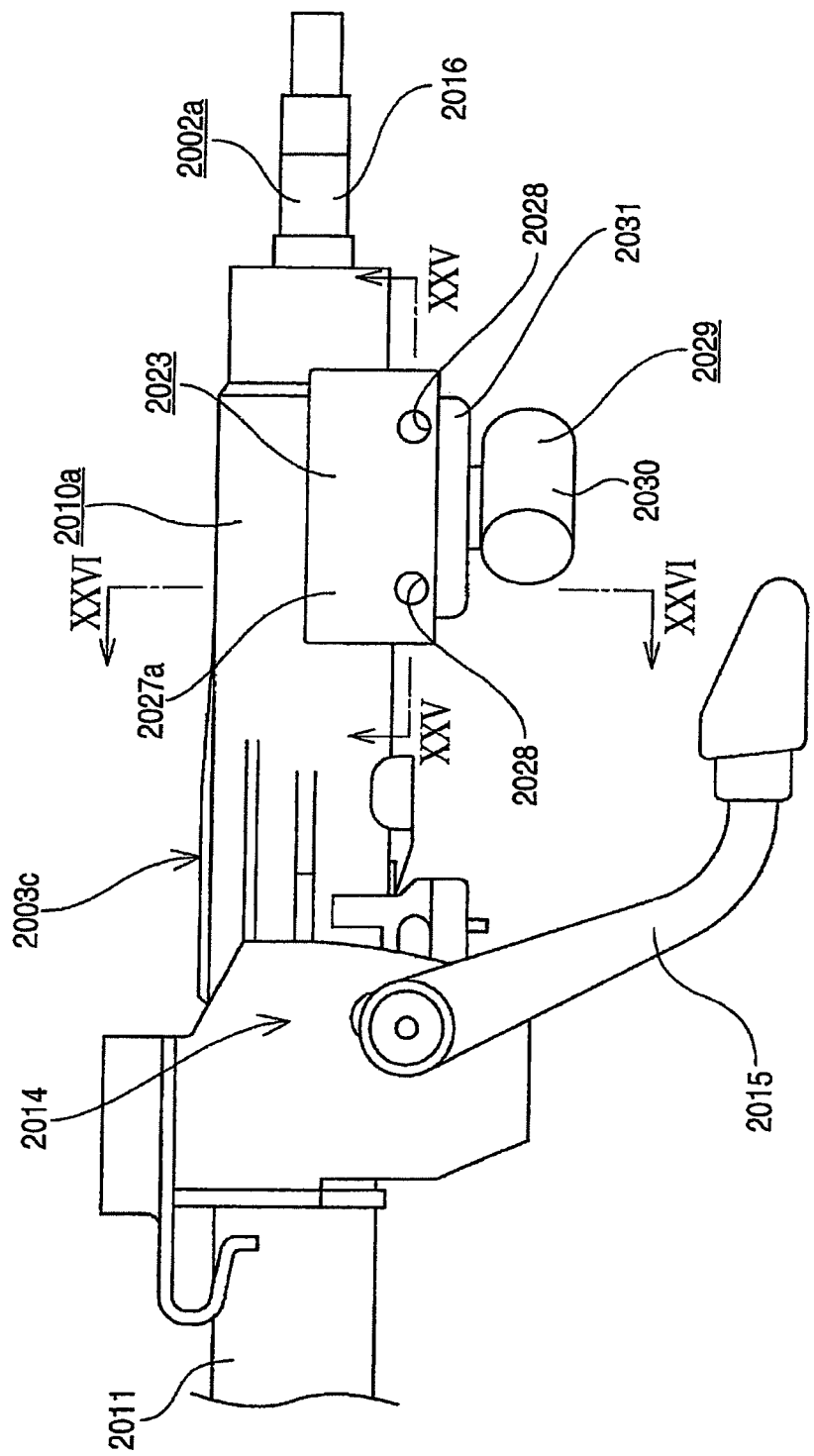
FIG. 24 is a view of an eleventh embodiment according to the invention, corresponding to the middle to rear end portion of FIG. 44.
Figure 25:
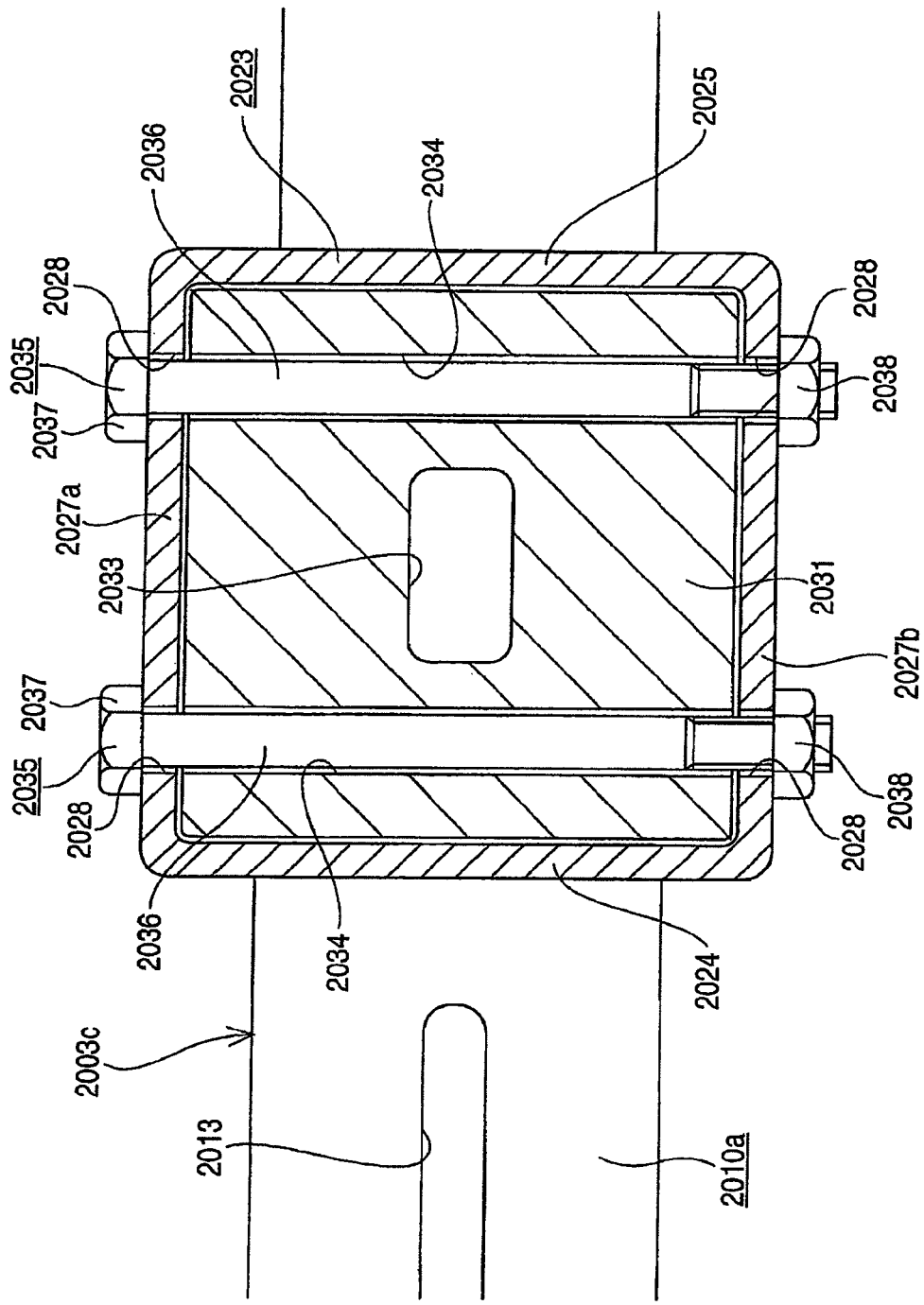
FIG. 25 is an enlarged section view taken along the XXV-XXV line shown in FIG. 24.
Figure 26:
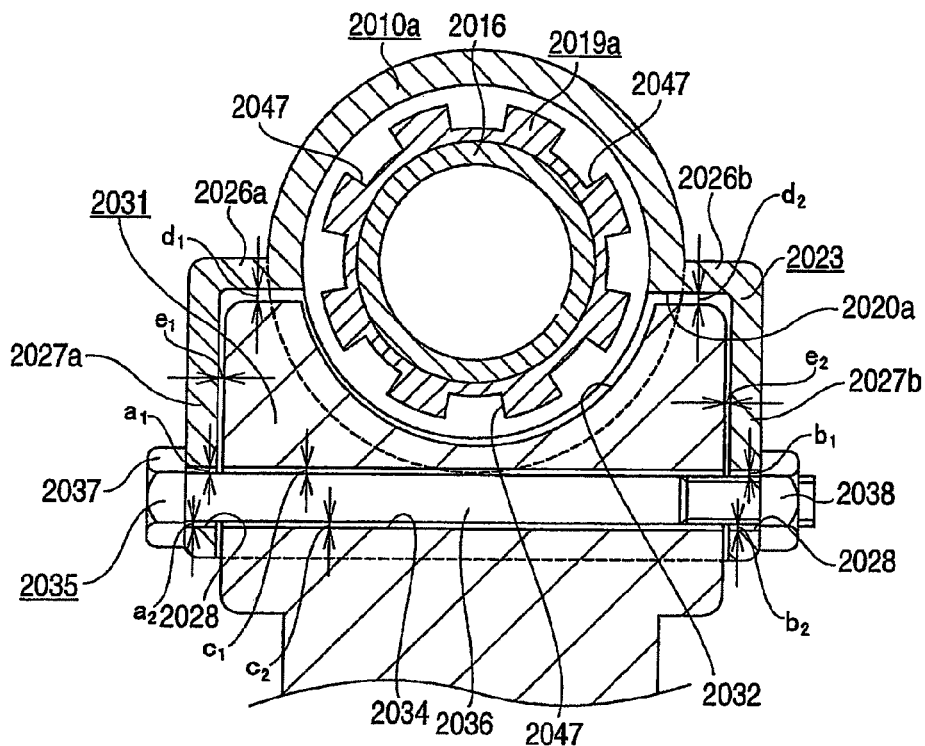
FIG. 26 is an enlarged section view taken along the XXVI-XXVI line shown in FIG. 24.

FIGS. 24 to 26 respectively show the eleventh embodiment according to the invention. Here, the present embodiment is characterized by the structure of a lock apparatus which is provided on the rear end side of an outer column 2010a constituting a steering column 2003c. The structures and operations of the present embodiment similar to those of the above-mentioned conventional steering apparatus are omitted or simplified here. That is, description will be given below mainly of the characteristic portions of the present embodiment.

According to the present embodiment, in order to structure the above lock apparatus, in the lower half section of the rear end side of the outer column 2010a, there is formed a through hole 2020a which allows the inside and outside of the outer column 2010a to communicate with each other. Also, in such portion of the lower half section of the rear end side of the outer column 2010a as surrounds the periphery of the through hole 2020a, there is formed by die casting a box-like lock housing 2023 with its lower surface opened in such a manner that it projects downwardly from the above portion and is formed integrally with the outer column 2010a.

The lock housing 2023 includes: a front plate portion 2024 and a rear plate portion 2025 respectively formed in such a manner that they extend parallel to each other downwardly from the two front and rear end edge portions of the through hole 2020a; and, a pair of parallel side plate portions 2027a and 2027b respectively formed in such a manner that they extend downwardly from the two right and left end edge portions of the through hole 2020a through a pair of connecting plate portions 2026a and 2026b extending right and left.

The two right and left end portions of the front plate portion 2024 and rear plate portion 2025 and the two front and rear end portions of the connecting plate portions 2026a, 2026b and side plate portions 2027a and 2027b are respectively formed to continue with each other. Also, in the two mutually matched front and rear end portions of the lower sides of the side plate portions 2027a and 2027b, there are formed insertion holes 2028 and 2028 respectively.

Also, a cylindrical key lock collar 2019a is fitted with and fixed to the outer surface of such portion of the rear end side of the outer shaft 2016 rotatably supported on the inside diameter side of the outer column 2010a as is matched to the through hole 2020a in the axial direction. In the outer peripheral surface of the key lock collar 2019a, there are formed multiple key lock grooves 2047, 2047, which are respectively key lock recessed portions, at regular intervals in the circumferential direction thereof.

Also, inside the lock housing 2023, there is held a held portion 2031 which constitutes a lock unit 2029. The lock unit 2029 includes a columnar portion 2030 and the above-mentioned held portion 2031 which is fixed to the upper portion of the colúmnar portion 2030 and has a substantially rectangular block (cuboid) shape. The columnar portion 2030 includes a key hole (not shown) which formed in one (in FIG. 24, the deep side) axial-direction end face thereof and into which an ignition key can be inserted. Also, the held portion 2031, as shown in FIG. 25, can be inserted through the lower surface opening of the lock housing 2023 into the lock housing 2023 without shaking greatly. The held portion 2031 includes a recessed surface portion 2032 which is formed in the right-and-left direction intermediate portion of the upper surface of the held portion 2031 and also which has a radius of curvature slightly larger than the radius of curvature of the inner peripheral surface of the outer column 2010a.

Also, in the central portion of the held portion 2031, there is formed a cylinder hole 2033 the upper end portion of which is opened in the central portion of the recessed surface portion 2032; and, into the inside of the cylinder hole 2033, there is inserted a lock pin (not shown). And, in a state where the held portion 2031 is inserted into the inside of the cylinder hole 2033, in such portion of the held portion 2031 as is matched to the respective insertion holes 2028 and 2028 respectively formed in the paired side plate portions 2027a and 2027b respectively constituting the lock housing 2023, there are formed a pair of insertion holes 2034 and 2034 which are arranged concentric with the insertion holes 2028 and 2028 respectively.

And, into inside the insertion holes 2028 and 2034 that are matched to each other, there are inserted the shaft portions 2036 and 2036 (which are not shown in FIG. 24) of bolts 2035 and 2035 respectively; and, nuts 2038 and 2038 are respectively threadedly engaged with such portions of these shaft portions 2036 and 2036 as project from the respective insertion holes 2028 and 2028, and the nuts 2038 and 2038 are fastened further (the pair of side plate portions 2027a and 2027b constituting the lock housing 2023 are firmly held from both right and left sides by the head portions 2037, 2037 of the bolts 2035, 2035 and the nuts 2038, 2038). Owing to this, the lock unit 2029 is connected to the outer column 2010a (the lock housing 2023).

Here, according to the present embodiment, in the thus connected state, in order to prevent the held portion 2031 from shaking within the lock housing 2023, the dimensions of the respective members are regulated in such a manner that the dimensions $a_1, a_2, b_1, b_2, c_1, c_2, d_1, d_2, e_1, e_2$ of clearances respectively existing between the lock housing 2023, held portion 2031 and the respective bolts 2035, 2035 can be reduced sufficiently, or can be set for 0 or negative values (a state of light pressure insertion). The above is the structure of the lock apparatus according to the present embodiment.

The above lock apparatus operates in the following manner. That is, when the ignition switch is turned off and, in order to pull out the ignition key from the above key hole, the ignition key is turned up to the lock position, a lock pin (not shown) is elastically projected inwardly in the diameter direction of the outer column 2010a from the cylinder hole 2033 formed in the held portion 2031 through the through hole 2020a formed in the lower surface of the outer column 2010a. And, the leading end portion of the lock pin is inserted into and engaged with the key lock groove 2047 of the key lock collar 2019a fixed to the steering shaft 2002a. This engagement prevents the rotation of the steering shaft 2002a.

On the other hand, in a state where the ignition switch is turned on, the lock pin does not project into inside the outer column 2010a (it is pulled into inside the lock unit 2029) and thus the steering shaft 2002a with the key lock collar 2019a fixed thereto is free to rotate.

As described above, in the steering apparatus according to the present embodiment, the lock housing 2023, which is used to mount the lock unit 2029 onto the outer column 2010a, is formed such that it does not project rightward or leftward of the outer column 2010a greatly but projects mainly downwardly. In both of a right-hand drive vehicle and a left-hand drive vehicle, the lock housing 2023 can be used in common. Also, since only one lock housing 2023 may be provided, in a state where the lock apparatus is assembled to the vehicle, there is no possibility that a lock housing not in use can occur.

Also, according to the present embodiment, the lock housing 2023 is formed in such a manner that it is connected to such portion of the outer column 2010a as exists around the through hole 2020a. Owing to this, the peripheral portion of the through hole 2020a can have sufficient strength.

Especially, the front plate portion 2024 constituting the lock housing 2023 is formed in such a manner that it partitions a portion, which exists between the slit 2013 formed in the front half section of the lower surface of the outer column 2010a and the through hole 2020a formed in the rear end portion of the lower surface of the outer column 2010a, in the back and forth direction of the outer column 2010a. Therefore, even when the fastening force is applied by the clamp device 2014 to generate internal stress in the outer column 2010a, the front plate portion 2024 can prevent a crack from occurring between the rear end edge of the slit 2013 and the above through hole 2020a.

Twelfth Embodiment

Figure 27:
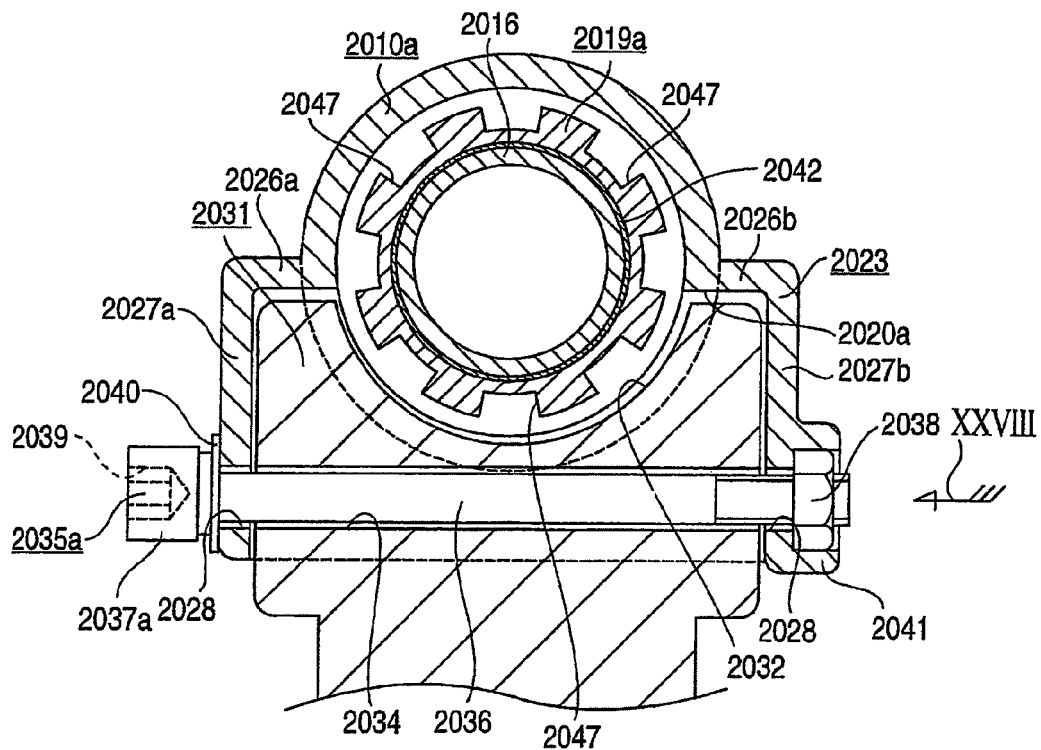
FIG. 27 is a view of a twelfth embodiment according to the invention, similar to FIG. 26.
Figure 28:
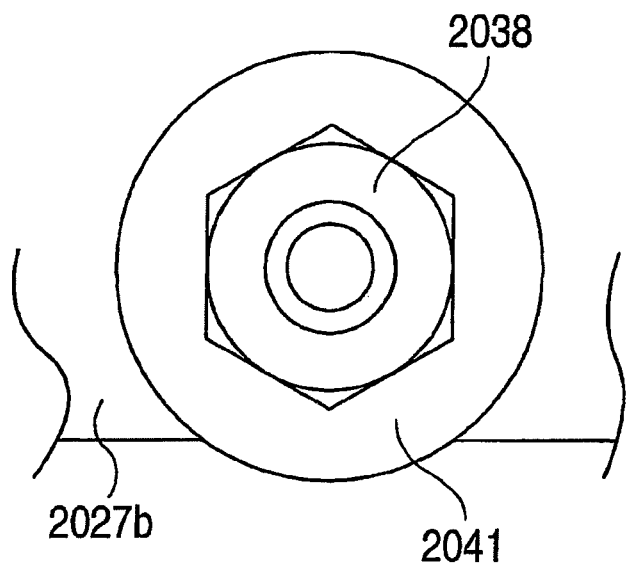
FIG. 28 is an enlarged view taken along the XXVIII line shown in FIG. 27.

FIGS. 27 and 28 respectively show a twelfth embodiment according to the invention. According to the present embodiment, the head portion 2037a of a bolt 2035a has a cylindrical outer peripheral surface and a hexagonal hole 2039 formed in the base end face thereof. Also, between the head portion 2037a and one (in FIG. 27, the left) side plate portion 2027a constituting a lock housing 2023, there is interposed a washer 2040.

Further, a nut 2038 is fitted with the inner surface of a tubular portion 2041 which is provided on and projected from the outer surface of the other side plate portion 2027b constituting the lock housing 2023. And, the outer peripheral surface of the hexagonal-shaped nut 2038 is engaged with the inner peripheral surface of the hexagonal-shaped tubular portion 2041 to thereby prevent the nut 2038 from being rotated from outside. Also, when the leading end portion of the shaft portion 2036 of the bolts 2035a is threadedly engaged with the nut 2038 and is fastened further by a hexagonal wrench (not shown) engaged with the hexagonal hole 2039 of the head portion 2037a of the bolt 2035a, the nut 2038 can be prevented from rotating together with the bolt 2035a.

Here, when the nut 2038 has been previously pressure inserted (including light pressure insertion) into the inside of the tubular portion 2041 or has been cast thereinto, it is possible to prevent the nut 2038 from slipping off the tubular portion 2041. In this case, the above-mentioned engaging and fastening operation can be facilitated.

Also, according to the present embodiment, between the outer peripheral surface of the outer shaft 2016 and the inner peripheral surface of a key lock collar 2019a, there is interposed a friction sleeve 2042. The friction sleeve 2042 allows the key lock collar 2019a to rotate relative to the outer shaft 2016 with a large torque. Therefore, according to the present embodiment, in a state where a lock pin and a key lock groove 2047 are engaged with each other, unless there is applied such a large torque to a steering wheel as the steering wheel cannot be operated, it is impossible to operate the steering wheel. Therefore, the present embodiment can secure its antitheft function and also can prevent the damage of the lock pin and the like. The remaining structures and operations of the present embodiment are similar to those of the previously described eleventh embodiment.

Thirteenth Embodiment

Figure 29:
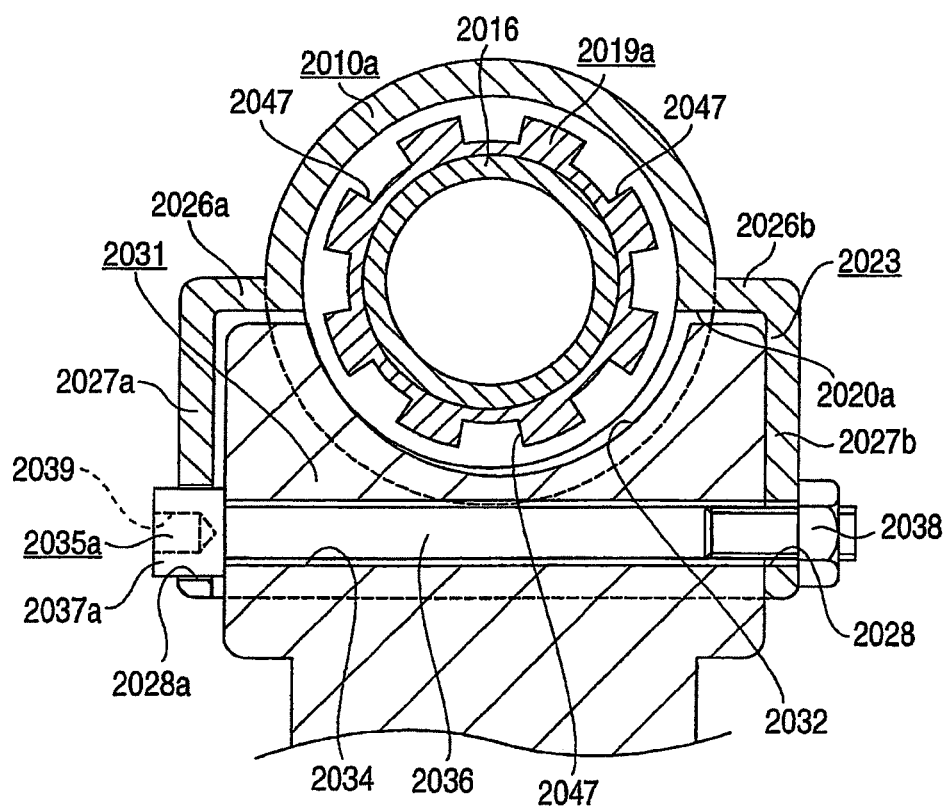
FIG. 29 is a view of a thirteenth embodiment according to the invention, similar to FIG. 26.

FIG. 29 shows a thirteenth embodiment according to the invention. According to the present embodiment, into the inside of an insertion hole 2028a formed in one (in FIG. 29, left) side plate portion 2027a constituting a lock housing 2023, there is inserted the head portion 2037a of a bolt 2035a. The head portion 2037a of the bolt 2035a and a nut 2038 threadedly engaged with the leading end portion of the shaft portion 2036 of the bolt 2035a cooperate together in sandwiching a held portion 2031 and the other (in FIG. 29, right) side plate portion 2027b constituting the lock housing 2023 between them. Also, in this state, by fastening the nut 2038, the mutually opposed side surfaces of the held portion 2031 and the other side plate portion 2027b are contacted with each other.

Owing to this structure, the held portion 2031 can be prevented from shaking in the right and left direction with respect to the lock housing 2023. Also, since a clearance between the outer peripheral surface of the head portion 2037a of the bolt 2035a and the inner peripheral surface of the insertion hole 2028a is set for a value in the range of approximately 0.1 mm to the light pressure insertion level, these two peripheral surfaces can be prevented from shaking in the diameter direction relative to each other. The remaining structures and operations of the present embodiment are similar to those of the previously described eleventh and twelfth embodiments.

Fourteenth to Sixteenth Embodiment

Figure 30:
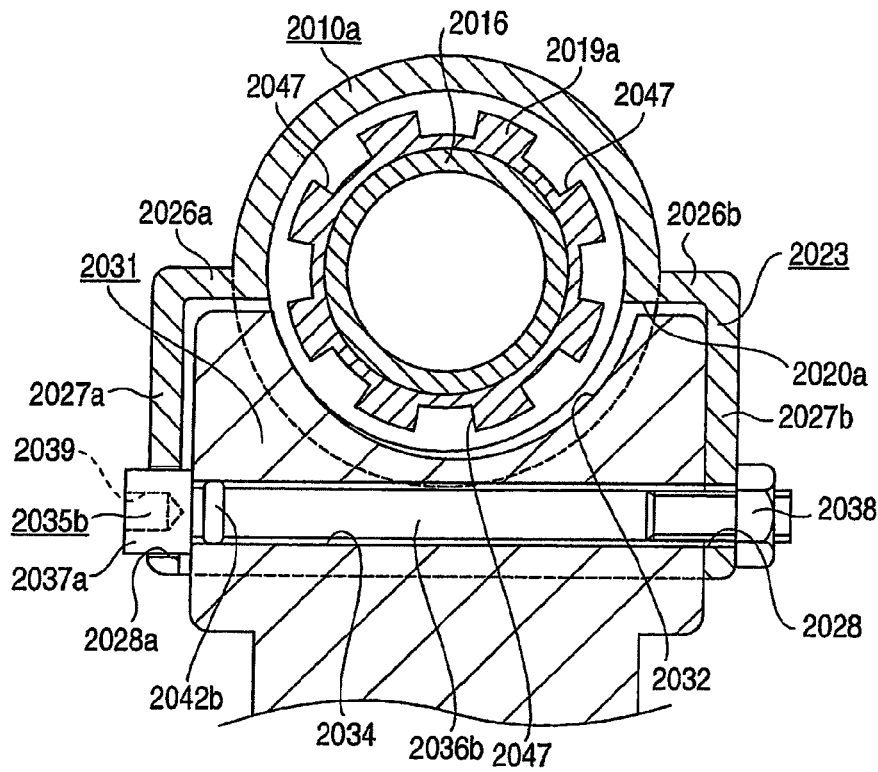
FIG. 30 is a view of a fourteenth embodiment according to the invention, similar to FIG. 26.
Figure 31:
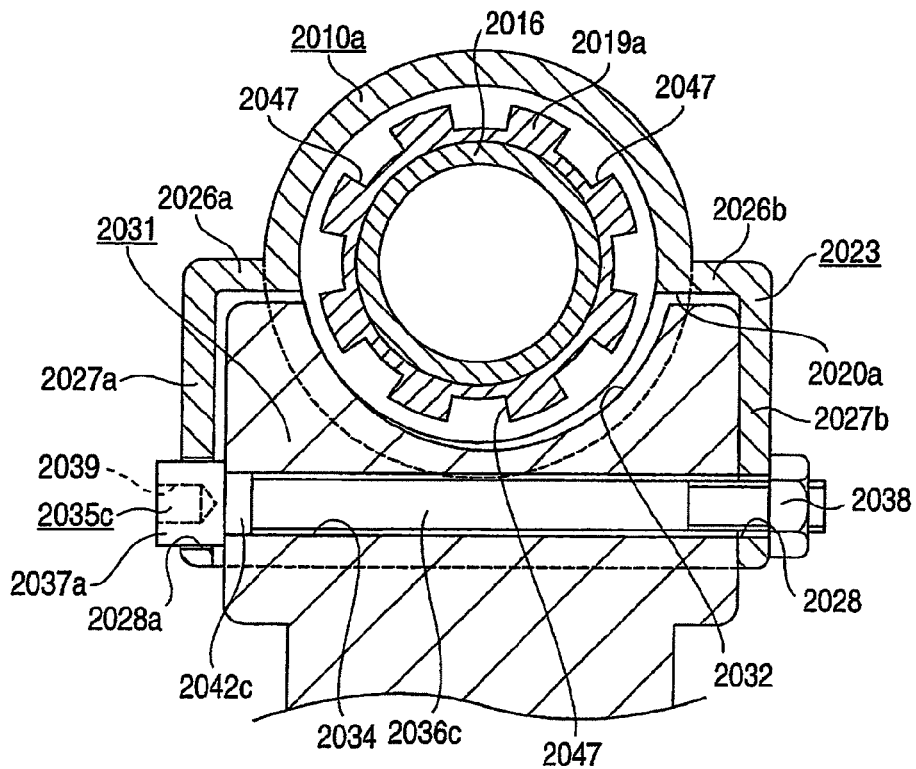
FIG. 31 is a view of a fifteenth embodiment according to the invention, similar to FIG. 26.
Figure 32:
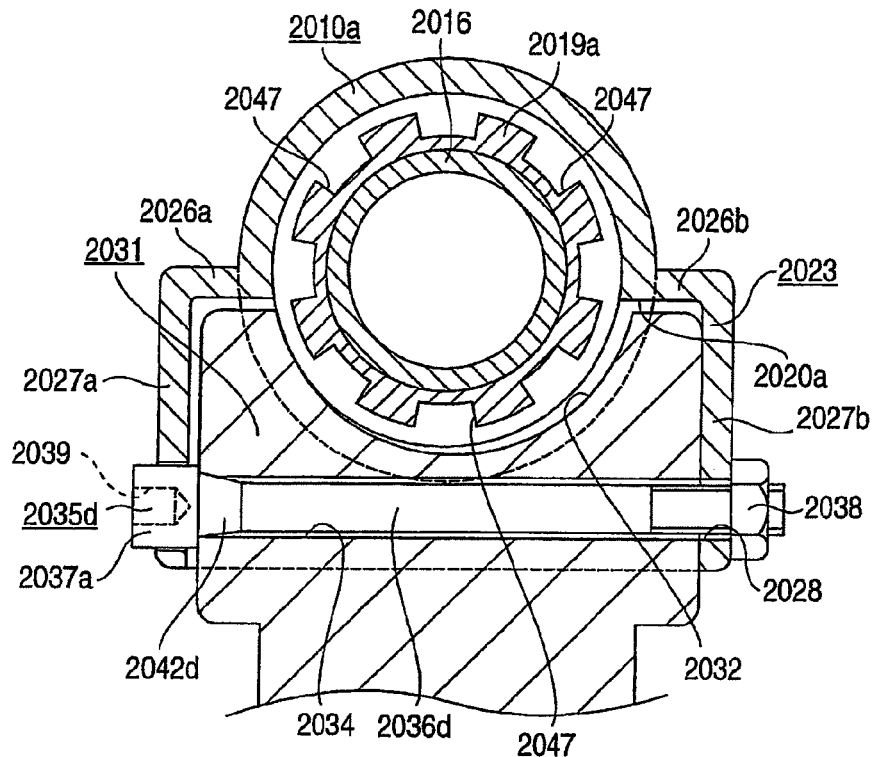
FIG. 32 is a view of a sixteenth embodiment according to the invention, similar to FIG. 26.

FIGS. 30 to 32 respectively show fourteenth to sixteenth embodiments according to the invention. In these embodiments, the structures of the shaft portions 2036b, 2036c and 2036d of bolts 2035b, 2035c and 2035d are different from the above-mentioned thirteenth embodiment.

Firstly, in the fourteenth embodiment shown in FIG. 30, on the whole area of the outer peripheral surface on the base end side of the shaft portion 2036b of the bolt 2035b, there is integrally formed an engaging portion 2042b which expands outwardly in the diameter direction from the outer peripheral surface and also which has an outer peripheral surface having a semicircular arc shaped section.

Also, in the fifteenth embodiment shown in FIG. 31, on the whole area of the base end side outer peripheral surface of the shaft portion 2036c of the bolt 2035c, there is integrally formed an engaging portion 2042c which expands in the diameter direction from the outer peripheral surface and also which has a cylindrical outer peripheral surface.

Also, in the sixteenth embodiment shown in FIG. 32, on the whole area of the base end side outer peripheral surface of the shaft portion 2036d of the bolt 2035d, there is integrally formed an engaging portion 2042d which expands in the diameter direction from the outer peripheral surface and also which has a tapered outer peripheral surface, while the tapered outer peripheral surface is inclined in a direction where the outside diameter thereof increases as it goes toward the base end side of the shaft portion 2036d.

And, in all of these embodiments, the engaging portions 2042b, 2042c and 2042d are respectively inserted, or light pressure inserted or pressure inserted into the inside of an insertion hole 2034 formed in a held portion 2031 with a fit clearance of approximately 0.1 mm. Owing to such structure, it is possible to effectively prevent the shaft portions 2036b, 2036c and 2036d and insertion hole 2034 from shaking relative to each other. The remaining structures and operations of these embodiments are similar to those of the previously described thirteenth embodiment.

Here, in the fourteenth to sixteenth embodiments, the engaging portion to be formed in the shaft portion of the bolt is formed integrally with the shaft portion. However, the engaging portion may also be formed of resin, rubber, soft metal or the like as a separate member. In this case, the separate member may have a ring shape the whole periphery of which is continuously connected, or may have a partially chipped ring shape a portion of which, in the circumferential direction thereof, has a discontinuous portion.

Seventeenth Embodiment

Figure 33:
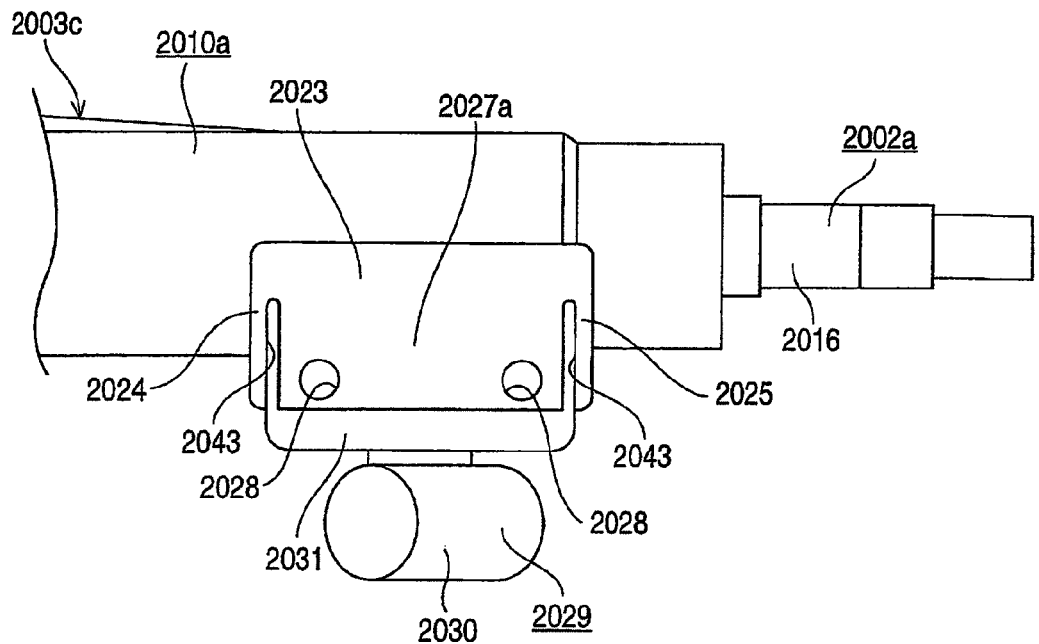
FIG. 33 is a view of a seventeenth embodiment according to the invention, corresponding to the right half section of FIG. 24.

FIG. 33 shows a seventeenth embodiment according to the invention. The present embodiment is different from the eleventh embodiment shown in FIGS. 24 to 26 in that, in the longitudinal direction two end edges of one side plate portion 2027a constituting the lock housing 2023, there are formed a pair of second slits which are opened in the lower end edge of the side plate portion 2027a.

That is, according to the present embodiment, owing to formation of the paired second slits 2043 and 2043, one side plate portion 2027a can be easily deformed elastically in a direction where it moves toward and away from the other side plate portion 2027b (see FIG. 26). Thus, by fastening the respective nuts 2038 and 2038 (not shown in FIG. 33; see FIGS. 25 and 26) which are threadedly engaged with the leading end portions of the respective bolts 2035 and 2035, one side plate portion 2027a is elastically deformed toward the other side plate portion 2027b, whereby the inner surfaces of the two side plate portions 2027a and 2027b are respectively contacted with the two side surfaces of the held portion 2031 (with no clearance between them).

This structure can prevent the held portion 2031 from shaking in the right and left direction with respect to the lock housing 2023. The remaining structures and operations of the present embodiment are similar to those of the previously described eleventh embodiment shown in FIGS. 24 to 26.

Here, when enforcing the present invention, in order that, using the above-mentioned structure of the seventeenth embodiment, the other side plate portion 2027b can be easily deformed elastically, in the longitudinal direction two end portions of the other side plate portion 2027b as well, there may also be formed second slits which are respectively opened in the lower end edge of the side plate portion 2027b.

Eighteenth Embodiment

Figure 34:
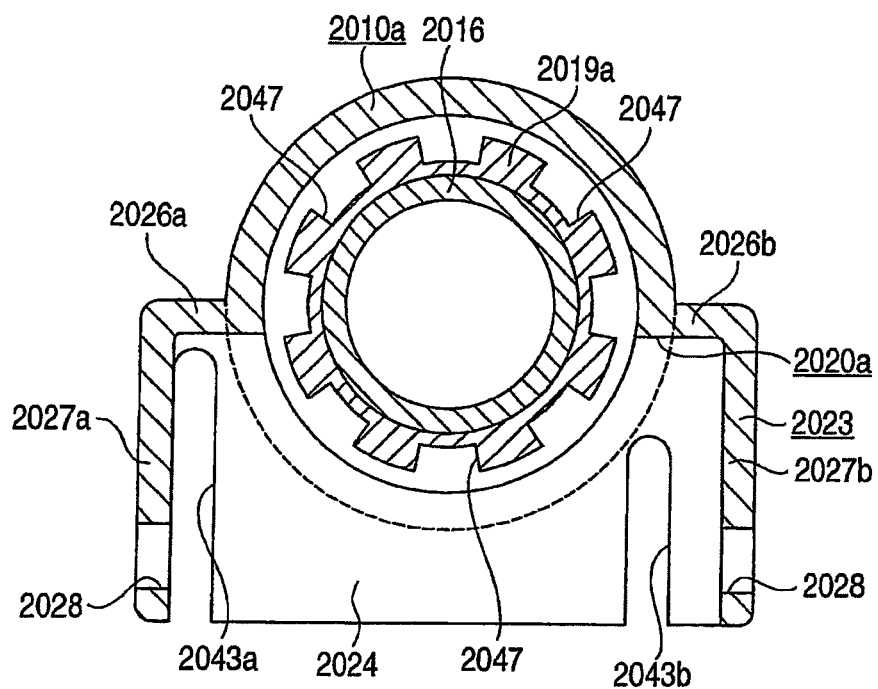
FIG. 34 is a view of an eighteenth embodiment according to the invention with a portion thereof omitted, similar to FIG. 26.

FIG. 34 shows an eighteenth embodiment according to the invention. According to the present embodiment, in order to obtain similar effects to the above-mentioned seventeenth embodiment, there is employed a structure which can easily deform elastically a pair of side plate portions 2027a and 2027b constituting a lock housing 2023 in a direction where they move toward and away from each other.

Specifically, in the width direction one-end portions (in FIG. 34, left end portions) and the near-to-other-end portions (in FIG. 34, the near-to-right-end portions) of a front plate portion 2024 and a rear plate portion 2025 (not shown in FIG. 34) respectively constituting the lock housing 2023, there are formed second slits 2043a, 2043b which are respectively opened in the lower end edges of their associated plate portions. The remaining structures and operations of the present embodiment are similar to those of the previously described seventeenth embodiment.

Here, when enforcing the present invention, in order that the side plate portions constituting the lock housing can be easily deformed elastically, the number and positions of the second slits to be formed in the side plate portions constituting the lock housing can be changed according to cases.

Nineteenth Embodiment

Figure 35:
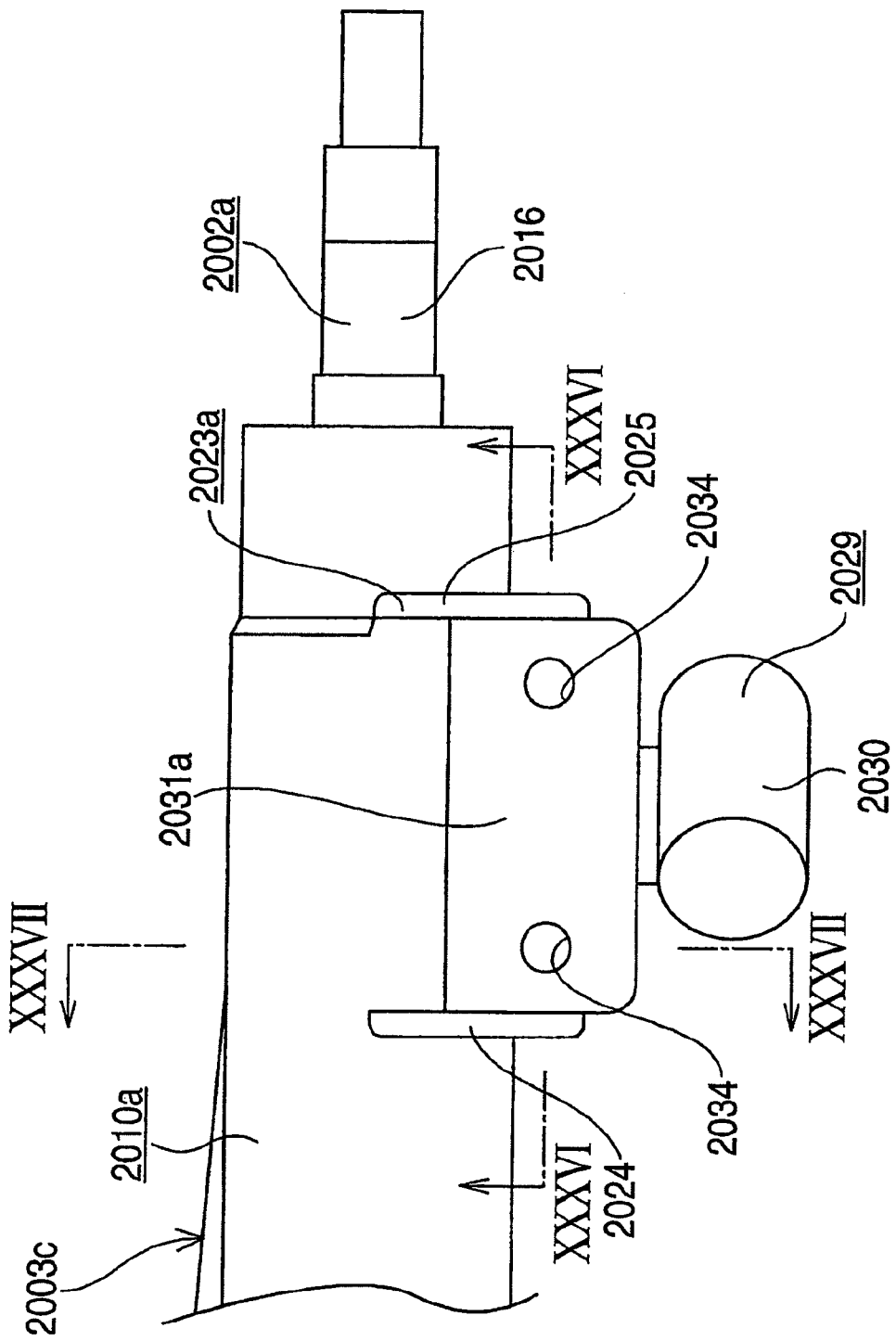
FIG. 35 is a view of a nineteenth embodiment according to the invention, corresponding to the right half section of FIG. 24.
Figure 36:
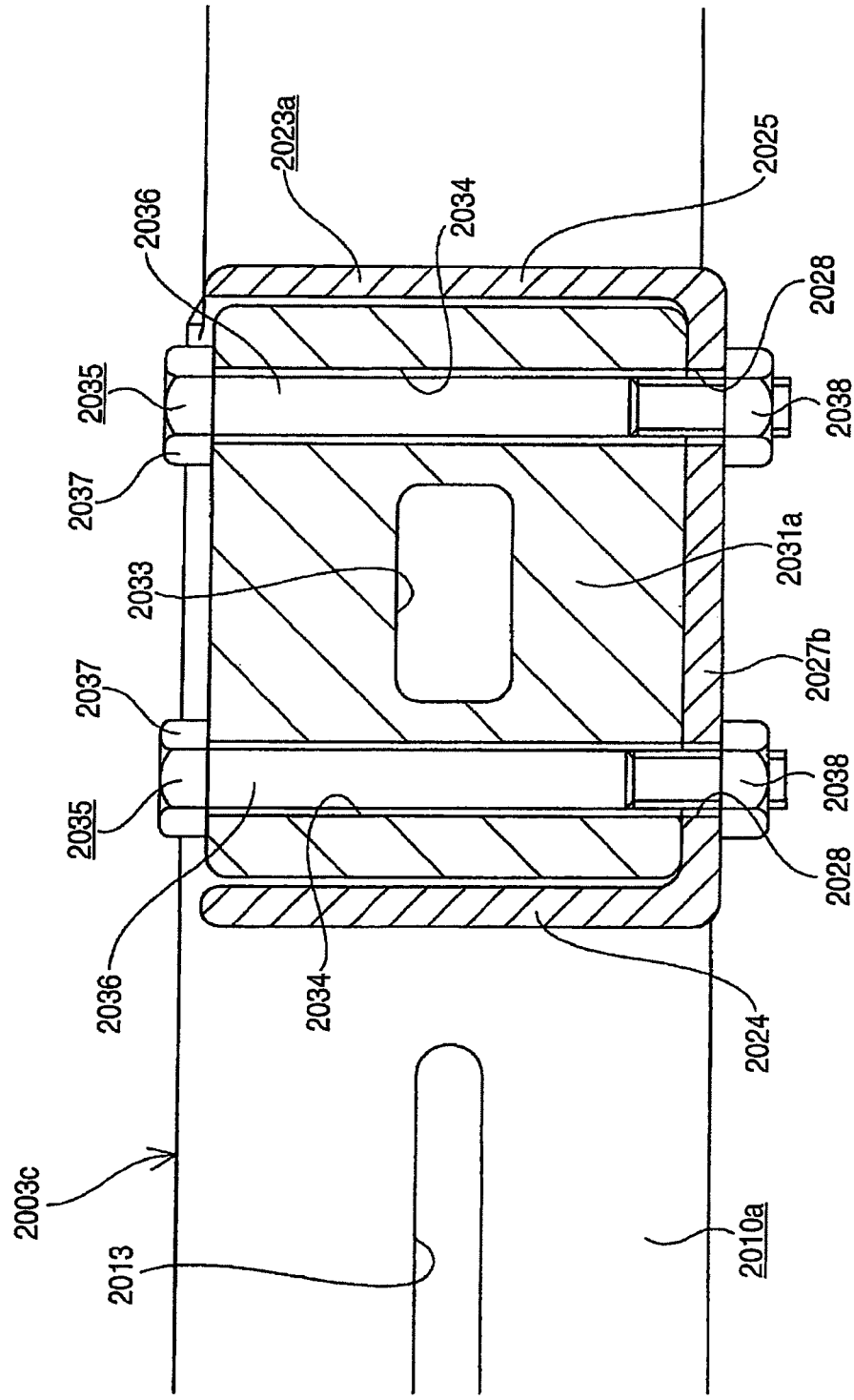
FIG. 36 is an enlarged section view taken along the XXXVI-XXXVI shown in FIG. 35.
Figure 37:
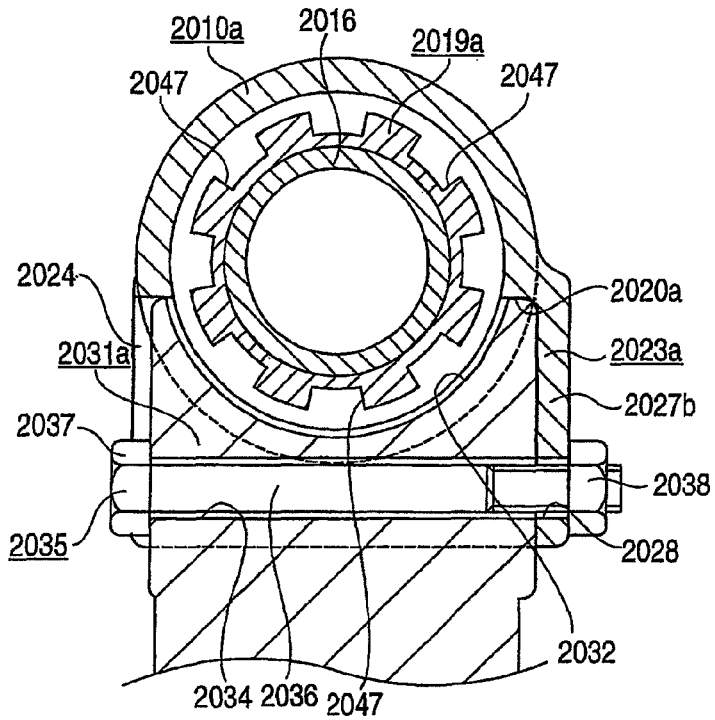
FIG. 37 is an enlarged section view taken along the XXXVII-XXXVII shown in FIG. 35.

FIGS. 35 to 37 respectively show a nineteenth embodiment according to the invention. The present embodiment is different from the eleventh embodiment shown in FIGS. 24 to 26 in that a lock housing 2023a excludes one side plate portion 2027a and a pair of connecting plate portions 2026a and 2026b (see FIGS. 24 to 26). Also, due to such exclusion, in the present embodiment, the dimension of a held portion 2031a in the right and left direction is reduced accordingly. And, the head portions 2037, 2037 of the bolts 2035, 2035 (not shown in FIG. 35) and nuts 2038, 2038 threadedly engaged with the leading end portions of the shaft portions 2036, 2036 of the bolts 2035, 2035 cooperate together in sandwiching the held portion 2031a and a side plate portion 2027b (in the eleventh embodiment, the other side plate portion) constituting the lock housing 2023a between them.

Also, in this state, by fastening the nuts 2038, 2038, the mutually opposed side surfaces of the held portion 2031a and side plate portion 2027b are contacted with each other (with no clearance between them). And, employment of this structure can prevent the held portion 2031a from shaking in the right and left direction with respect to the lock housing 2023a. Also, according to the present embodiment, since the lock housing 2023a excludes one side plate portion 2027a (see FIGS. 24 to 26), the operation to arrange the held portion 2031a within the lock housing 2023a can be facilitated (due to the enhanced freedom of the insertion direction of the held portion 2031a) accordingly.

Also, in this case, when the shaft portions 2036, 2036 of the paired bolts 2035, 2035 have been previously inserted into a pair of insertion holes 2034, 2034 respectively formed in the held portion 2031a, the operation to connect the held portion 2031a to the lock housing 2023a can be facilitated further. The structures and operations of the remaining portions of the present embodiment are similar to the above-mentioned eleventh embodiment shown in FIGS. 24 to 26.

Twentieth Embodiment

Figure 38:
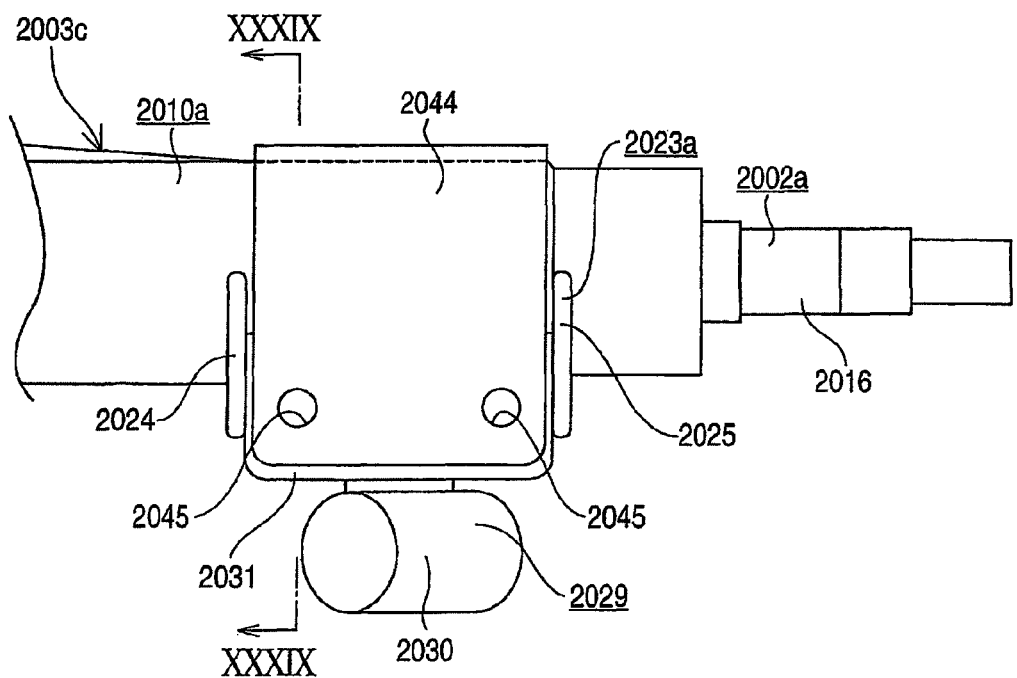
FIG. 38 is a view of a twentieth embodiment according to the invention, corresponding to the right half section of FIG. 24.
Figure 39:
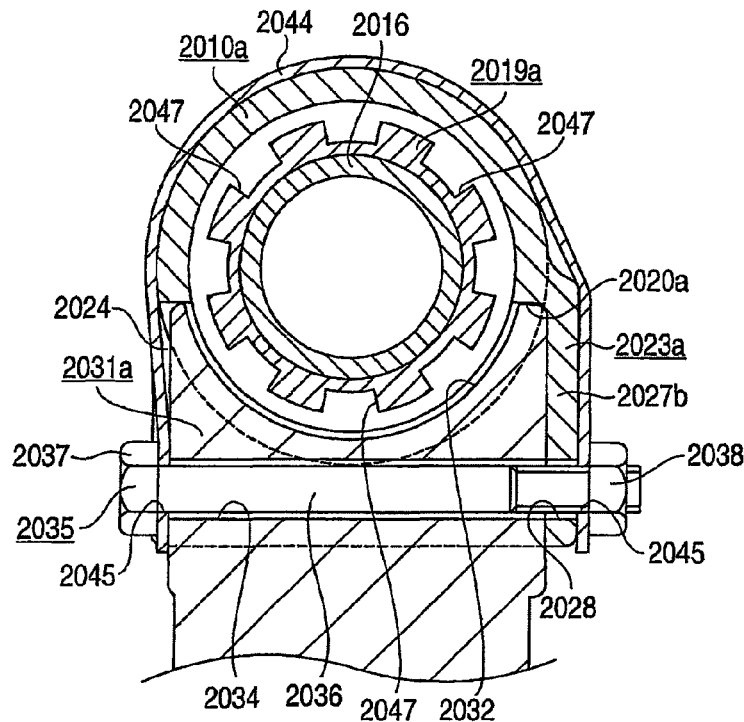
FIG. 39 is an enlarged section view taken along the XXXIX-XXXIX shown in FIG. 38.

FIGS. 38 and 39 respectively show a twentieth embodiment according to the invention. The present embodiment is different from the above-mentioned nineteenth embodiment in that a connecting band 2044 made of metal is used as a connecting member for connecting the held portion 2031a to a lock housing 2023a.

That is, according to the present embodiment, the intermediate portion of the connecting band 2044 is provided over the upper half section of the outer column 2010a in such a manner that their peripheral surfaces are contacted with each other with no clearance between them, while the side plate portion 2027b constituting the lock housing 2023a and the held portion 2031a are sandwiched by and between the two end portions of the connecting band 2044 from both right and left sides. Also, in a state where the shaft portions 2036, 2036 of the bolts 2035, 2035 (which are not shown in FIG. 38) are inserted into insertion holes 2045, 2045 respectively formed in the two end portions of the connecting band 2044, there are fastened the nuts 2038, 2038 which are threadedly engaged with the leading end portions of the shaft portions 2036, 2036.

Owing to this, the inner surface of one end portion (in FIG. 41, left end portion) of the connecting band 2044 and the inner surface of the side plate portion 2027*b* constituting the lock housing 2023*a* are respectively contacted with the two side surfaces of the held portion 2031*a* (with no clearance between them). According to the present embodiment, by an amount equivalent to provision of the connecting band 2044, the connecting strength of the held portion 2031*a* in the vertical direction with respect to the lock housing 2023*a* can be enhanced. The structures and operations of the remaining portions of the present embodiment are similar to the above-mentioned nineteenth embodiment.

Twenty-First Embodiment

Figure 40:
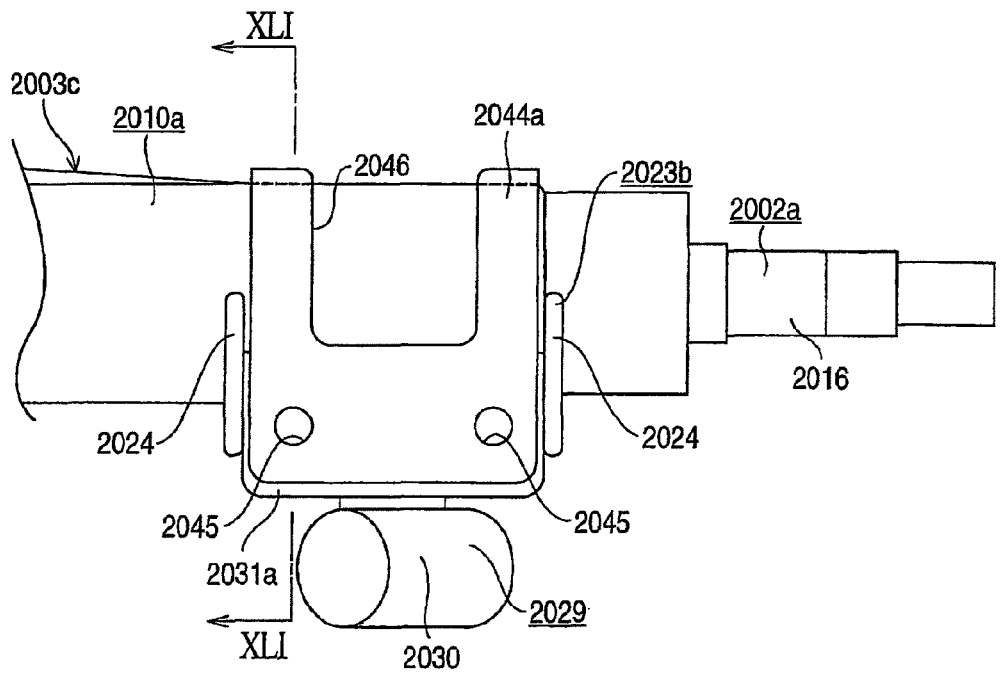
FIG. 40 is a view of a twenty-first embodiment according to the invention, corresponding to the right half section of FIG. 24.
Figure 41:
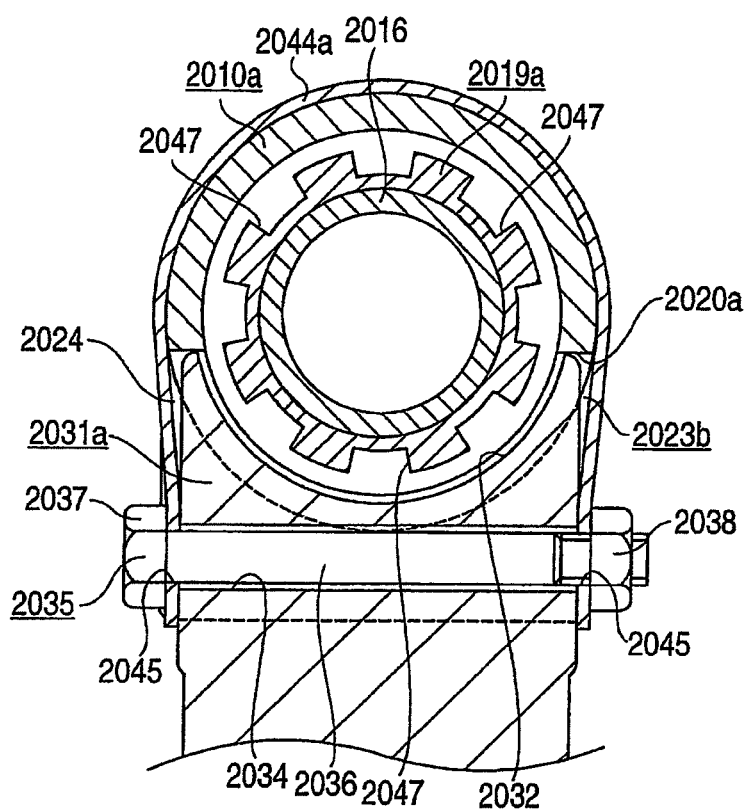
FIG. 41 is an enlarged section view taken along the XLI-XLI shown in FIG. 40.

FIGS. 40 and 41 respectively show a twenty-first embodiment according to the invention. The present embodiment is different from the twentieth embodiment shown in FIGS. 38 and 39 in that a lock housing 2023*b* excludes the side plate portion 2027*b* (see FIG. 39).

Specifically, according to the present embodiment, the two end portions of a connecting band 2044*a* are contacted with the two side surfaces of a held portion 2031*a* respectively. Also, according to the present embodiment, in the intermediate portion of the connecting band 2044*a*, there is formed a rectangular-shaped thickness reduced portion 2046. This can reduce the weight of the connecting band 2044*a* and also can enhance the bending property of the intermediate portion of the connecting band 2044*a*, whereby the intermediate portion of the connecting band 2044*a* can be easily contacted closely with the outer peripheral surface of the upper half section of the outer column 2010*a*. The structures and operations of the remaining portions of the present embodiment are similar to the above-mentioned twentieth embodiment.

Twenty-Second Embodiment

Figure 42:
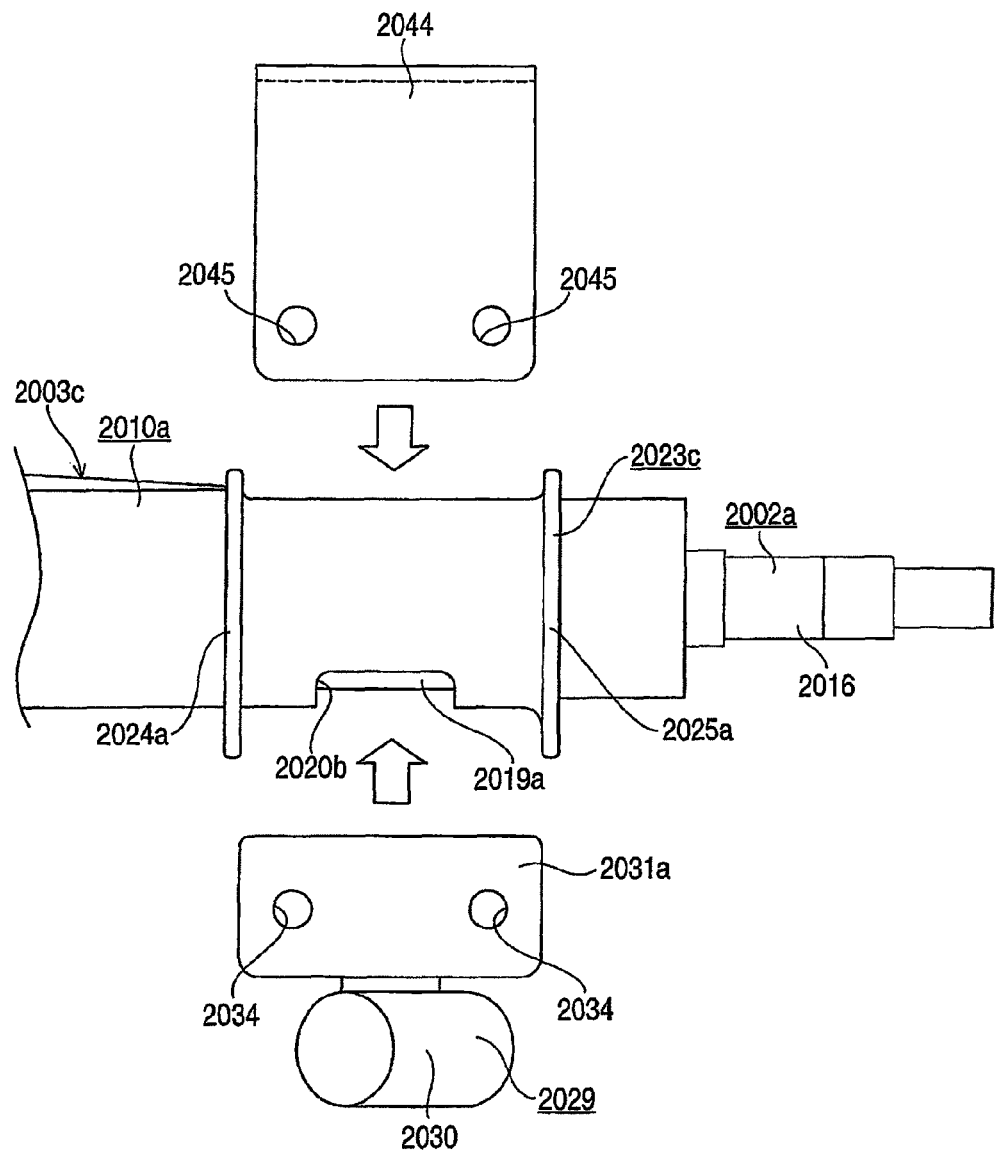
FIG. 42*t* is an exploded view of a twenty-second embodiment according to the invention, corresponding to the right half section of FIG. 24.

FIG. 42 shows a twenty-second embodiment according to the invention. According to the present embodiment, a front plate portion 2024*a* and a rear plate portion 2025*a* respectively constituting a lock housing 2023*c* are formed to extend over the whole area of the outer peripheral surface of the outer column 2010*a*. This enhances the strength of the outer column 2010*a*, front plate portion 2024*a* and rear plate portion 2025*a*.

Also, the size (the dimension in the axial direction of the outer column 2010*a* and the dimension in the peripheral direction thereof) of a through hole 2020*b* formed between the front plate portion 2024*a* and rear plate portion 2025*a* on the rear end side of the lower surface of the outer column 2010*a* is reduced when compared with the above-mentioned respective embodiments. The structures and operations of the remaining portions of the present embodiment are similar to the above-mentioned twenty-first embodiment.

Here, in enforcing the present invention, when the size of the through hole to be formed in the lower surface of the outer column is set to have a size of a necessary minimum value that allows the smooth insertion of the lock pin, the inner peripheral edge of the through hole can prevent the lock pin from falling down in the peripheral direction when the steering shaft is locked.

Although the invention has been described heretofore in detail and with reference to the specific embodiments thereof, it is obvious to those skilled in the art that various changes and modifications are possible without departing from the spirit and scope of the invention.

The present patent application is based on the Japanese Patent Application (Patent Application No. 2007-293891) filed on Nov. 13, 2007, Japanese Patent Application (Patent Application No. 2007-308807) filed on Nov. 29, 2007, Japanese Patent Application (Patent Application No. 2007-316568) filed on Dec. 7, 2007, and Japanese Patent Application (Patent Application No. 2007-329979) filed on Dec. 21, 2007, and thus the contents thereof are incorporated herein for reference.

INDUSTRIAL APPLICABILITY

According to a steering apparatus of the invention, a lock housing and an outer column can be increased in rigidity and can be reduced in weight. Therefore, the invention can provide a steering apparatus which can provide a large telescopic clamp force.

Also, according to the invention, there can be provided a steering apparatus which is excellent in the freedom of design and has an excellent antitheft function.

Further, according to the invention, it is possible to provide a steering apparatus which can be mounted onto both of a right-hand drive vehicle and a left-hand drive vehicle and also can prevent the occurrence of a lock housing which is not in use. Also, it is possible to provide a steering apparatus in which, even when a fastening force by a clamp device is applied, a crack is hard to occur between the slit of the clamp device and the through hole of a lock apparatus.

The invention claimed is:

1. A steering apparatus comprising:
an inner column;
an outer column fitted with the inner column in such a manner that it can be moved in a telescopic manner;
a steering shaft rotatably supported by the inner and outer columns, with a steering wheel mountable on the vehicle body rearward side thereof;
a lock apparatus including a lock pin actuatable by an actuator for preventing the rotation of the steering shaft;
a lock housing formed integrally with the outer column for storing the lock apparatus therein, wherein
the lock housing projects from the outer column in the direction of the width of a vehicle or toward the lower side of a vehicle body;
the outside diameter of a connecting portion between the outer column and lock housing is set larger than the outside diameter of the outer column,
a rib extending parallel to the axis of the outer column is formed between the lock housing and the outer periphery of the outer column,
the rib is formed integrally with the lock housing and outer column,
the height of the lock housing is set substantially equal to the outside diameter dimension of the cylindrical outer periphery of the outer column,
the height of the connecting portion between the outer periphery of the outer column and lock housing is set larger than the outside diameter dimension of the outer periphery of the outer column, and
wherein a slit, formed along the axial direction and opening at the extremity of the outer column, is provided on area of the outer column, and
a clumping device is provided on an area of the front end portion, where the slit is not provided and a through hole is provided, the clumping device changes a width of the slit to reduce or expand a diameter of the front end portion of the outer column, and to prevent or allow the move of the steering shaft.

2. The steering apparatus according to claim 1, wherein:
the lock housing is opened in the diameter direction of the outer column;
a first through hole is formed at a position of the outer column as corresponds to the lock housing;
a key lock recessed portion is formed at a position of the steering shaft as corresponds to the first through hole;
the lock apparatus includes a lock unit having a lock pin;
the lock apparatus is fixed to the inside of the lock housing a fixing screw;
the lock pin can penetrate through the first through hole of the outer column, move in the diameter direction of the outer column and project into the key lock recessed portion of the steering shaft; and
in a state where the steering shaft is arranged on the inside diameter side of the outer column, the head portion of the fixing screw is disposed at a position where it cannot be operated by a tool.

3. The steering apparatus according to claim 2, wherein:
a second through hole, having a diameter larger than the diameter of the shaft portion of the fixing screw and smaller than the diameter of the head portion of the fixing screw, is formed in a portion of the outer column surrounded by the lock housing as exists out of the first through hole;
a third through hole, having a diameter larger than the diameter of the head portion of the fixing screw, is formed in a portion of the outer column as exists on the opposite side to the second through hole in the peripheral direction thereof;
the shaft portion of the fixing screw is inserted into the second through hole and the fixing screw is threadedly engaged with a screw hole formed in the lock unit to thereby fix the lock unit to the inside of the lock housing; and
the steering shaft is situated between the second and third through holes.

4. The steering apparatus according to claim 2, wherein:
a recessed portion, which is recessed downwardly of the upper surface of the lock housing, is formed in a portion of the upper surface of the lock housing;
a second through hole, having a diameter larger than the diameter of the shaft portion of the fixing screw and smaller than the diameter of the head portion of the fixing screw, is formed in the recessed portion; and
the shaft portion of the fixing screw is inserted through the second through hole and the fixing screw fixes the lock unit to the inside of the lock housing.

5. The steering apparatus according to claim 2, wherein:
a second through hole, having a diameter larger than the diameter of the shaft portion of the fixing screw and smaller than the diameter of the head portion of the fixing screw, is formed in the front surface of the lock housing; and
the fixing screw with its shaft portion inserted into the second through hole is threadedly engaged with a screw hole opened up in the front surface of the lock unit to thereby fix the lock unit to the inside of the lock housing.

6. The steering apparatus according to claim 1, wherein:
the outer column is made of steel;
the lock housing is made of a light alloy; and
a portion of the outer column is embedded in a portion of the lock housing, whereby these two parts are formed as an integral body.

7. The steering apparatus according to claim 1, wherein:
a slit extending in the axial direction of the outer column and opened in the front end of the outer column is formed on the front end side of the outer column;
a clamp device is provided for changing the width of the slit to reduce or increase the diameter of the front end portion of the outer column, thereby switching the steering shaft between a state where the steering shaft is prevented from moving in the axial direction thereof and a state where it is allowed to move in the axial direction thereof;
a through hole is formed in the lower surface of such portion of the front end side of the outer column as exists out of the slit;
a key lock recessed portion is formed in the steering shaft, at a position corresponding to the through hole in the axial direction of the steering shaft;
the lock housing is formed integrally with such portion of the outer peripheral surface of the outer column as exists out of the slit and near to the through hole in such a manner that it projects downwardly of the outer column;
the lock apparatus includes the lock pin and a lock unit connected through a connecting member to the outer column; and
the lock pin can penetrate through the through hole of the outer column, move in the diameter direction of the outer column and project into the key lock recessed portion of the steering shaft.

8. The steering apparatus according to claim 7, wherein:
the slit is formed in the lower surface of the outer column;
the through hole and lock housing are respectively formed in such portion of the lower surface of the outer column as exists nearer to the rear end side of the outer column than the slit;
the lock housing includes a front plate portion formed in the lower surface of the outer column; and
the front plate portion partitions a portion between the slit and through hole in the longitudinal direction of the outer column.

9. The steering apparatus according to claim 7, wherein:
the lock housing has a box shape which surrounds the periphery of the through hole and opens in the lower surface thereof; and
the lock unit includes a held portion which is to be held within the lock housing.

10. The steering apparatus according to claim 9, wherein:
the lock housing includes a pair of side plate portions for sandwiching the held portion of the lock unit from both sides in the width direction of a vehicle body;
the pair of side plate portions respectively have lock housing side insertion holes;
the held portion of the lock unit includes lock unit side insertion holes respectively formed at positions corresponding to a pair of insertion holes formed in the pair of side plate portions;
the connecting member is constituted of a bolt and a nut;
the bolt is inserted through the lock housing side insertion holes and lock unit side insertion holes; and
the nut is threadedly engaged with such portion of the bolt as projects from the respective insertion holes.

11. The steering apparatus according to claim 10, wherein the head portion of the bolt is disposed inside the insertion hole formed in one of the paired side plate portions and, in a state where the held portion and the other side plate portion are held by and between the head portion of the bolt and nut, the nut is fastened to thereby bring the side surface of the held portion into contact with the inner surface of the other side plate portion.

12. The steering apparatus according to claim 10, wherein at least one lock housing side slit, which opens in the lower surface of the lock housing, is formed in the lock housing.

* * * * *